(12) United States Patent
Alberry et al.

(10) Patent No.: US 12,045,548 B2
(45) Date of Patent: Jul. 23, 2024

(54) METHOD AND SYSTEM FOR DISPLAYING MULTIPLE ROUTING DIAGRAMS

(71) Applicant: Mitchell Repair Information Company, LLC, San Diego, CA (US)

(72) Inventors: Michel B. Alberry, Lakeside, CA (US); Lester B. Johnson, Escondido, CA (US); Thomas A. Southward, San Diego, CA (US); Thomas W. Tipps, San Diego, CA (US); Michael S. Knize, Oceanside, CA (US); John P. McGraw, Cardiff by the Sea, CA (US); Robert Pilz, Santee, CA (US); Bryan Keithley Romero, San Diego, CA (US)

(73) Assignee: Mitchell Repair Information Company, LLC, San Diego, CA (US)

( * ) Notice: Subject to any disclaimer, the term of this patent is extended or adjusted under 35 U.S.C. 154(b) by 0 days.

(21) Appl. No.: 17/531,776

(22) Filed: Nov. 21, 2021

(65) Prior Publication Data

US 2022/0374564 A1 Nov. 24, 2022

Related U.S. Application Data

(63) Continuation-in-part of application No. 17/325,166, filed on May 19, 2021.

(51) Int. Cl.
*G06F 30/20* (2020.01)
*G06F 3/04817* (2022.01)
(Continued)

(52) U.S. Cl.
CPC .......... *G06F 30/20* (2020.01); *G06F 3/04817* (2013.01); *G06F 3/0482* (2013.01);
(Continued)

(58) Field of Classification Search
CPC .. G06F 3/0484; G06F 3/04817; G06F 3/0482; G06F 30/18; G06F 30/30; G06F 30/20; G06F 30/12; G06T 11/206
See application file for complete search history.

(56) References Cited

U.S. PATENT DOCUMENTS 5,831,618 A * 11/1998 Fuji ..................... G06F 9/451
715/969
6,606,731 B1 8/2003 Baum et al.
(Continued)

FOREIGN PATENT DOCUMENTS

| EP | 187860 A2 | 12/2007 |
|----|-----------|---------|
| EP | 1868146 A1 | 12/2007 |

OTHER PUBLICATIONS

Quadcept, "Schematic Capture: Placing Labels", p. 1-6, Jul. 27, 2017 https://web.archive.org/web/20170727233759/https://www.quadcept.com/en/manual/schematic/post-100.
(Continued)

*Primary Examiner* — Roberto Borja
(74) *Attorney, Agent, or Firm* — McDonnell Boehnen Hulbert & Berghoff LLP

(57) ABSTRACT

A method and computing system operable for displaying a first routing diagram on a display. The first routing diagram is a member of a first set of routing diagrams that includes multiple different routing diagrams. Displaying the first routing diagram includes displaying a user-selectable control and a first portion of a particular routable component within the first routing diagram. The user-selectable control corresponds to a location of the display where a first terminal connected to the particular routable component or a second terminal connected or connectable to the first terminal is displayed. An additional function include determining, by a processor, a selection of the user-selectable control occurs while the first routing diagram is displayed on the display. A
(Continued)

further function includes displaying, on the display in response to determining the selection of the user-selectable control occurs, the second routing diagram with a second portion of the particular routable component highlighted.

21 Claims, 33 Drawing Sheets

(51) Int. Cl.
*G06F 3/0482* (2013.01)
*G06F 30/12* (2020.01)
*G06F 30/18* (2020.01)
*G06F 30/30* (2020.01)
*G06T 11/20* (2006.01)

(52) U.S. Cl.
CPC .............. *G06F 30/12* (2020.01); *G06F 30/18* (2020.01); *G06T 11/206* (2013.01); *G06F 30/30* (2020.01)

(56) References Cited

U.S. PATENT DOCUMENTS

| | | | |
|---|---|---|---|
| 7,149,975 B1* | 12/2006 | Johnson | H04L 41/22 709/224 |
| 7,499,601 B2 | 3/2009 | Nuno et al. | |
| 7,865,278 B2 | 1/2011 | Underdal et al. | |
| 8,924,913 B1 | 12/2014 | Goh et al. | |
| 9,881,119 B1 | 1/2018 | Kukal et al. | |
| 11,210,434 B2 | 12/2021 | Wolfe et al. | |
| 2003/0025734 A1 | 2/2003 | Boose et al. | |
| 2004/0243944 A1 | 12/2004 | Sabiers et al. | |
| 2006/0142910 A1 | 6/2006 | Grier et al. | |
| 2006/0238036 A1 | 10/2006 | Nagata et al. | |
| 2007/0204254 A1* | 8/2007 | Kumagai | G06F 30/30 716/139 |
| 2007/0208840 A1* | 9/2007 | McConville | H04L 41/22 715/764 |
| 2007/0271499 A1 | 11/2007 | Feng et al. | |
| 2007/0294002 A1 | 12/2007 | Underdal et al. | |
| 2012/0179977 A1* | 7/2012 | Rounding | G06F 3/0484 715/750 |
| 2013/0031509 A1* | 1/2013 | Curtis | G06F 30/394 715/810 |
| 2014/0169217 A1 | 6/2014 | Coroy et al. | |
| 2016/0012179 A1 | 1/2016 | Zoukari | |
| 2017/0032071 A1 | 2/2017 | Jummel | |
| 2017/0177757 A1 | 6/2017 | Thorley et al. | |
| 2018/0095638 A1 | 4/2018 | Merg et al. | |
| 2019/0042684 A1 | 2/2019 | Toub et al. | |
| 2019/0108294 A1 | 4/2019 | Anderson et al. | |
| 2019/0114387 A1 | 4/2019 | Wolfe et al. | |
| 2019/0384885 A1 | 12/2019 | Lau et al. | |
| 2020/0057429 A1 | 2/2020 | Takao | |
| 2020/0184745 A1 | 6/2020 | Merg et al. | |
| 2021/0004585 A1 | 1/2021 | Alberry et al. | |
| 2022/0374114 A1 | 11/2022 | Alberry et al. | |

OTHER PUBLICATIONS

Idonbavand, "Microsoft Excel—setting same zoom level for several worksheets", Apr. 5, 2014, 1 page https://ifonlyidknownthat.wordpress.com/2014/04/05/microsoft-excel-setting-same-zoom-level-for-several-worksheets/.

Microsoft Excel 2019, Screenshots SS0-7, 2019.

Spataro, Jared, "Office 2019 is now available for Windows and Mac", Microsoft, Sep. 24, 2018, 5 pages.

Adobe, "Adjusting PDF views", Jun. 2, 2018, 13 pages https://web.archive.org/web/20180602214401/https://helpx.adobe.com/acrobat/using/adjusting-pdf-views*.html.

World Wide Web Consortium (W3C); Scalable Vector Graphics (SVG) 2, W3C Candidate Recommendation Oct. 4, 2018, Chapter 8: Coordinate Systems, Transformations and Units; downloaded from the world wide web at https://www.w3.org/TR/SVG/coords.html#ViewBoxAttribute on Jun. 9, 2019, pp. 1-21.

Michael, Research as a Hobby; How to Display Additional Information by Clicking Image Components? Easy and for Free (WP, SVG); Oct. 18, 2018; 14 pages.

Bracey, Kezz; SVG Viewport and viewBox (for Complete Beginners), Mar. 29, 2018; 11 pages.

w3schools.com; SVG Stroke Properties; 6 pages.

Wikipedia; Web Service; downloaded from the world wide web at https://en.wikipedia.org/wiki/Web_service on Jun. 19, 2019; 4 pages.

Alldata diy.com; Access Factory Repair Information, Beyond the Printed Manual; downloaded from the world wide web at http://web.archive.org/web/20190402040954/http://www.alldaydatadiy.com/about_alldate/repair.html; archived Apr. 2, 2019; 2 total pages.

ALLDATA LLC; All Data—OEM Automotive Mechanical Repair Information, Jumpstart your Shop's Success with ALLDATA Repair; downloaded from the world wide web at http://web.archive.org/web/20190208023756/https://www.alldata.com/alldata-repair; archived Feb. 8, 2019; 5 pages.

U.S. Appl. No. 17/325,166; filed May 19, 2021; inventors: Michel B. Alberry, Lester B. Johnson, Thomas A. Southward, Thomas W. Tipps, Michael S. Knize, John P. McGraw, and Robert Pilz.

w3schools.com; SVG Stroke Properties; downloaded from the world wide web at https://www.w3schools.com/graphics/svg_stroking.asp on Aug. 18, 2019; pp. 1-3 (6 total pages).

w3schools.com; SVG Stroke Properties; downloaded from the world wide web at https://web.archive.org/web/20210518232548/https://www.w3schools.com/graphics/svg_stroking.asp; May 18, 2021; 6 pages (in color).

* cited by examiner

FIG. 13

DISPLAY, ON A DISPLAY, A FIRST ROUTING DIAGRAM. THE FIRST ROUTING DIAGRAM IS A MEMBER OF A FIRST SET OF ROUTING DIAGRAMS THAT INCLUDE MULTIPLE DIFFERENT ROUTING DIAGRAMS. DISPLAYING THE FIRST ROUTING DIAGRAM INCLUDES DISPLAYING, WITHIN THE FIRST ROUTING DIAGRAM, A FIRST USER-SELECTABLE CONTROL, A FIRST PORTION OF A PARTICULAR ROUTABLE COMPONENT, A FIRST TERMINAL CONNECTED TO THE PARTICULAR ROUTABLE COMPONENT, AND A SECOND TERMINAL CONNECTED OR CONNECTABLE TO THE FIRST TERMINAL. THE FIRST USER-SELECTABLE CONTROL CORRESPONDS TO THE FIRST TERMINAL OR THE SECOND TERMINAL. —411

DETERMINE, BY A PROCESSOR, A SELECTION OF THE FIRST USER-SELECTABLE CONTROL OCCURS WHILE THE FIRST ROUTING DIAGRAM IS DISPLAYED ON THE DISPLAY —412

DISPLAY ON THE DISPLAY IN RESPONSE TO DETERMINING THE SELECTION OF THE FIRST USER-SELECTABLE CONTROL OCCURS WHILE THE FIRST ROUTING DIAGRAM IS DISPLAYED ON THE DISPLAY, A SECOND ROUTING DIAGRAM WITH A SECOND PORTION OF THE PARTICULAR ROUTABLE COMPONENT HIGHLIGHTED —413

```xml
<?xml version="1.0"?>
<response xmlns:i="http://www.w3.org/2001/XMLSchema-instance">    ← 510
    <vehicleYear>2014</vehicleYear>
    <vehicleMake>Acme</vehicleMake>                                   ← 511
    <vehicleModel>Mamba</vehicleModel>
    <routingDiagramSet>
        <RDsetIdentifier>RDS 20</RDsetIdentifier>                     ← 512
    </routingDiagramSet>
    <routingDiagramSet>
        <RDsetIdentifier>RDS 21</RDsetIdentifier>                     ← 513
    </routingDiagramSet>
    <routingDiagramSet>
        <RDsetIdentifier>RDS 22</RDsetIdentifier>                     ← 514
    </routingDiagramSet>
    <routingDiagramSet>
        <RDsetIdentifier>RDS 23</RDsetIdentifier>                     ← 515
    </routingDiagramSet>
    <routingDiagramSet>                                               ← 516
        <RDsetIdentifier>RDS 24</RDsetIdentifier>    ← 518
        <routingDiagram>                                              ← 519
            <diagramIdentifier>51</diagramIdentifier>    ← 520
            <title>Coil Pack System (1 of 2)</title>    ← 521
            <hotspot>
                <hotspotIdentifier>186</hotspotIdentifier>    ← 537    ← 522
            </hotspot>
            <hotspot>
                <hotspotIdentifier>187</hotspotIdentifier>    ← 538    ← 523
            </hotspot>
            <hotspot>
                <hotspotIdentifier>188</hotspotIdentifier>    ← 527
                <RDS>23</RDS>    ← 528
                <routingDiagram>45</routingDiagram>    ← 529           ← 524
                <highlight>
                    <routableComp>151</routableComp>    ← 536          ← 530
                </hightlight>
            </hotspot>
            <hotspot>
                <hotspotIdentifier>189</hotspotIdentifier>    ← 539
                <RDS>20</RDS>    ← 546
                <routingDiagram>31</routingDiagram>    ← 547           ← 525
                <highlight>
                    <routableComp>153</routableComp>    ← 549
                    <routableComp>154</routableComp>    ← 550          ← 548
                    <routableComp>155</routableComp>    ← 551
                    <routableComp>156</routableComp>    ← 552
                </hightlight>
            </hotspot>
```

FIG. 29A

```
                    ┌<hotspot>
             526─┤    <hotspotIdentifier>190</hotspotIdentifier> ←540
                    └</hotspot>
                    ┌<hotspot>
                    │    <hotspotIdentifier>197</hotspotIdentifier> ←541
                    │    <RDS>20</RDS> ←553
                    │    <routingDiagram>31</routingDiagram> ←554
                    │    ┌<highlight>
             531─┤    │    <routableComp>153</routableComp> ←556
                    │ 555─┤   <routableComp>154</routableComp> ←557
                    │    │    <routableComp>155</routableComp> ←558
                    │    │    <routableComp>156</routableComp> ←559
                    │    └</hightlight>
                    └</hotspot>
                    ┌<hotspot>
             532─┤    <hotspotIdentifier>738</hotspotIdentifier> ←542
                    └</hotspot>
                    ┌<hotspot>
                    │    <hotspotIdentifier>739</hotspotIdentifier> ←543
                    │    <RDS>20</RDS> ←560
                    │    <routingDiagram>31</routingDiagram> ←561
      519─┤ 533─┤   ┌<highlight>
                    │ 562─┤ <routableComp>154</routableComp> ←563
                    │    └</hightlight>
                    └</hotspot>
                    ┌<hotspot>
             534─┤    <hotspotIdentifier>740</hotspotIdentifier> ←544
                    └</hotspot>
                    ┌<hotspot>
             535─┤    <hotspotIdentifier>741</hotspotIdentifier> ←545
                    └</hotspot>
                  </routingDiagram>
                  <routingDiagram>
                      <diagramIdentifier>52</diagramIdentifier> ←564
                      <title>Coil Pack System (2 of 2)</title> ←565
516─┤                 ┌<hotspot>
                566─┤   <hotspotidentifier>381</hotspotidentifier> ←568
      570─┤           └</hotspot>
                      ┌<hotspot>
                567─┤   <hotspotidentifier>383</hotspotidentifier> ←569
                      └</hotspot>
                  </routingDiagram>
              </routingDiagramSet>
              ┌<routingDiagramSet>
      517─┤     <RDsetIdentifier>RDS 25</RDsetIdentifier>
              └</routingDiagramSet>
```

FIG. 29B

|     451 | 452     | 453                              | 454              |
|---------|---------|----------------------------------|------------------|
| RD      | RD ID   | RD ID                            | RD ID            |
| 30      | (20, 1) | Computer Data Lines (1 of 6)     | 189              |
| 31      | (20, 2) | Computer Data Lines (2 of 6)     | 287              |
| 32      | (20, 3) | Computer Data Lines (3 of 6)     | 307              |
| 33      | (20, 4) | Computer Data Lines (4 of 6)     | N.S.             |
| 34      | (20, 5) | Computer Data Lines (5 of 6)     | 285              |
| 35      | (20, 6) | Computer Data Lines (6 of 6)     | 286              |
| 36      | (21, 1) | Interior Lamps (1 of 1)          | N.S.             |
| 37      | (22, 1) | Starting/Charging System (1 of 5) | 186, 334        |
| 38      | (22, 2) | Starting/Charging System (2 of 5) | 322, 383        |
| 39      | (22, 3) | Starting/Charging System (3 of 5) | N.S.            |
| 40      | (22, 4) | Starting/Charging System (4 of 5) | N.S.            |
| 41      | (22, 5) | Starting/Charging System (5 of 5) | N.S.            |
| 42      | (23, 1) | Power Distribution (1 of 9)      | N.S.             |
| 43      | (23, 2) | Power Distribution (2 of 9)      | N.S.             |
| 44      | (23, 3) | Power Distribution (3 of 9)      | N.S.             |
| 45      | (23, 4) | Power Distribution (4 of 9)      | 188              |
| 46      | (23, 5) | Power Distribution (5 of 9)      | N.S.             |
| 47      | (23, 6) | Power Distribution (6 of 9)      | N.S.             |
| 48      | (23, 7) | Power Distribution (7 of 9)      | N.S.             |
| 49      | (23, 8) | Power Distribution (8 of 9)      | N.S.             |
| 50      | (23, 9) | Power Distribution (9 of 9)      | N.S.             |
| 51      | (24, 1) | Coil Pack System (1 of 2)        | 306, 381, 382, 387 |
| 52      | (24, 2) | Coil Pack System (2 of 2)        | 187, 190, 335    |
| 53      | (25, 1) | Body Control Module ECM (1 of 3) | N.S.             |
| 54      | (25, 2) | Body Control Module ECM (2 of 3) | N.S.             |
| 55      | (25, 3) | Body Control Module ECM (3 of 3) | N.S.             |

FIG. 32

METHOD AND SYSTEM FOR DISPLAYING MULTIPLE ROUTING DIAGRAMS

REFERENCE TO RELATED APPLICATION

This application is a continuation-in-part application of U.S. patent application Ser. No. 17/325,166 filed on May 19, 2021 and titled "Method and system for displaying multiple routing diagrams." U.S. patent application Ser. No. 17/325,166 is incorporated herein by reference.

BACKGROUND

To assist repair personnel, technicians, or other individuals, some manufacturers or information suppliers produce wiring diagrams that show representations of electrical circuits (i.e., wires) and electrical components (connectable to the electrical circuits) of a serviceable device, such as a vehicle.

The level of complexity of a wiring diagram can vary for various reasons, such as the size of the diagram, the number of electrical components and/or wires shown on the diagram, and the proximity of the wires to one another on the diagram. As the complexity of a routing diagram increases, the ease of tracing a wire on the wiring diagram decreases.

Early on, a wiring diagram was printed on paper. More recently, a wiring diagram has become available for display on a computing device display. In some cases, the computing display device is not sufficiently large to display a complete wiring diagram at a zoom level such that the content of the wiring diagram is decipherable by a human being. Accordingly, some wiring diagrams are sub-divided into multiple wiring diagrams.

In some cases, wires shown on a first of the multiple wire diagram continue on a second of the multiple wiring diagrams. In some of those cases, the first and second wiring diagrams are contained within a set of drawings arranged in a sequence. Moreover, the sequence of drawing can include one or more intermediary wiring diagrams in between the first and second wiring diagrams. In some different cases in which wires shown on a first wiring diagram continue on a second wiring diagram, the first and second wiring diagrams can be contained in different sets of wiring diagrams. It would be beneficial to have new methods and systems for navigating from displaying the first wiring diagram to displaying the second wiring diagram on the computing device display. Such methods and systems could improve the computing display device and/or reduce an amount of time required to repair a device under service.

OVERVIEW

This description pertains to displaying routing diagram(s) on a display. A routing diagram can be arranged as a wiring diagram, a pneumatic line diagram, a hydraulic line diagram, an optical communication line diagram, a vacuum line diagram, or some other routing diagram that shows routable component(s) and/or connectable component(s). Routable and connectable components can include connectors that are connectable to one another. The connectors can, but need not necessarily, include connectors that are arranged as male/female connectors. The connectors can, but need not necessarily, be releasably connectable to each other via threads. Moreover, a routing diagram can include any mix of two or more different types of routable components, such as a mix of routable components including two or more from among: a wire, an optical communication line, a hydraulic line, a pneumatic line, or a vacuum line.

A routable component on a wiring diagram can include a wire (e.g., a 16 gauge copper wire coated with insulation or multiple wires within a wire harness) that extends from a first location to a second location for transporting an electrical current and/or establishing a voltage potential at a node. A component that is connectable to a wire is referred to as a connectable component. Examples of a connectable component on a wiring diagram include an electrical motor, a solenoid, a sensor, a battery, and a switch, among other examples.

A routable component on a pneumatic line diagram can include a pneumatic line (e.g., a hose or a metal tube) that extends from a first location to a second location for transporting one or more gases. A gas within a pneumatic line can include air extracted from a local environment. Alternatively, a gas within a pneumatic line can include a refrigerant in a gaseous state. A component that is connectable to a pneumatic line is referred to as a connectable component. Examples of a connectable component on a pneumatic line diagram include an air pump and an air compressor.

A routable component on a hydraulic line diagram can include a hydraulic line (e.g., a hose or a metal tube) that extends from a first location to a second location for transporting a liquid. The liquid can, but need not necessarily, include a transmission fluid, a brake fluid, and/or a liquid coolant. A component that is connectable to a hydraulic line is referred to as a connectable component. Examples of a connectable component on a hydraulic line diagram include a pump, a control valve, a filter, and a reservoir.

A routable component on an optical communication line diagram can include an optical communication line (e.g., a fiber optic cable or optical fiber) that extends from a first location to a second location for transporting optical signals. A component that is connectable to an optical communication line is referred to as a connectable component. Examples of a connectable component on an optical communication line diagram include a fiber optic sensor and a fiber optic repeater.

A routable component on a vacuum line diagram can include a vacuum line (e.g., a rubber hose or metal line) that extends from a first location to a second location for maintaining a vacuum within the vacuum line and/or transporting a gas to a vacuum pump for withdrawal of the gas from the vacuum line so as to create a vacuum within the vacuum line. A component that is connectable to a vacuum line is referred to as a connectable component. Examples of a connectable component on a vacuum line diagram include a vacuum pump and a valve.

In a first implementation, a method is provided. The method includes displaying, on a display, a first routing diagram. The first routing diagram is a member of a first set of routing diagrams that includes multiple different routing diagrams. Displaying the first routing diagram includes displaying, within the first routing diagram, a first user-selectable control, a first portion of a particular routable component, a first terminal connected to the particular routable component, and a second terminal connected or connectable to the first terminal. The first user-selectable control corresponds to the first terminal or the second terminal. The method also includes determining, by a processor, a selection of the first user-selectable control occurs while the first routing diagram is displayed on the display. The method further includes displaying, on the display in response to determining the selection of the first user-selectable control occurs while the first routing diagram is displayed on the display, a second routing diagram with a second portion of the particular routable component highlighted.

In a second implementation, a computing system is provided. The computing system includes a processor and a non-transitory computer readable medium configured to store at least executable instructions. The executable instructions, when executed by the processor, cause the computing system to perform functions. The functions comprise displaying, on a display, a first routing diagram. The first routing diagram is a member of a first set of routing diagrams that includes multiple different routing diagrams. Displaying the first routing diagram includes displaying, within the first routing diagram, a first user-selectable control, a first portion of a particular routable component, a first terminal connected to the particular routable component, and a second terminal connected or connectable to the first terminal. The first user-selectable control corresponds to the first terminal or the second terminal. The functions also include determining, by the processor, a selection of the first user-selectable control occurs while the first routing diagram is displayed on the display. The functions further include displaying, on the display in response to determining the selection of the first user-selectable control occurs while the first routing diagram is displayed on the display, the second routing diagram with a second portion of the particular routable component highlighted.

In a third implementation, a non-transitory computer-readable memory is provided. The non-transitory computer-readable memory has stored therein instructions executable by a processor to cause a computing system to perform functions. The functions include displaying, on a display, a first routing diagram. The first routing diagram is a member of a first set of routing diagrams that includes multiple different routing diagrams. Displaying the first routing diagram includes displaying, within the first routing diagram, a first user-selectable control, a first portion of a particular routable component, a first terminal connected to the particular routable component, and a second terminal connected or connectable to the first terminal. The first user-selectable control corresponds to the first terminal or the second terminal. The functions also include determining, by the processor, a selection of the first user-selectable control occurs while the first routing diagram is displayed on the display. The functions further include displaying, on the display in response to determining the selection of the first user-selectable control occurs while the first routing diagram is displayed on the display, the second routing diagram with a second portion of the particular routable component highlighted.

In a fourth implementation, a computing system is provided. The computing system includes means for displaying a first routing diagram. The first routing diagram is a member of a first set of routing diagrams that includes multiple different routing diagrams. Displaying the first routing diagram includes displaying, within the first routing diagram, a first user-selectable control, a first portion of a particular routable component, a first terminal connected to the particular routable component, and a second terminal connected or connectable to the first terminal. The first user-selectable control corresponds to the first terminal or the second terminal. The computing system also includes means for determining a selection of the first user-selectable control occurs while the first routing diagram is displayed on the display. The computing system further includes means for displaying in response to determining the selection of the first user-selectable control occurs while the first routing diagram is displayed, a second routing diagram with a second portion of the particular routable component highlighted.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 12, FIG. 13, FIG. 14, FIG. 15, and FIG. 16 show a graphical user interface in accordance with one or more of the example implementations.

FIG. 28A and FIG. 28B depict flow charts showing functions of a method in accordance with one or more of the example implementations.

FIG. 29A and FIG. 29B show metadata corresponding to a routing diagram in accordance with one or more of the example implementations.

FIG. 31 and FIG. 32 show tables including metadata corresponding to routing diagrams in accordance with one or more of the example implementations.

All the figures are schematic, not necessarily to scale, and generally only show parts which are necessary to elucidate example embodiments, wherein other parts may be omitted or merely suggested.

DETAILED DESCRIPTION

I. Introduction

This description describes several example implementations that pertain to systems, devices, computer-readable memories, and methods for displaying a routing diagram or a portion of a routing diagram. The routing diagram can represent routable components of a device-under-service (DUS) that are routed throughout different portions of the DUS. The routing diagram can represent other components, i.e., connectable components, of the DUS that operatively connect to the routable components. In at least some implementations, the DUS is a vehicle. In at least some of those implementations or in other implementations, the routable components include electrical circuits, optical communication lines, hydraulic lines, vacuum lines, and/or pneumatic lines. In accordance with those implementations, the routing diagram can include an electrical routing diagram, an optical routing diagram, a hydraulic routing diagram, a vacuum routing diagram, or a pneumatic routing diagram, respectively. In at least some of the implementations, the routing diagram includes a schematic diagram that represents functionality of the routable components and connectable components using graphical symbols rather than real images of the components in the DUS. Although this description refers to a DUS, the systems, devices, computer-readable memories, and methods are operable, arranged and/or performable even if a DUS is not in proximity to the systems, devices or computer-readable memories.

Figure 1:
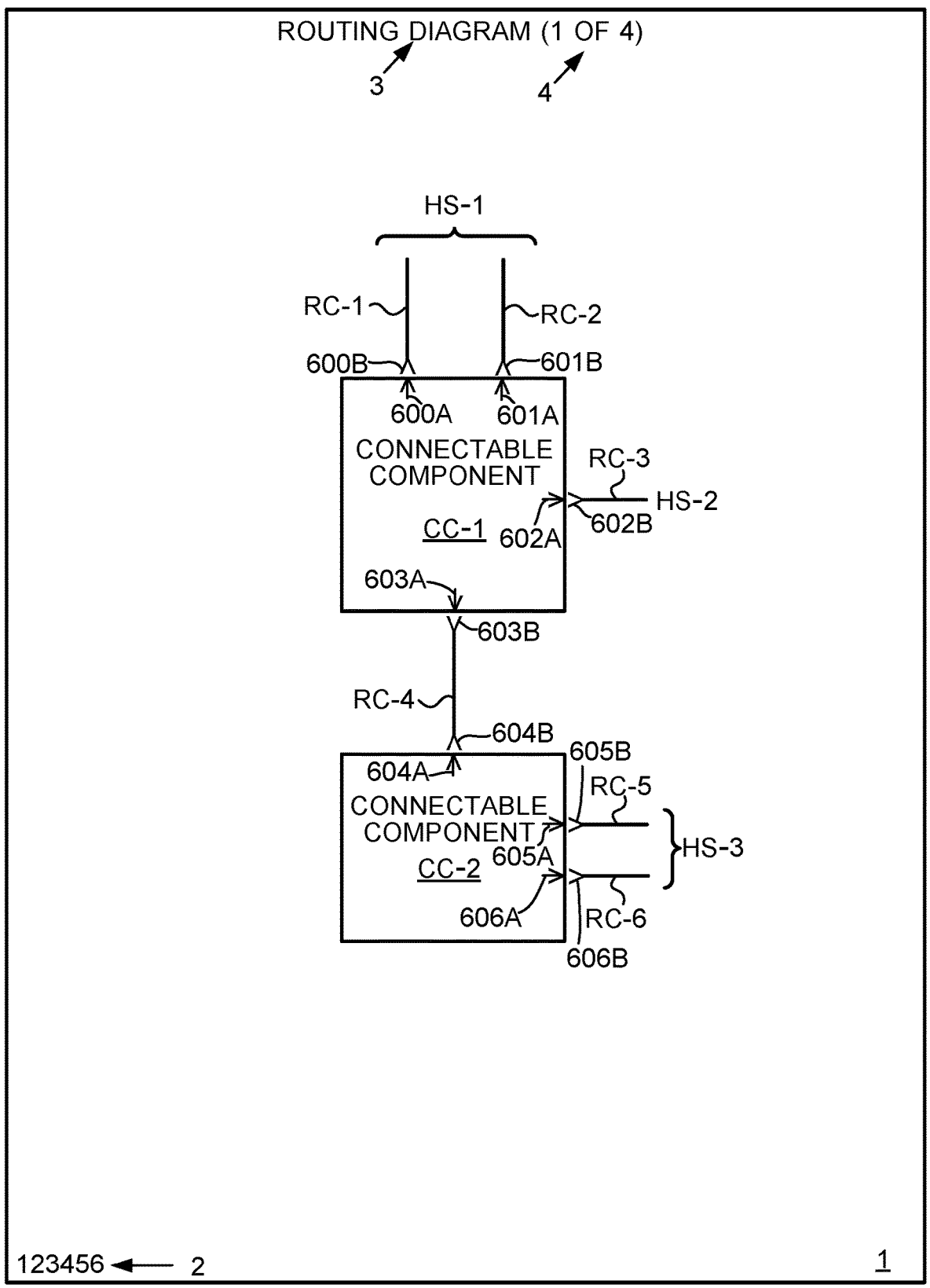
FIG. 1 shows a routing diagram in accordance with one or more of the example implementations.

FIG. 1 shows a routing diagram 1 in accordance with one or more of the example implementations. The routing diagram 1 includes a routing diagram identifier 2. In at least some implementations, the routing diagram identifier 2 is visible on the routing diagram 1, whereas in at least some other implementations, the routing diagram identifier 2 is not visible on the routing diagram 1. Metadata corresponding to the routing diagram 1 can include data indicative of the routing diagram identifier, regardless of whether the routing diagram identifier 2 is visible on the routing diagram 1. The routing diagram 1 includes a textual routing diagram identifier 3 and diagram count 4. The diagram count 4 includes a first number (e.g., the left-most number shown in the diagram count 4) that is indicative of which diagram the routing diagram 1 is within a sequence of diagrams. The diagram count 4 includes a second number (e.g., the right-most number shown in the diagram count 4) that is indicative of the total number of diagrams in a set of routing diagrams including the routing diagram 1. Particular examples of the textual routing diagram identifier 3 and the diagram count 4 are shown in FIG. 17 to FIG. 27.

The routing diagram 1 includes a connectable component CC-1, CC-2, a routable component RC-1, RC-2, RC-3, RC-4, RC-5, RC-6, and a hotspot HS-1, HS-2, HS-3. The connectable component CC1 includes a terminal 600A, 601A, 602A, 603A. The connectable component CC2 includes a terminal 604A, 605A, 606A. The routable component RC-1, RC-2, RC-3, RC-4, RC-5, RC-6 includes a terminal 600B, 601B, 602B, 603B, 604B, 605B, 606B, respectively.

In the drawings, terminals with the same reference number except for the final A or B character are mating terminals. For example, terminal 600A mates with (i.e., connectable to) terminal 600B. Terminals are also shown routing diagrams in FIG. 17 to FIG. 27 and FIG. 33 to FIG. 38. In at least some implementations, each terminal and a portion of a routable component attached to the terminal is contained within a connector. In at least some of those implementation, the connector is connectable to another connector in a harness or to a connectable component. Additionally, the terminal in those implementations can include and/or be a connector pin for electrical routable components, a mechanical splice for optical routable components, a vacuum hose connector for routable components configured to carry a vacuum, a hydraulic line fitting for routable components configured to carry a hydraulic fluid, or a pneumatic line fitting for routable components configured to carry a gas (e.g., air). In at least some implementations, a terminal can be represented in a routing diagram using an arrow head. In at least some other implementations, a terminal can be represented in a routing diagram using a number or letter corresponding to a terminal within a connector.

Figure 2:
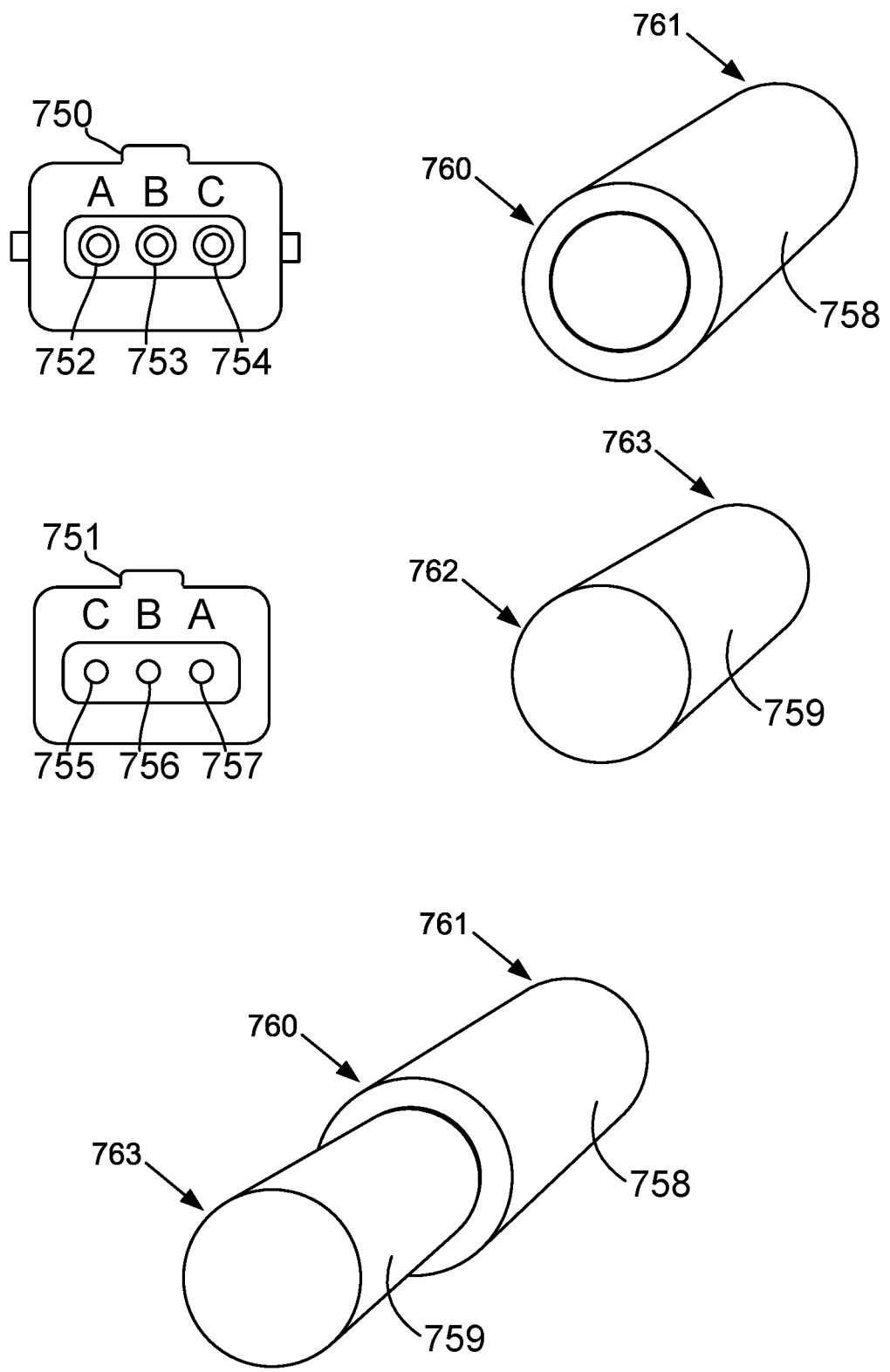
FIG. 2 depict example connectors and terminals in accordance with one or more of the example implementations.

Next, FIG. 2 shows elevation views of a connector 750, 751 in accordance with one or more example implementations. The connector 750 and the connector 751 are connectable together. The connector 750 includes a terminal 752, 753, 754. The connector 751 includes a terminal 755, 756, 757. The terminal 752, 753, 754 is arranged with a receptacle (e.g., a socket). In contrast, the terminal 755, 756, 757 is arranged with a plug insertable into a socket.

FIG. 2 shows a terminal 758, 759. The terminal 758 has a first end 760 and a second end 761. Likewise, the terminal 759 has a first end 762 and a second end 763. At least a portion of the terminal 758, 759 has a circular cross section. A portion of a terminal can have a different shaped cross section, such as a rectangular cross section. The terminal 752, 753, 754 can be arranged like the terminal 758 and the terminal 755, 756, 757 can be arranged like the terminal 759.

FIG. 2 also shows a portion of the terminal 759 after another portion of the terminal 759 (i.e., a portion including the first end 762) has been inserted into the terminal 758. The second end 761, 763 can be configured for attachment to a circuit. As an example, the second end 761, 763 can be configured to be crimped to conductors of a stranded wire. As another example, the second end 761, 763 can be configured to be soldered to conductors of a stranded wire. As yet another example, one or more of the second end 761, 763 can be configured to be soldered to a printed circuit board. The terminal 752, 753, 754, 755, 756, 757, 758, 759 can be referred to as a connector pin.

Returning to the previous drawing, FIG. 1 represents that the routable component RC-4 is connected to and/or connectable to both the connectable component CC-1 and the connectable component CC-2. The hotspot HS-1 is a user-selectable control (USC) that corresponds to the routable component RC-1 and the routable component RC-2. The hotspot HS-2 is a user-selectable control (USC) that corresponds to the routable component RC-3. The hotspot HS-3 is a user-selectable control (USC) that corresponds to the routable component RC-5 and the routable component RC-6.

A hotspot that corresponds to routable component(s) on a first routing diagram can include an indicator. As an example, the indicator within the hotspot can include an icon that represents that the routable component(s) corresponding to the hotspot continue on a second routing diagram of a set of routing diagrams that include the first routing diagram. In at least some implementations, this icon includes a solid-filled arrow head. Other examples of this icon are possible. A diagram identifier within a hotspot can be referred to a destination diagram identifier or a destination routing diagram identifier.

As another example, the indicator within the hotspot can include an icon that represents that the routable component(s) corresponding to the hotspot continue on a second routing diagram of a set of routing diagrams other than the set of routing diagrams that includes the routing diagram with the hotspot. In at least some implementations, this icon includes a triangle filled with an alpha-numeric character. In accordance with those implementations, the other diagram can include a triangular icon filled with the same alpha-numeric character. The use of the same alpha-numeric character in the two triangular icons represents that the routable component(s) corresponding to the icons are different portions of the routable component(s).

A hotspot can include a textual description of the routable component(s) that correspond to the hotspot. Examples of a textual description within a hotspot are shown in FIG. 17 to FIG. 27 and FIG. 33 to FIG. 38.

A hotspot is selectable. As an example, a hotspot displayed on a touchscreen display can be selected using a finger or a stylus. As another example, a hotspot displayed on a display can be selected using a pointing device, such as a computer mouse, a keyboard, or a keypad. A processor can determine that a hotspot is selected and then responsively carry out an action corresponding to the selected hotspot. As an example, a processor can determine one or more components (e.g., a routable component or a connectable component) shown on a second routing diagram corresponding to the hotspot shown on a first routing diagram and then output on a display the second routing diagram with the component highlighted. An aspect within a hotspot, such as an indicator, an icon, or a textual description, is also a hotspot.

For the implementations in which a routing diagram includes an electrical routing diagram, examples of a connectable component (e.g., an electrical component) that can be shown on the routing diagram include a sensor, an electronic control unit (ECU), a motor, a solenoid, a relay, a battery, a pump, a compressor, a fuse, a fuse block, a ground lug, a coil, or a transformer. Additionally, for those implementations, the routable components shown on the routing diagram can represent a copper wire, an aluminum wire, a silver wire, a gold wire, a solid wire, a stranded wire, or a coaxial cable. Other examples of a connectable component and other examples of a routable component on the electrical routing diagram are also possible. Furthermore, the routable components represented on the routing diagram can be arranged as or part of a wiring harness that includes multiple electrical circuits and a wiring harness sleeve that provides for protection of the electrical circuits.

For the implementations in which a routing diagram includes an optical communication line diagram, examples of a connectable component (e.g., an optical component) that can be shown on the routing diagram include a laser, a splitter, a multiplexer, a switch, a receiver, or a photodetector. Additionally, for those implementations, the routable components shown on the routing diagram can represent an optical fiber communication line. The optical fiber communication line can include a glass optical fiber (e.g., a glass optical fiber made from silica) or a plastic optical fiber. Other examples of a connectable component and other examples of a routable component on the optical routing diagram are also possible.

For the implementations in which a routing diagram includes a hydraulic routing diagram, examples of a connectable component (e.g., a hydraulic component) that can be shown on the routing diagram include a pump, a valve, an actuator, a reservoir, a filter, or a pressure switch. Additionally, for those implementations, the routable components shown on the routing diagram can represent a hydraulic hose that meets a Society of Automotive Engineers (SAE) 100R1AT or 100R2AT standard, or a metal line (e.g., a steel or aluminum line). Other examples of a connectable component and other examples of a routable component on the hydraulic routing diagram are also possible.

For the implementations in which a routing diagram includes a vacuum routing diagram, examples of a connectable component (e.g., a vacuum component) that can be shown on the routing diagram include a carburetor, a solenoid valve, an exhaust gas recirculation (EGR) valve, a vacuum pump, or a vacuum reservoir. Additionally, for those implementations, the routable components shown on the routing diagram can represent a rubber hose, a polyvinyl chloride (PVC) hose, or a metal line (e.g., a steel or aluminum line). Other examples of a connectable component and other examples of a routable component on the vacuum routing diagram are also possible.

For the implementations in which a routing diagram includes a pneumatic routing diagram, examples of a connectable component (a pneumatic component) that can be shown on the routing diagram include a compressor, a reservoir, a pressure regulator, a valve (e.g., a solenoid valve), a filter, or an air dehumidifier. Additionally, for those implementations, the routable components shown on the routing diagram can represent a plastic line, a rubber line, a polyurethane line, a PVC line, or a metal line (e.g., a steel or aluminum line). Other examples of a connectable component and other examples of a routable component on the pneumatic routing diagram are also possible.

II. Example Apparatus and Systems

The implementations described in this description pertain to routing diagrams. In at least some of the implementations, the routing diagrams can be stored in a database.

Figure 3:
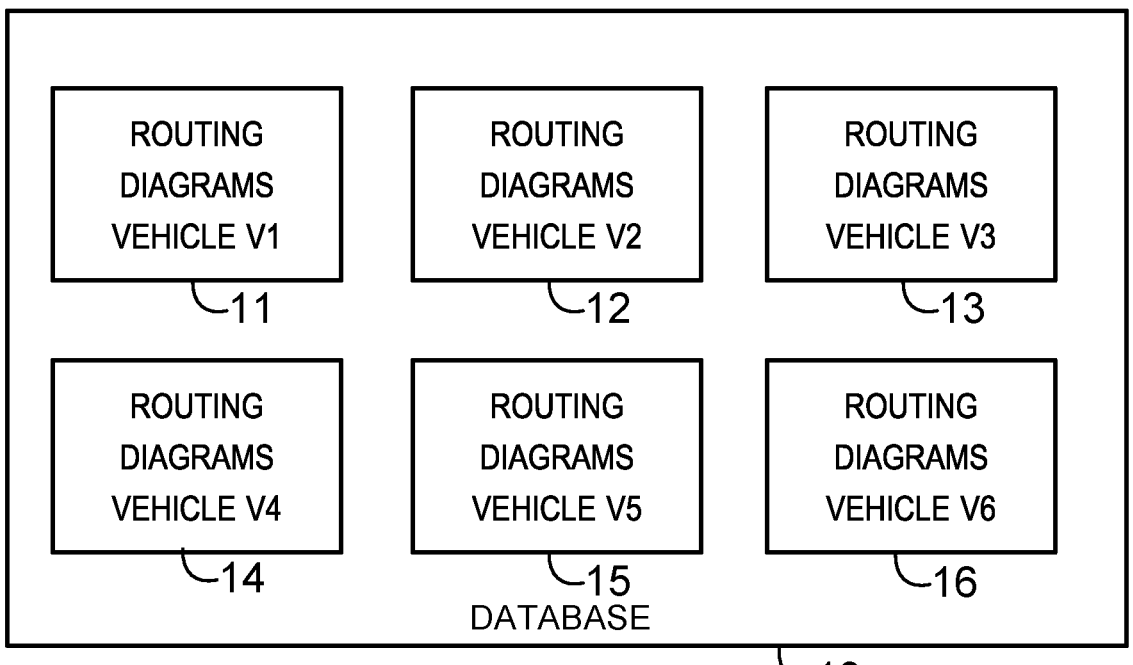
FIG. 3 shows a database in accordance with one or more of the example implementations.

FIG. 3 shows a database 10 in accordance with one or more of the example implementations. In general, the database 10 includes routing diagrams for a quantity of DUS (e.g., one or more DUS). FIG. 3 shows an implementation in which the database 10 includes routing diagrams for six DUS. As shown in FIG. 3, the routing diagrams in the database 10 are for vehicles V1 to V6. In particular, the database 10 includes routing diagrams 11 for a vehicle V1, routing diagrams 12 for a vehicle V2, routing diagrams 13 for a vehicle V3, routing diagrams 14 for a vehicle V4, routing diagrams 15 for a vehicle V5, and routing diagrams 16 for a vehicle V6. Each of the vehicles V1 to V6 can represent vehicles corresponding to one or more YMME, which represents a unique combination of a vehicle year, a vehicle make, a vehicle model, and vehicle engine. Examples of a YMME are described in the section below entitled "Example Vehicle." For purposes of this description, the vehicle V1 is also referred to as a "2014 Acme Mamba 5.7L," where 2014 represents a vehicle year, "Acme" represents a vehicle make, "Mamba" represents a vehicle model, and "5.7L" represents a vehicle engine. The database 10 is not limited to storing routing diagrams nor is it limited to storing routing diagrams for only a single type of DUS. Even so, in accordance with at least some implementations, a database including routing diagrams may include routing diagrams for only a single DUS.

Figure 4:
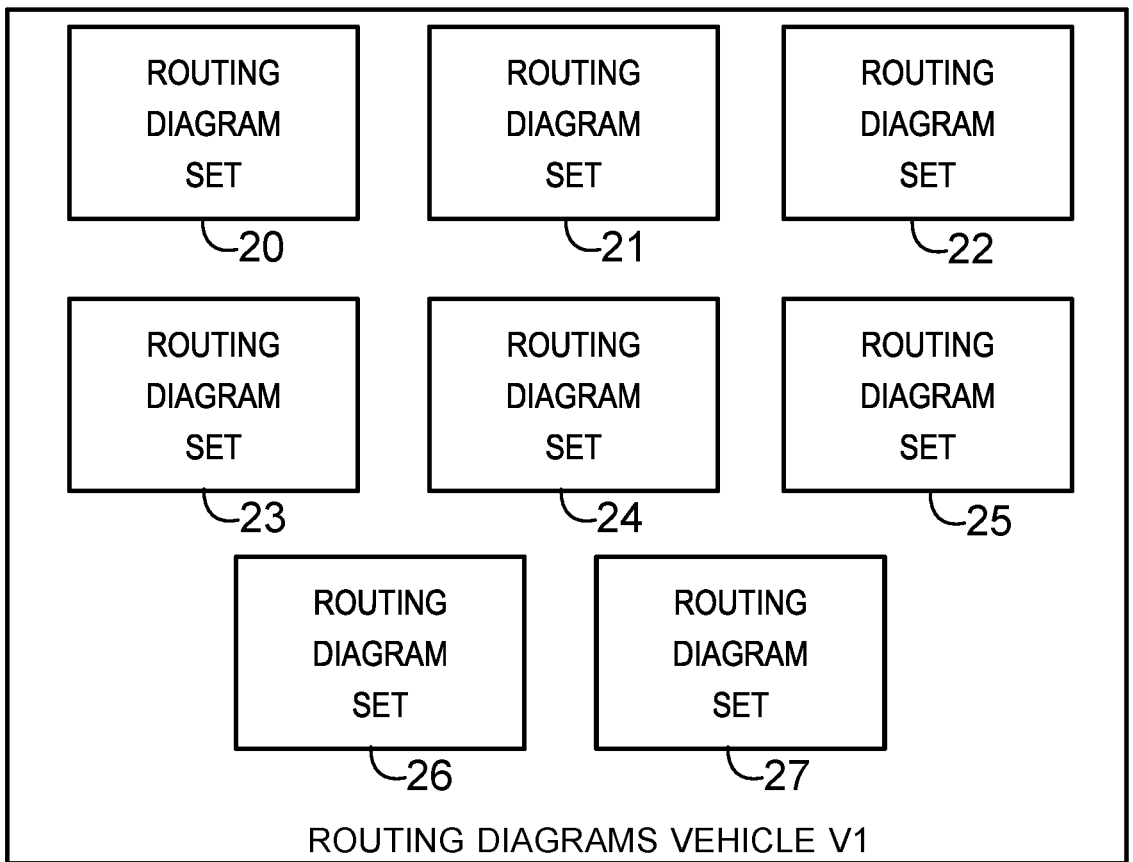
FIG. 4 shows sets of routing diagrams within the database shown in FIG. 3 for a particular vehicle in accordance with one or more of the example implementations.

Next, in at least some implementations, the routing diagrams for a given DUS include one set of routing diagrams. In at least some other implementations, however, the routing diagrams for a given DUS include multiple sets of routing diagrams. For example, as shown in FIG. 4, the routing diagrams 11 for the vehicle V1 include multiple sets of routing diagrams. In particular, the routing diagrams 11 includes a routing diagram set 20, 21, 22, 23, 24, 25, 26, 27. A routing diagram set can be referred to as "RDS" and/or a "set of routing diagrams."

Figure 5:
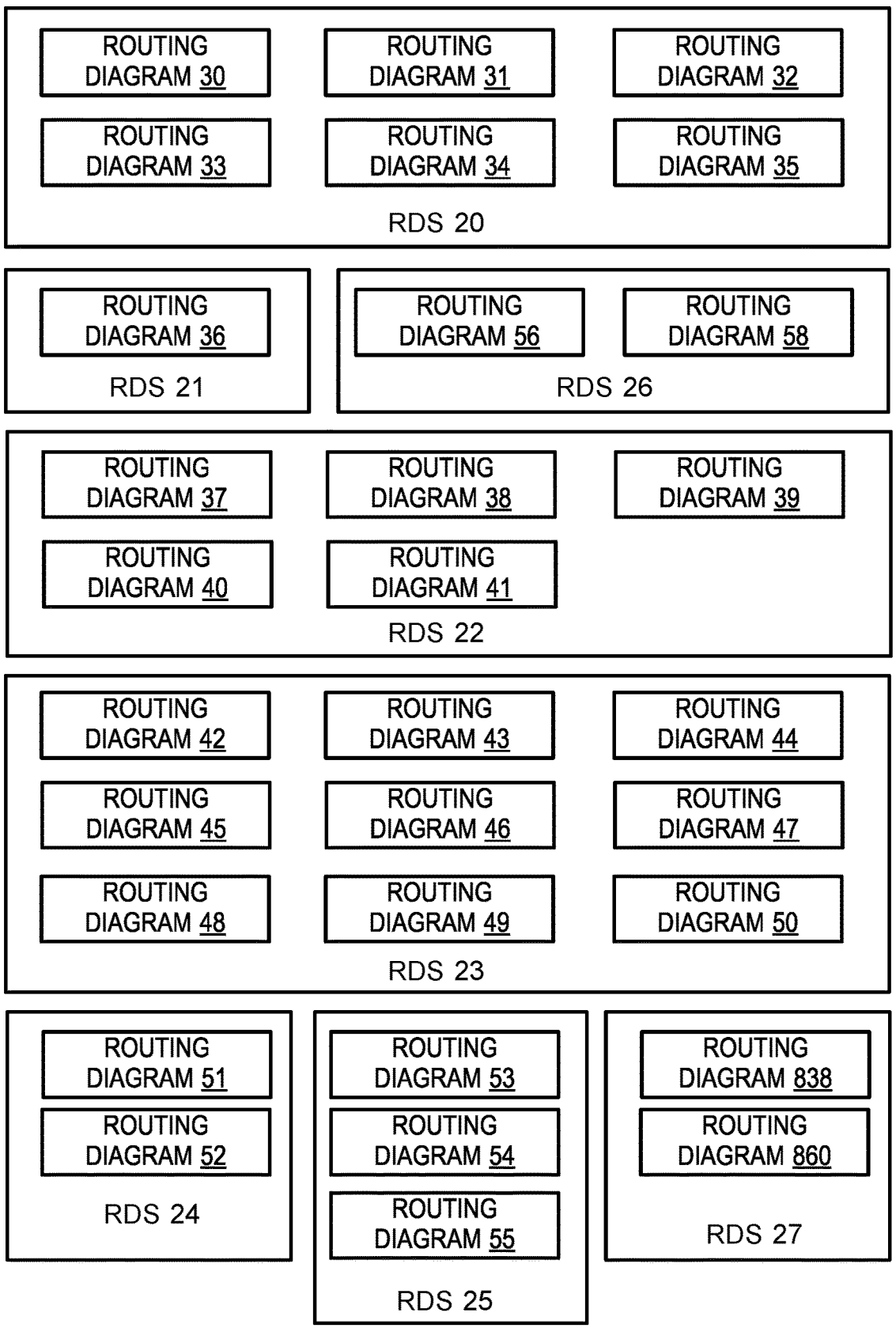
FIG. 5 shows routing diagrams within sets of routing diagrams shown in FIG. 4 in accordance with one or more of the example implementations.

Next, FIG. 5 shows routing diagrams within the routing diagram set 20, 21, 22, 23, 24, 25, 26, 27 in accordance with one or more of the example implementations. As shown in FIG. 5, a routing diagram set can include one or more routing diagrams. The routing diagram set 20 includes a routing diagram 30, 31, 32, 33, 34, 35. The routing diagram set 21 includes a routing diagram 36. The routing diagram set 22 includes a routing diagram 37, 38, 39, 40, 41. The routing diagram set 23 includes a routing diagram 42, 43, 44, 45, 46, 47, 48, 49, 50. The routing diagram set 24 includes a routing diagram 51, 52. The routing diagram set 25 includes a routing diagram 53, 54, 55. The routing diagram set 26 includes a routing diagram 56, 58. The routing diagram set 27 includes a routing diagram 838, 860. In accordance with one or more of the example implementations, the routing diagram set 20, 21, 22, 23, 24, 25, 26, 27 can include routing diagrams that show and/or correspond to a computer data lines in the vehicle V1, interior lamps in the vehicle V1, a starter/charging system in the vehicle V1, a power distribution system in the vehicle V1, a coil pack system in the vehicle V1, a body control module in the vehicle V1, engine vacuum in the vehicle V1, and brake hydraulics in the vehicle V1, respectively. Other examples of components and/or systems that correspond to a routing diagram set are also possible.

Figure 6:
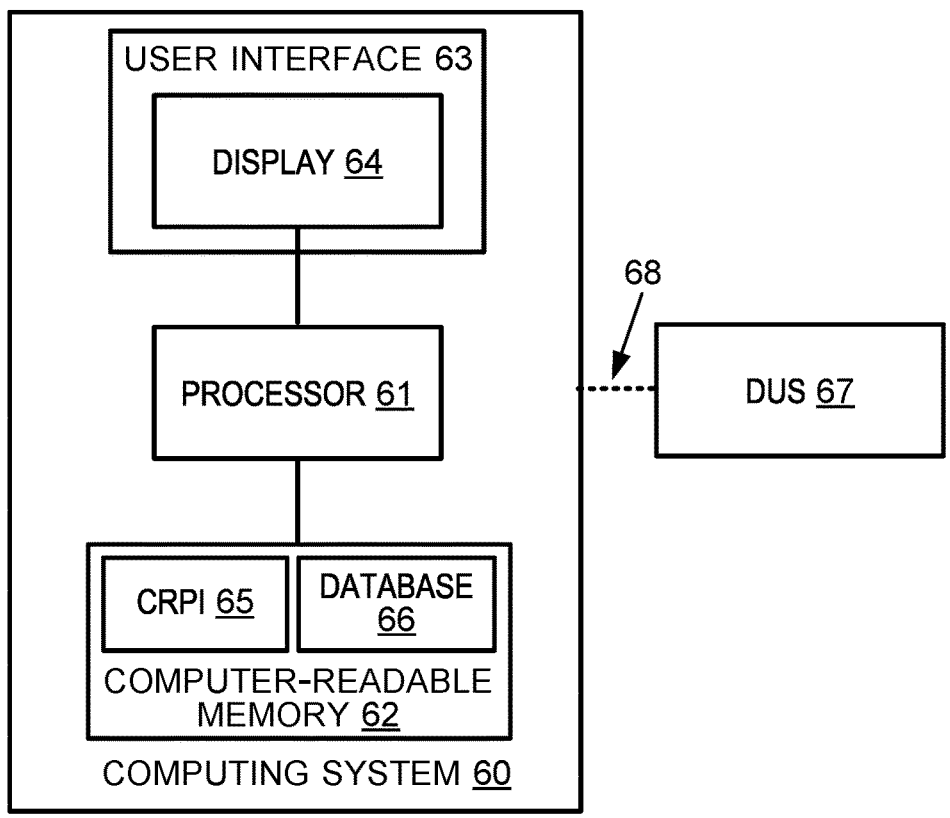
FIG. 6 is a block diagram of a computing system in accordance with one or more of the example implementations.

Next, FIG. 6 shows a computing system 60 in accordance with one or more of the example implementations. The computing system 60 includes a processor 61, a computer-readable memory 62, a user interface 63, and a display 64. Although FIG. 6 shows the display 64 within the user interface 63, in at least some other implementations, the display 64 can be separate from other components of the user interface 63. Computer-readable program instructions (CRPI) 65 and a database 66 are stored on the computer-readable memory 62. In at least some implementations, the database 66 includes routing diagrams for a single DUS. In at least some other implementations, the database 66 includes routing diagrams for multiple different DUS. In accordance with these other implementations, the database 66 can be arranged like the database 10 shown in FIG. 3.

The processor 61 can include one or more processors. In at least some implementations, the processor 61 is contained in a single device that also contains the computer-readable memory 62, the user interface 63, and the display 64. The single device can, for example, include an embedded computing system operable for servicing a DUS, such as a DUS 67. In at least some implementations, the computing system 60 and the DUS 67 are operatively connected via a communication link 68. In those implementations, the processor 61 can transmit communications to the DUS 67 over the communication link 68 and/or receive communications from the DUS 67 over the communication link 68. The DUS 67 includes a serviceable device (or system) for which the database 66 includes routing diagrams. As an example, the DUS 67 can include a vehicle. In these implementations, the computing system 60 can include a communication interface for transmitting a vehicle data message to the DUS 67 and for receiving a vehicle data message from the DUS 67.

The processor 61 can execute the CRPI 65. Execution of the CRPI 65 can cause the computing system 60 to obtain a routing diagram from a database 66 and to output the routing diagram on the display 64. Additionally or alternatively, execution of the CRPI 65 can cause the computing system to request and receive a routing diagram from a server and remote database (such, as the server 71 and the database 72 shown in FIG. 7) and to output the routing diagram on the display 64. Moreover, execution of the CRPI 65 can cause the processor 61 to determine that a hotspot on the displayed routing diagram is selected by use of the user interface 63 and to responsively output on the display 64 a routing diagram corresponding to the hotspot. In some implementations, the routing diagram including the hotspot and the routing diagram corresponding to the hotspot are contained in a single set of routing diagrams. In at least some of those implementations, the routing diagrams in the single set of routing diagrams are arranged as a sequence of drawings. In some other implementations, the routing diagram including the hotspot and the routing diagram corresponding to the hotspot are contained in different sets of routing diagrams. Similarly, those different sets of routing diagrams can include multiple routing diagrams arranged in separate sequences.

Since the database 66 includes routing diagrams, the computing system 60 is operable to display routing diagrams while the computing system 60 is not connected to a communication network and/or the interne. For implementations in which the computing system 60 further includes a communication interface for communicating over a communication network (e.g., the communication network 73 shown in FIG. 7), the computing system 60 can download different and/or additional routing diagrams while the computing system 60 is connected to a communication network including a database with the different and/or additional routing diagrams.

Figure 7:
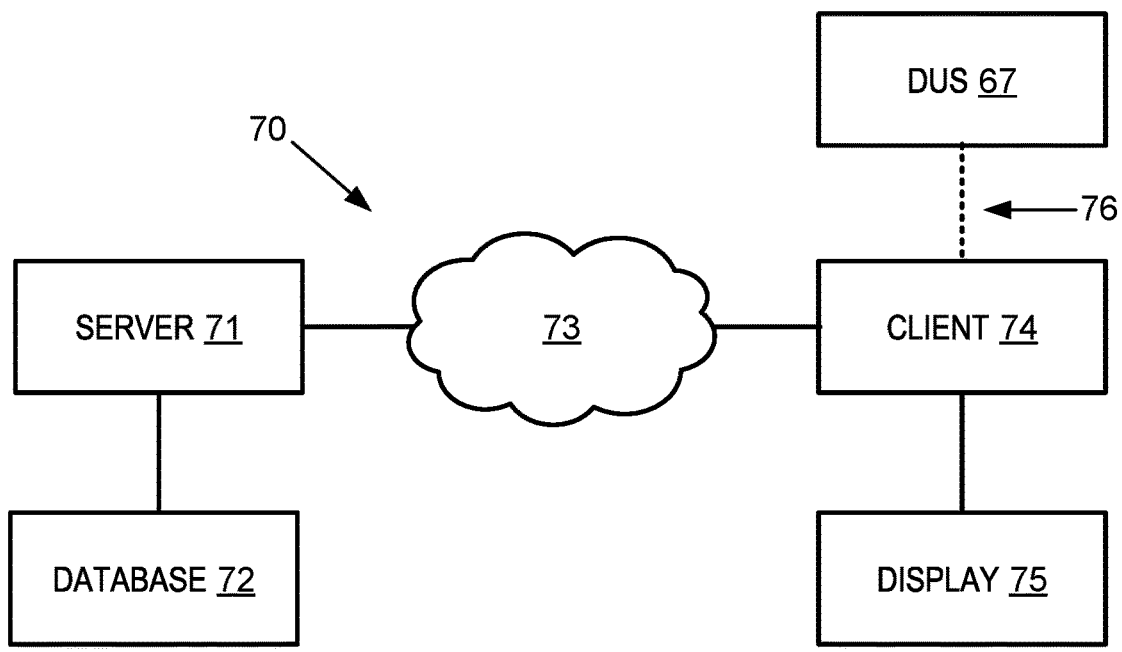
FIG. 7 shows a network architecture in accordance with one or more of the example implementations.

Next, FIG. 7 shows a network architecture 70 in accordance with one or more of the example implementations. The network architecture 70 includes a server 71, a database 72, a communication network 73, a client 74, and a display 75. Similar to FIG. 6, the DUS 67 can be operatively connected to the client 74 via a communication link 76. The database 72 can include and/or be arranged like the database 10 shown in FIG. 3. The database can be stored in a computer-readable memory, such as the computer-readable memory 62 shown in FIG. 6.

The communication network 73 can include a wide area network (WAN) such as the internet. The communication network 73 can carry communications between the server 71 and the client 74. As an example, a communication between the server 71 and the client 74 can include a communication comprising a request from the client 74 for the server 71 to provide the client with a routing diagram. As another example, a communication between the server 71 and the client 74 can include a communication comprising a routing diagram and metadata regarding the routing diagram. As yet another example, a communication between the server 71 and the client 74 can include a communication comprising information that can be used in and/or as a jump instruction that corresponds to a hotspot selected from a routing diagram displayed on the display 75. Other examples of a communication between the server 71 and the client 74 are possible, some of which are described in this description. The communication network 73 can carry communications using a wireless communication standard, such as any wireless communications standard described in this description, and/or using a wired communication standard, such as any wired communications standard described in this description.

Figure 8:
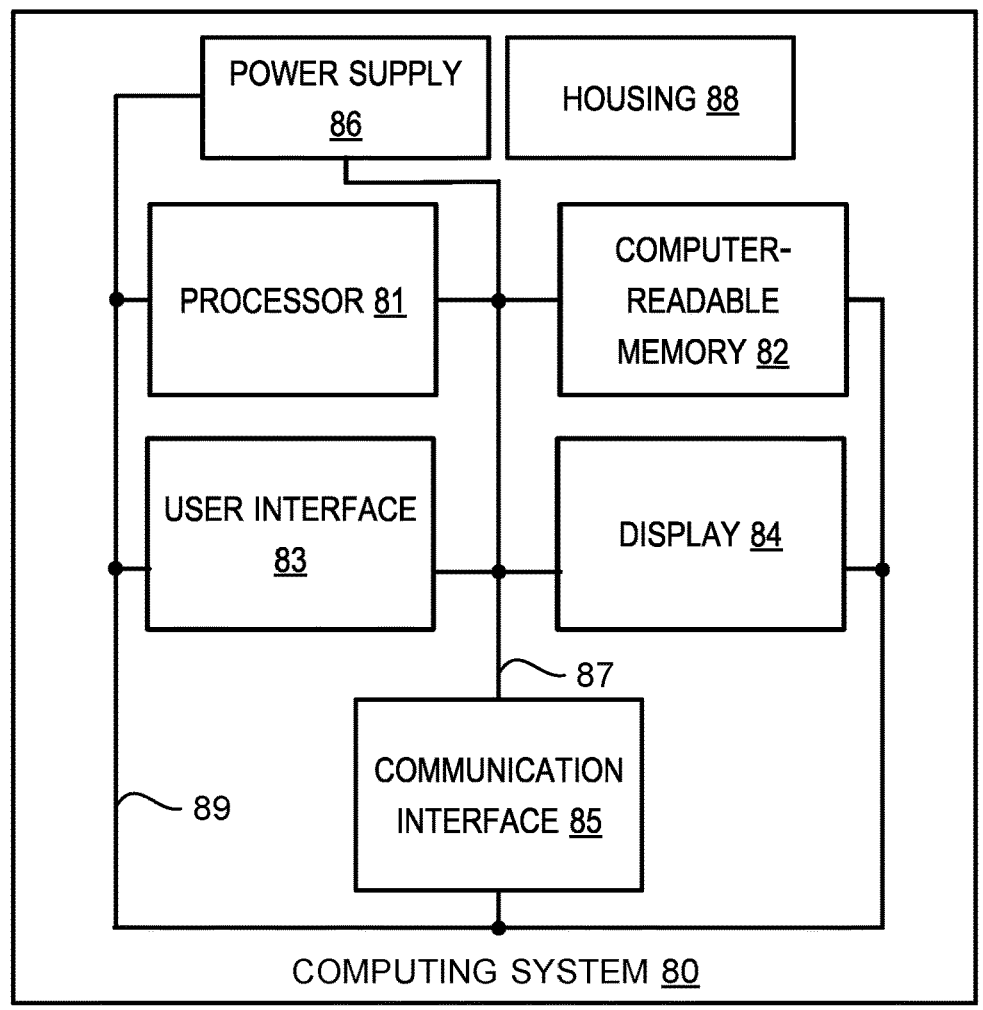
FIG. 8 is a block diagram of a computing system in accordance with one or more of the example implementations.

Next, FIG. 8 is a block diagram of a computing system 80 in accordance with one or more of the example implementations. The computing system 80 includes a processor 81, a computer-readable memory 82, a user interface 83, a display 84, a communication interface 85, a power supply 86, and/or a housing 88. The computing system 80 can also include a data bus 87 to operatively couple two or more of the following together: the processor 81, the computer-readable memory 82, the user interface 83, the display 84, the communication interface 85 or the power supply 86. The computing system 80 can also include an electrical circuit 89 to operatively couple the power supply 86 to the processor 81, the computer-readable memory 82, the user interface 83, the display 84, and the communication interface 85. The computing system 60 shown in FIG. 6 can be arranged like the computing system 80. The computing system 80 can operate within the network architecture 70 like the computing system 60 and/or the client 74.

In at least some implementations, the communication interface 85 includes a vehicle communication transceiver. The vehicle communication transceiver can be operable to transmit and/or receiver a vehicle data message according to a vehicle data message protocol, such as any vehicle data message protocol described in this description. In these implementations, the communication interface 85 can request and receive a vehicle data message including an identifier of a DUS (e.g., a vehicle). The identifier of the DUS can include a vehicle identification number. The identifier of the DUS can be used to request a routing diagram corresponding to that DUS.

Figure 9:
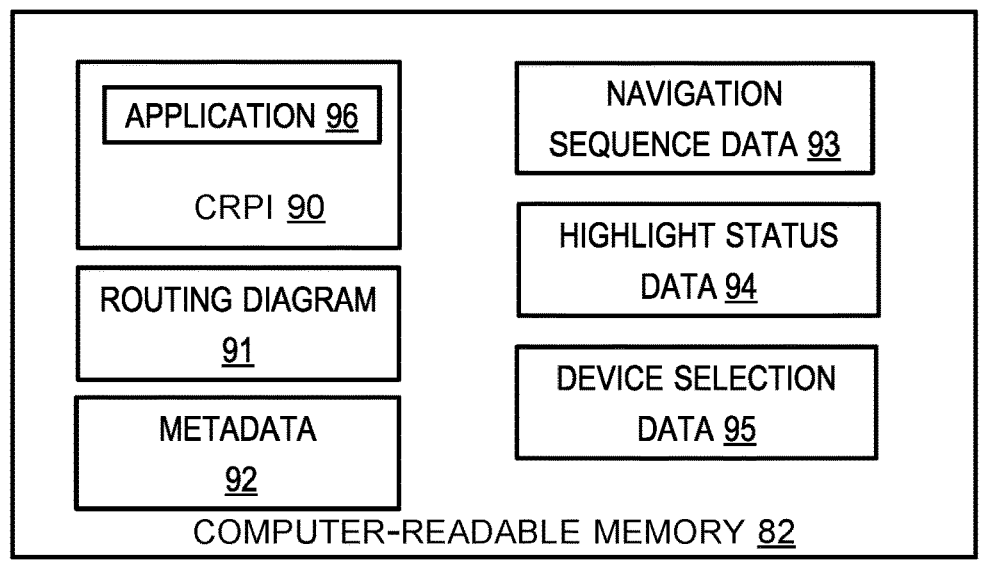
FIG. 9 shows content stored in memory of the computing system shown in FIG. 8 in accordance with one or more of the example implementations.

Next, FIG. 9 shows content of the computer-readable memory 82 in accordance with one or more of the example implementations. As shown in FIG. 9, the computer-readable memory 82 includes CRPI 90, a routing diagram 91, metadata 92, navigation sequence data 93, highlight status data 94, and/or device selection data 95. Other examples of data stored in the computer-readable memory 82 are also possible.

The CRPI 90 can comprise a plurality of program instructions. The CRPI 90 and any other CRPI described in this description can include data structures, objects, programs, routines, or other program modules that can be accessed by and executed by a processor. The CRPI 65 shown in FIG. 6 can include any or all of the CRPI 90.

In general, the CRPI 90 can include program instructions to cause the computing system 80 to perform any function described herein as being performed by the computing system 80 or to cause any component of the computing system 80 to perform any function herein as being performed by that component of the computing system 80. As an example, the CRPI 90 can include program instructions to perform the functions of the flow chart 410 shown in FIG. 28A, the flow chart 400 shown in FIG. 28B, and/or each, any or all of the functions to carry out the example operation and functionality discussed in the section entitled "Example Operation," below.

As another example, the CRPI 90 can include program instructions that are executable by the processor 81 to display a routing diagram within the routing diagram 91 on the display 84. In at least some implementations, execution of these program instructions can cause the processor 81 to output to the display a GUI that includes the routing diagram within the routing diagram 91 such that displaying the routing diagram includes displaying the GUI that includes the routing diagram. As an example, execution of these program instructions can cause the processor 81 to output the GUI 241 (shown in FIG. 15 and FIG. 16) on the display 84.

As yet another example, the CRPI 90 can include program instructions that are executable by the processor 81 to request a routing diagram from the server 71, 100 (shown in FIG. 10) and to receive a routing diagram from the server 71, 100. Execution of those program instructions can cause the routing diagram received from the server 71, 100 to be stored in the routing diagram 91 and/or to display the routing diagram received from the server 71, 100 on the display 84.

As yet another example, the CRPI 90 can include program instructions that are executable by the processor 81 to determine a selection of a routable component or a connectable component shown on a routing diagram displayed on the display 84 has occurred. In response to determining that selection, if the selected component is currently un-highlighted, the processor 81 can execute additional program instructions to cause the selected component to be highlighted. Alternatively, in response to determining the selection of the routable or connectable component, if the selected component is currently highlighted, the processor 81 can execute additional program instructions to cause the selected component to be un-highlighted.

As yet another example, the CRPI 90 can include program instructions that are executable by the processor 81 to modify the highlight status data 94 each time a component on a routing diagram is selected to be highlighted or un-highlighted.

As yet another example, the CRPI 90 can include program instructions that are executable by the processor 81 to receive a selection of a hotspot shown on a routing diagram displayed on the display 84 and to responsively display a routing diagram that corresponds to the selected hotspot.

Figure 30:
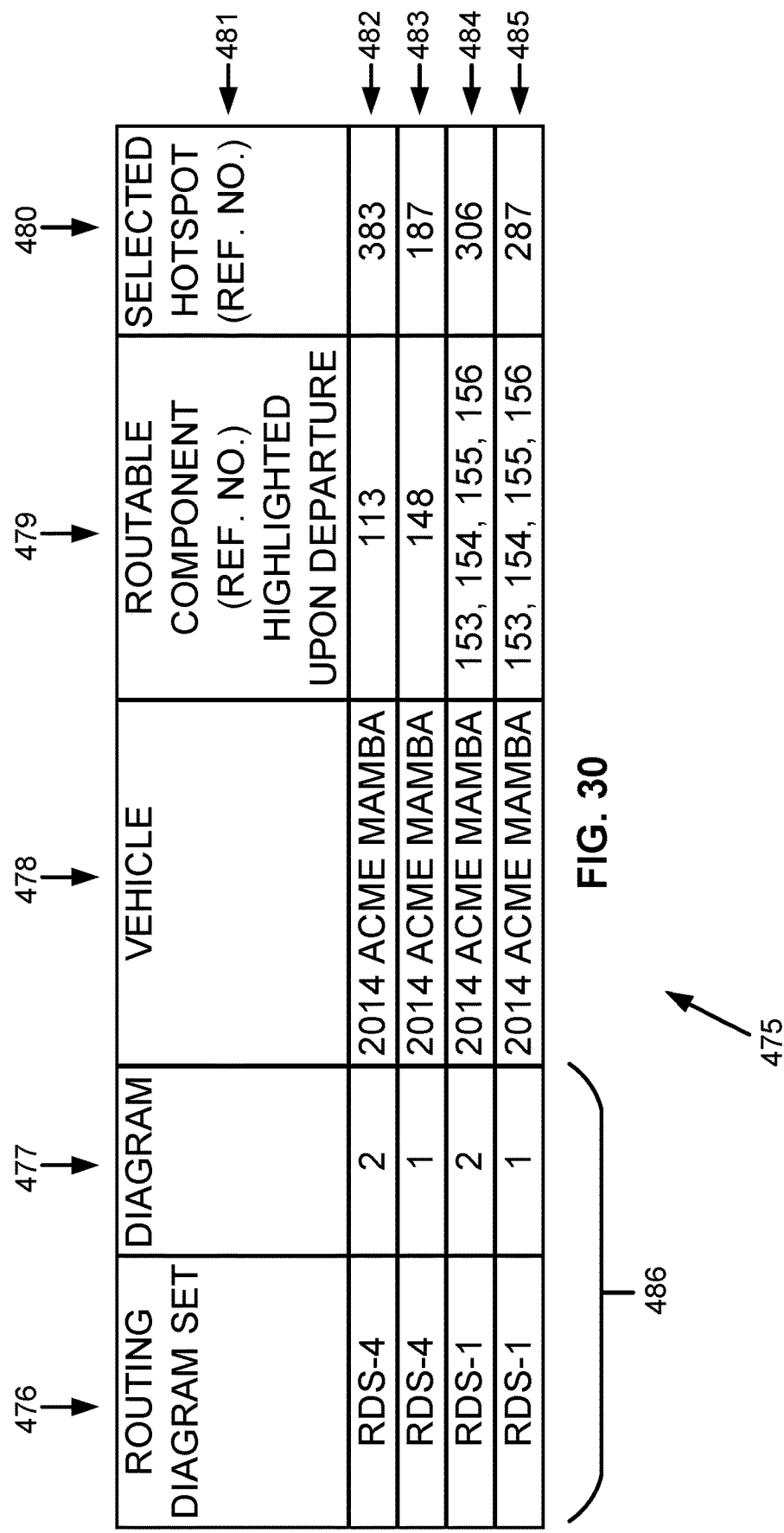
FIG. 30 is a table showing navigation sequence data and highlight status data pertaining to displaying routing diagrams in accordance with one or more of the example implementations.

As yet another example, the CRPI 90 can include program instructions that are executable by the processor 81 to determine a routing diagram that corresponds to a hotspot selected from a routing diagram displayed on the display 84. In at least some implementations, the processor 81 determines the routing diagram from metadata corresponding to the hotspot. As an example, the metadata can be internal to the routing diagram and/or internal to a routing diagram file that includes the routing diagram including the hotspot. As another example, the metadata can be external to the routing diagram and external to a routing diagram file that includes the routing diagram. FIG. 30 shows metadata the processor 81 can use to determine the routing diagram that corresponds to a selected hotspot.

As yet another example, the CRPI 90 can include program instructions that are executable by the processor 81 to request from the server 71, 100 a routing diagram that corresponds to a hotspot selected from a routing diagram currently displayed on the display 84. The processor 81 can transmit a request and/or cause a request to be transmitted to the server 71, 100 in order to request the routing diagram that corresponds to the hotspot. In at least some implementations, the request includes an identifier of the routing diagram (i.e., a routing diagram identifier) that corresponds to the hotspot. As an example, the routing diagram identifier includes a routing diagram like the routing diagram identifier 271, 273, 281, 301, 321, 331, 274, 57, 59, 839, 861 shown in FIG. 17 to FIG. 23, FIG. 33, FIG. 34, FIG. 36, FIG. 37. As yet another example, the routing diagram identifier can include an identifier of a routing diagram set and an identifier of a particular routing diagram within the routing diagram set. In at least some implementations, the identifier of a routing diagram set can be based on a textual routing diagram identifier (e.g., a textual routing diagram identifier 3 shown in any of FIG. 17 to FIG. 27 or FIG. 33 to FIG. 38) and the identifier of a particular routing diagram within the routing diagram set can include a diagram count (e.g., a diagram count 4 shown in any of FIG. 17 to FIG. 27 or FIG. 33 to FIG. 38). As still yet another example, the routing diagram identifier can include an identifier of a hotspot identifier that corresponds to the hotspot that corresponds to the routing diagram.

As yet another example, the CRPI 90 can include program instructions that are executable by the processor 81 to modify the navigation sequence data 93 each time another routing diagram is selected to be displayed on the display 84 and/or each time another routing diagram is displayed on the display 84. In at least some implementations, the CRPI 90 can include program instructions that are executable by the processor 81 to stop tracking a navigation sequence of routing diagrams for a particular DUS after a different DUS is selected and/or identified using the computing system 80. In at least some of those implementations, stopping the tracking can include deleting or overwriting the navigation sequence data 93 for the particular DUS.

As still yet another example, the CRPI 90 can include program instructions arranged as an application 96. In at least some implementations, the application 96 includes a web-browser application. The application 96 (e.g., the web-browser application) can be configured to request the server 71, 100 to provide data stored in the database 72 or in the computer-readable memory 102. The application 96 (e.g., the web-browser application) can be used to display data received from the server 71, 100 on the display 84. In at least some implementations, the application 96 (e.g., the web-browser application) can be operable to perform the other functions that are described herein as being performable by execution of the CRPI 90.

The routing diagram 91 can include one or more routing diagrams. In implementations, in which the routing diagram 91 includes one routing diagram, that one routing diagram can include a routing diagram that the server 71, 100 provides to the computing system 80 in response to a request for a routing diagram. The request for the routing diagram can include a request for an initial routing diagram for a particular DUS. Alternatively, the request for the routing diagram can include a request for a different routing diagram for the particular DUS. In at least some occurrences, the request for a different routing diagram for the particular DUS is sent by the processor 81 in response to determining that a hotspot on a currently displayed routing diagram is selected. In still at least some other occurrences, the request for a different routing diagram for the particular DUS is sent by the processor 81 in response to determining that an identifier corresponding to a previously displayed routing diagram is selected (e.g., the identifier 264, 265, 266, 267 shown in FIG. 16). FIG. 32 shows examples of routing diagram identifiers that can be included within the request for a different routing diagram.

In at least some implementations, the request for a different routing diagram includes a DUS identifier. In those or in at least some other implementations, the server 71, 100 tracks a most-recent DUS identifier received from the computing system 80 such that the request for a different routing diagram implies that the requested for routing diagram is for a DUS corresponding to the most-recent DUS identifier unless the request for a different routing diagram includes a different DUS identifier.

In at least some implementations in which the routing diagram 91 includes only one routing diagram, the routing diagram 91 includes only one routing diagram that can be displayed on the display 84 without having to request another routing diagram from the server 71, 100. Accordingly, in these implementations, a routing diagram previously displayed on the display 84 could still be stored in the computer-readable memory 82, but the processor 81 is not operable to display the previously displayed routing diagram still stored in the computer-readable memory 82. For these implementations, to display the previously displayed routing diagram, the computing system 80 has to request the previously displayed routing diagram from the server 71, 100.

In implementations in which the routing diagram 91 includes more than one routing diagram, the routing diagram 91 can include one or more sets of routing diagrams. Each of those set(s) of routing diagrams includes one or more routing diagrams.

In accordance with at least some implementations, the routing diagram 91 includes a routing diagram that includes one or more connectable components, one or more routable components, a portion of one or more routable components, and/or one or more hotspots. The hotspot(s) correspond to a different routing diagram. The hotspot(s) are and/or include user-selectable control(s).

In accordance with at least some implementations, the routing diagram 91 includes an electrical wiring diagram. The connectable component within the electrical wiring diagram includes an electrical component. The routable component or portion of the routable component within the electrical wiring diagram represents an electrical circuit or a portion of an electrical circuit. The different routing diagram corresponding to the hotspot in the electrical wiring diagram can be a different electrical wiring diagram or some other type of routing diagram described in this description.

In accordance with at least some implementations, the routing diagram 91 includes an optical communication line diagram. The connectable component within the optical communication line diagram includes an optical component. The routable component or portion of the routable component within the optical communication line diagram can represents an optical communication line or a portion of an optical communication line. The different routing diagram corresponding to the hotspot in the optical communication line diagram can be a different optical communication line diagram or some other type of routing diagram described in this description.

In accordance with at least some implementations, the routing diagram 91 includes a hydraulic line diagram. The connectable component within the hydraulic line diagram includes a hydraulic component. The routable component or portion of the routable component within the hydraulic line diagram represents a hydraulic line or a portion of a hydraulic line. The different routing diagram corresponding to the hotspot in the hydraulic line diagram can be a different hydraulic line diagram or some other type of routing diagram described in this description.

In accordance with at least some implementations, the routing diagram 91 includes a pneumatic line diagram. The connectable component within the pneumatic line diagram includes a pneumatic component. The routable component or portion of the routable component within the pneumatic line diagram represents a pneumatic line or a portion of a pneumatic line. The different routing diagram corresponding to the hotspot in the pneumatic line diagram can be a different pneumatic line diagram or some other type of routing diagram described in this description.

In accordance with at least some implementations, the routing diagram 91 includes a vacuum line diagram. The connectable component within the vacuum line diagram includes a vacuum component. The routable component or portion of the routable component within the vacuum line diagram represents a vacuum line or a portion of a vacuum line. The different routing diagram corresponding to the hotspot in the vacuum line diagram can be a different vacuum line diagram or some other type of routing diagram described in this description.

In accordance with at least some implementations, a routing diagram within the routing diagram 91 includes at least two different types of connectable components selected from among an electrical component, an optical component, a hydraulic component, a pneumatic component, or a vacuum component, and includes at least two different types of routable components selected from an electrical circuit, an optical communication line, a hydraulic line, a pneumatic line, or a vacuum line.

In accordance with at least some implementations, the routing diagram 91 includes a graphics file. In at least some implementations, the graphics file can include a vector graphics file. As an example, the vector graphics file can be formatted as an SVG (Scalable Vector Graphics) file, an EPS (Encapsulated PostScript) file, a PDF (Portable Document Format) file, an AI (Adobe Illustrator Artwork) file, or a DXF (Drawing eXchange Format) file. In accordance with at least some other implementation(s), the graphics file include a raster graphics file. As an example, the raster graphics file can be formatted as a BMP (bitmap) file, a TIF (Tagged Image File) file, a JPG (Joint Photographic Group) file, a JPEG (Joint Photographic Experts Group) file, a GIF (Graphical Interchange Format) file, or a PNG (Portable Network Graphic) file. Other examples of the vector graphics file and/or the raster graphics files are possible.

The metadata 92 can include a variety of metadata (i.e., data about data). As an example, the metadata 92 can include metadata corresponding to a routing diagram. In some implementations, the metadata corresponding to a routing diagram is internal metadata contained within a routing diagram file that includes the routing diagram. In some other implementations, the metadata corresponding to a routing diagram is external metadata contained outside of a routing diagram file that includes the routing diagram. FIG. 29A and FIG. 29B show metadata in the form of external metadata contained outside of a routing diagram file. As shown in FIG. 29A and FIG. 29B, the external metadata can include metadata corresponding to multiple routing diagrams.

As another example, the metadata 92 can include data indicative of user-selections made with respect to a routing diagram and/or a DUS. For instance, the metadata 92 can include a DUS identifier. Additionally or alternatively, the metadata 92 can include identifiers of a routing diagram selected to be displayed, a routable component or a connectable component selected from within a displayed routing diagram, and/or a state of whether a routable component or connectable component was highlighted at a time when the display 84 switches from displaying a currently displayed routing diagram (which subsequently becomes a departure routing diagram) to displaying a different routing diagram. A portion of the metadata 92 can include a routing diagram identifier in the form of metadata shown in FIG. 32. Other examples of the metadata 92 are also possible.

The navigation sequence data 93 can include data that indicates a sequence of routing diagrams displayed on the display 84. The sequence of displayed routing diagrams can include a currently displayed routing diagram and one or more previously displayed routing diagrams. In at least some implementations, the navigation sequence data 93 is no longer tracked for a particular DUS after a different DUS is selected. In at least some of those implementations, the navigation sequence data 93 for the particular DUS is deleted and/or overwritten by navigation sequence data corresponding to the different DUS. In some other implementations, the navigation sequence data for the particular DUS continues to be tracked for some amount of time after the different DUS is selected. An advantage of these other implementations, is that a user can use the navigation sequence data 93 to select a previously displayed routing diagram and to cause that routing diagram to be displayed without having to re-select the particular DUS. FIG. 30, described below, includes a table showing navigation sequence data pertaining to displaying routing diagrams in accordance with one or more of the example implementations. A previously displayed routing diagram can be referred to as a departure routing diagram.

The highlight status data 94 can include data that indicates which component(s) on a routing diagram currently displayed on the display 84 are highlighted. The highlight status data 94 can also include data that indicates which component(s) were highlighted on a routing diagram previously displayed on the display 84 at a time when a hotspot on the routing diagram was selected. The highlight status data 94 can therefore represent a snapshot and/or screenshot of a departure routing diagram that is no longer displayed after the hotspot was selected. In response to selecting that departure routing diagram (or an identifier of that departure diagram) from a routing diagram history (e.g., the routing diagram history 237 shown in FIG. 16), the processor 81 can cause the selected departure routing diagram to be displayed on the display 84 as that departure routing diagram appeared when the hotspot was selected therefrom.

In at least some implementations, the highlight status data 94 is no longer tracked for a particular DUS after a different DUS is selected. In at least some of those implementations, the highlight status data 94 for the particular DUS is deleted and/or overwritten by highlight status data corresponding to the different DUS. In some other implementations, the highlight status data for the particular DUS continues to be tracked for some amount of time after the different DUS is selected.

An advantage of these other implementations, is that the processor 81 can use the highlight status data 94 to highlight component(s) on a routing diagram (previously displayed) when that routing diagram is selected to be displayed again without the user having to select those component(s) again. A benefit of storing and referring to the highlight status data 94 is that the processor 81 can cause a selected routing diagram to be displayed again (i.e., with particular component(s) highlighted) in the same way the routing diagram was displayed at a time a hotspot within that routing diagram was selected. FIG. 30, described below, includes a table showing highlight status data pertaining to displaying routing diagrams in accordance with one or more of the example implementations.

The device selection data 95 can include data indicative of a DUS. The processor 81 can use the device selection data 95 to populate a GUI 160 (shown in FIG. 12) and to determine the data indicative of a DUS based on selections on the GUI 160 through use of the user interface 83. The DUS indicated by the device selection data 95 can be connected to the computing system 80. Alternatively, the DUS indicated by the device selection data 95 is not connected to the computing system 80.

In at least some implementations, the processor 81 uses the data indicative of a DUS to determine a routing diagram (e.g., one or more routing diagrams) and/or a set of routing diagrams (e.g., one or more sets of routing diagrams) from within the routing diagram 91. In at least some other implementations, the processor 81 uses the data indicative of a DUS to request from a server (e.g., the server 71 or the server 100 shown in FIG. 10) a routing diagram (e.g., one or more routing diagrams) and/or a set of routing diagrams (e.g., one or more sets of routing diagrams) from within the routing diagram 111 (shown in FIG. 11).

Figure 10:
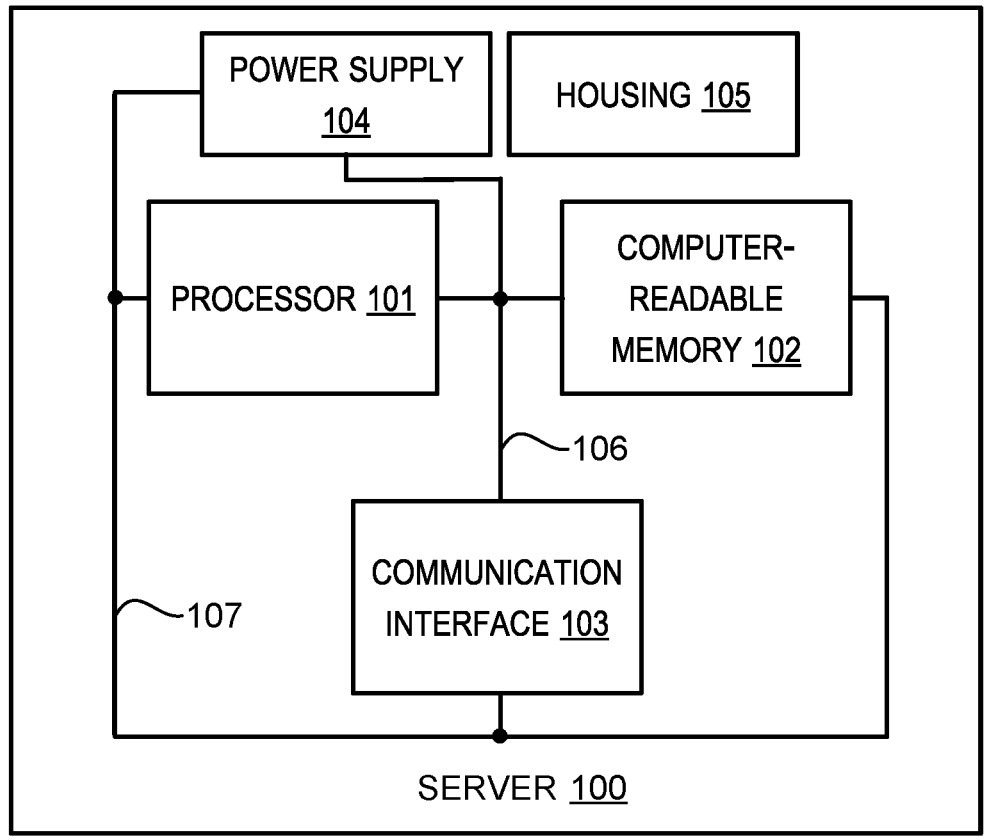
FIG. 10 is a block diagram of a server in accordance with one or more of the example implementations.

Next, FIG. 10 is a block diagram of a server 100 in accordance with one or more of the example implementations. The server 100 includes a processor 101, a computer-readable memory 102, a communication interface 103, a power supply 104, and/or a housing 105. The server 100 can also include a data bus 106 to operatively couple the processor 101, the computer-readable memory 102, the communication interface 103, and/or the power supply 104 to each other. The server 100 can also include an electrical circuit 107 to couple the power supply 104 to the processor 101, the computer-readable memory 102, and/or the communication interface 103. The server 71 can be arranged like the server 100. The server 100 can operate within the network architecture 70 like, in place of, and or in addition to the server 71.

Figure 11:
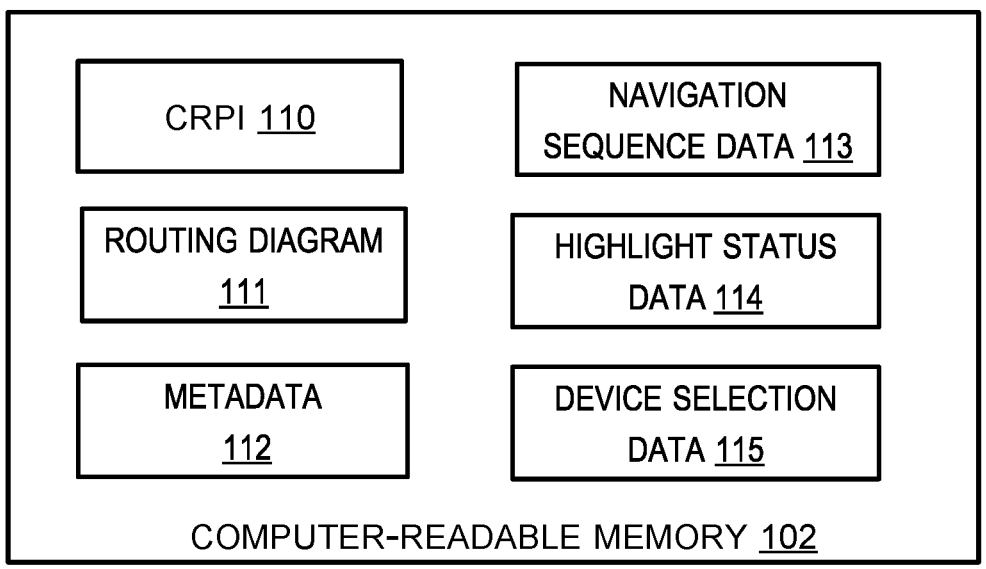
FIG. 11 shows content stored in memory of the server shown in FIG. 10 in accordance with one or more of the example implementations.

Next, FIG. 11 shows content of the computer-readable memory 102 in accordance with one or more of the example implementations. As shown in FIG. 11, the computer-readable memory 102 includes computer-readable program instructions (CRPI) 110, a routing diagram 111, metadata 112, navigation sequence data 113, highlight status data 114, and/or device selection data 115. Other examples of data stored in the computer-readable memory 102 are also possible.

The CRPI 110 can include one or more program instructions executable by the processor 101. In general, the CRPI 110 includes program instructions to cause the server 100 to perform any function described herein as being performed by the server 100 or to cause any component of the server 100 to perform any function described and/or shown herein as being performed by that component of the server 100.

As an example, the CRPI 110 can include program instructions that are executable by the processor 101 to serve one or more client computing systems like the client 74. One or more of the client computing systems that are served by the processor 101 executing the CRPI 110 can include and/or be arranged like the computing system 80.

As yet another example, the CRPI 110 can include program instructions that are executable by the processor 101 to output data for displaying a GUI (e.g., a GUI 160, 201, 228, 241 shown in FIG. 12 to FIG. 16) on the display 84. As an example, that data can include a markup language file, such as a hyper-text markup language page or file including a GUI, a routing diagram within the routing diagram 111, metadata from the metadata 112, navigation sequence data from the navigation sequence data 113, highlight status data from the highlight status data 114 and/or device selection data from the device selection data 115. The device selection data output for displaying a GUI can be device selection data used to populate the GUI 160 shown in FIG. 12.

As yet another example, the CRPI 110 can include program instructions that are executable by the processor 101 to receive a request for a routing diagram (i.e., a routing diagram request), determine a routing diagram to output in response to the request, and to output the routing diagram to the computing system that requested the routing diagram. As an example, the request for a routing diagram can include a DUS identifier and an identifier of a component or system within a DUS corresponding to the DUS identifier. That request can also include an identifier of the computing system 80 that requested the routing diagram. As another example, the request for a routing diagram can include a routing diagram identifier (e.g., a routing diagram identifier in a form shown in FIG. 32. Similarly, this request can also include an identifier of the computing system 80 that requested the routing diagram.

As yet another example, the CRPI 110 can include program instructions that are executable by the processor 101 to determine a routing diagram based on a routing diagram request received from a computing system 80. Execution of those program instruction can cause the processor 101 to refer to metadata, such as the metadata shown in FIG. 32 to determine a routing diagram. For example, assuming that the metadata shown in FIG. 32 corresponds to a DUS identifier included within the request and the request includes an identifier of a coil pack system, the processor 101 can determine that the routing diagram 51, 52 correspond to that DUS and system. Execution of the program instructions can cause the processor 101 to output one of the routing diagram 51, 52 in response to the request. As another example, assuming that the metadata shown in FIG. 32 corresponds to a DUS currently identified for the computing system and request includes a particular identifier of a routing diagram set and a particular identifier of a routing identifier (e.g., (22, 2) shown in FIG. 32), the processor 101 can determine that the routing diagram 38 should be output in response to the request.

As yet another example, the CRPI 110 can include program instructions that are executable by the processor 101 to output a routing diagram to the computing system 80. Execution of those program instructions can cause the processor 101 to provide the routing diagram to the communication interface 103 which, in turns, transmits the routing diagram over the communication network 73 to the computing system 80. In at least some implementations, outputting the routing diagram includes outputting a GUI that includes the routing diagram, such as a GUI 241 shown in FIG. 15 and FIG. 16. In at least some other implementations, outputting the routing diagram includes outputting a routing diagram file that can be populated into a GUI, such as the GUI 241, and metadata corresponding to the routing diagram file. That metadata can include metadata indicating which component(s) in the routing diagram are to be highlighted when initially displayed.

As yet another example, the CRPI 110 can include program instructions that are executable by the processor 101 to output to the computing system 80 data that indicates which routable component(s) and/or connectable component(s) on a routing diagram are to be highlighted when that routing diagram is displayed again on the display 84.

The routing diagram 111 includes one or more routing diagrams. As an example, the routing diagram 111 can include the routing diagrams described as being within the database 10 shown in FIG. 3. As another example, the routing diagram 111 can include the routing diagrams described as being within the routing diagrams 11 shown in FIG. 4. As yet another example, the routing diagram 111 can include the routing diagrams shown in FIG. 5, FIG. 17, FIG. 18, FIG. 19, FIG. 20, FIG. 21, FIG. 22, and/or FIG. 23.

The metadata 112 can include metadata corresponding to and/or included within the routing diagram 111, the navigation sequence data 113, the highlight status data 114, and/or the device selection data 115. The metadata 112 can include metadata received from multiple computing systems. That metadata can be arranged like the metadata 92 shown in FIG. 9.

The navigation sequence data 113 can include navigation sequence data for one or more computing systems. The navigation sequence data for each of the one or more computing systems can be arranged like the navigation sequence data 93 shown in FIG. 8.

The highlight status data 114 can include highlight status data for one or more computing systems. The highlight status data for each of the one or more computing systems can be arranged like the highlight status data 94 shown in FIG. 8.

The device selection data 115 can include device selection data corresponding to one or more DUS and one or more computing systems. The device selection data 115 can include data for populating a GUI (e.g., the GUI 160 shown in FIG. 12) from which a device (e.g., a DUS) can be selected.

III. Example Components of Apparatus and System

1. Processor

A processor, such as the processor 61, the processor 81, the processor 101, or any other processor discussed in this description, can include one or more processors. Any processor discussed in this description can thus be referred to as "at least one processor" and/or "one or more processors." Any processor discussed in this description can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore, any processor discussed in this description can include and/or be operatively connected to a memory controller that controls a flow of data going to and from a memory, such as the processor 61 including and/or being operatively coupled to the computer-readable memory 62, the processor 81 including and/or being operatively coupled to the computer-readable memory 82, and/or the processor 101 including and/or being operatively coupled to the computer-readable memory 102. In at least some implementations of the server 100, the INTEL® multicore microprocessor can include one or more INTEL® XEON® processors having between four and twenty-eight cores.

Any processor discussed in this description can be operable to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be operable to read a computer-readable file, such as a markup language file, a flat file, a comma-separated-variable (CSV) file, a portable document format (PDF) file, or a text file. Any processor discussed in this description can be operable to execute hard-coded functionality in addition to or as an alternative to software-coded functionality (e.g., via CRPI).

In at least some implementations, the processor 81 can be programmed to perform any function(s) described in this description as being performed by the computing system 60, the client 74, and/or the computing system 80. Similarly, in at least some implementations, the processor 101 can be programmed to perform any function(s) described in this description as being performed by the server 71 and/or the server 100.

An embedded processor refers to a processor with a dedicated function or functions within a larger electronic, mechanical, pneumatic, optical, vacuum, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can, but need not necessarily, include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

2. Memory

A memory, such as the computer-readable memory 62, the computer-readable memory 82, the computer-readable memory 102, and/or any other memory discussed in this description, can include one or more memories. Any memory discussed in this description can thus be referred to as "at least one memory" and/or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be configured as a removable storage device, a non-removable storage device, or a combination thereof. A removable storage and/or a non-removable storage device can, but need not necessarily, include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI provided over a communication network, such as the communication network 73.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. User Interface

A user interface, such as the user interface 63, the user interface 83 or any other user interface described in this description, can include one or more user interface components. A user interface component can be operable by a user to enter an input (e.g., data and/or a selection) to the computing system 80 and/or to provide an output, such as a visual, audible, or haptic output. Unless stated otherwise, an input entered via the user interface 63, 83 is and/or can be provided to the processor 61, 81, respectively. In at least some implementations, the user interface 63, 83 is operable to enter an input on and/or using a graphical user interface (GUI). As an example, the input entered on and/or using the GUI can include a selection of a connectable component, a component identifier, a routable component, or a hotspot. Those selectable items can be located on a routing diagram shown on the GUI. Examples of those selectable items are discussed throughout this application.

In at least some implementations, the user interface 83 includes a keyboard having one or more components configured for entering data and/or a selection into the computing system 80. The keyboard can include one or more keys. In at least some implementations, each key includes a push button, such as a press-and-hold button or a press-and-release button. In at least some implementations, at least a portion of the keyboard is implemented as part of a touch screen display that includes soft keys, such as capacitive or resistive keys of a touch screen display. In still other implementations, the soft keys of the keyboard on the touch screen display can include a power on/off key, a yes key and a no key, and/or four directional cursor keys (such as left, up, right, down keys). The keyboard can, but need not necessarily, include a QWERTY keyboard. In at least some implementations, the user interface 83 includes a pointing device such as a computing device mouse, a joystick, and/or or a microphone for receiving spoken inputs. In at least some implementations, the user interface 83 includes a camera and one or more user-selectable controls for capturing an image, such as an image of a code representing a DUS identifier.

4. Display

A display, such as the display 64, the display 84, or any other display described in this description, can include one or more displays. As an example, a display can include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can include a backlit, color LCD. The display 64, 84 can include a touch screen display with the LCD. For instance, the display 64, 84 can include a capacitive or resistive touch screen display. Other examples of the display 64, 84 are also possible. The touch screen display can be operable for entering an input to select any item shown on the display 64, 84. The processor 81 can determine each, any, or all selection(s) made using the touch screen display.

In some implementations, the display 84 is configured to display a GUI. In at least some of those implementations, the GUI can be displayed in response to the processor 81 executing the application 96. In those or in other implementations, the GUI can be arranged like a GUI or some portion of a GUI shown in any one or more of FIG. 12 to FIG. 16. In at least some of those implementations or in other implementations, the display 84 is configured to display a routing diagram, such as any routing diagram described in this description or shown in the drawings. Further, in at least some of the implementations, the display 84 is configured to display a still image (such as a visible light image, a thermal image, and/or a blended image), a video, a text file (such as a text file with a PDF file extension or an XML file extension), a hypertext markup language file, a web page, a menu, and/or some other visual content configured to be displayed on a display. The display 84 can be a component of the user interface 83.

5. Communication Interface

A communication interface, such as the communication interface 85, the communication interface 103, and/or any other communication interface described in this description, can include one or more communication interfaces operable to transmit data to one or more other devices including a communication interface and/or to receive data transmitted by one or more other device including a communication interface. In some implementations, the communication interface 85, 103 transmits data directly to the other device(s) and/or receives data directly from the other device(s). In some other implementations, the communication interface 85, 103 transmits data indirectly to the other devices and/or receives data indirectly from the other device(s). The data transmitted or received by the communication interface 85, 103 can be carried by a communication network, such as the communication network 73.

The communication interface 85, 103 can include one or more transceivers. Each transceiver includes one or more transmitters configured to transmit data onto a network, such as the communication network 73, a data bus, and/or some other type of connection mechanism. Each transceiver includes one or more receivers configured to receive data or a communication carried over a network, such as the communication network 73, a data bus, and/or some other type of connection mechanism. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, 802.11n or 802.11ac), (ii) an IEEE® 802.15 standard (e.g., 802.15.1, 802.15.3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a network, such as the communication network 73, or a data bus, such as the data bus 87 or the data bus 106. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification, or some other wired communication standard. In accordance with at least some implementations, an electrical circuit can include a wire, a printed circuit on a substrate, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". As an example, transmission of data over the conductor can occur electrically and/or optically.

A transceiver that is configured to carry out communications over the communication network 73 can include a modem, a network interface card, a local area network (LAN) on motherboard (LOM), and/or a chip mountable on a circuit board. As an example the chip can include a CC3100 Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

A network device within and/or operatively coupled to the communication network 73 and/or that communicates via the communication network 73 using a packet-switched technology can be locally configured for a next 'hop' in the communication network 73 (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

The data transmitted by a communication interface can include a destination identifier or address of a computing system to which the data is to be transmitted. The data or communication transmitted by a communication interface can include a source identifier or address of the computing system including the communication interface. The source identifier or address can be used to send a response to the computing system that includes the communication interface that transmitted the data.

6. Power Supply

A power supply, such as the power supply 86, the power supply 104, and/or any other power supply described in this description can be arranged in various configurations. As an example, the power supply 86 and/or the power supply 104 can include circuity to receive AC current from an AC electrical supply (e.g., electrical circuits operatively connected to an electrical wall outlet) and a converter to convert the AC current to a DC current for supplying to one or more of the components of the computing system 80 or the server 100, respectively. As another example, the power supply 86 and/or the power supply 104 can include a battery or be battery operated. As yet another example, the power supply 86 and/or the power supply 104 can include a solar cell or be solar operated. The power supply 86 can include and/or operatively connect to electrical circuits arranged to distribute electrical current throughout the power supply 86 and/or the computing system 80. Likewise, the power supply 104 can include and/or operatively connect to electrical circuits arranged to distribute electrical current throughout the power supply 104 and/or the server 100. Other examples of the power supply 86 and/or the power supply 104 are also possible.

7. Housing

A housing, such as the housing 88, the housing 105, and/or any other housing described in this description, can be configured in any of a variety of configurations. In at least some implementations of the server 100, the housing 105 surrounds and/or supports at least a portion of one other component of the server 100. For example, the housing 105 can surround and/or support at least a portion of the processor 101, the computer-readable memory 102, the communication interface 103, and/or the power supply 104. Similarly, in at least some implementations of the computing system 80, the housing 88 surrounds and/or supports at least a portion of one other component of the computing system 80. For example, the housing 88 can surround and/or support at least a portion of the processor 81, the computer-readable memory 82, the user interface 83, the display 84, the communication interface 85, and/or the power supply 86. A housing can be made from various materials. In some example implementations, at least a portion of the housing is made from a plastic material (e.g., acrylonitrile butadiene styrene (ABS)). In those or in other implementations, at least a portion of the housing is metallic.

IV. Example Graphical User Interfaces

The computing system 80 is operable to display a GUI. In at least some implementations, a GUI displayed by the computing system 80 includes an interface that is operable to enter criteria for selecting a device, such as a DUS. In at least some implementations, a GUI that includes the interface operable to enter criteria for selecting a device also includes a container for displaying a routing diagram.

Figure 12:
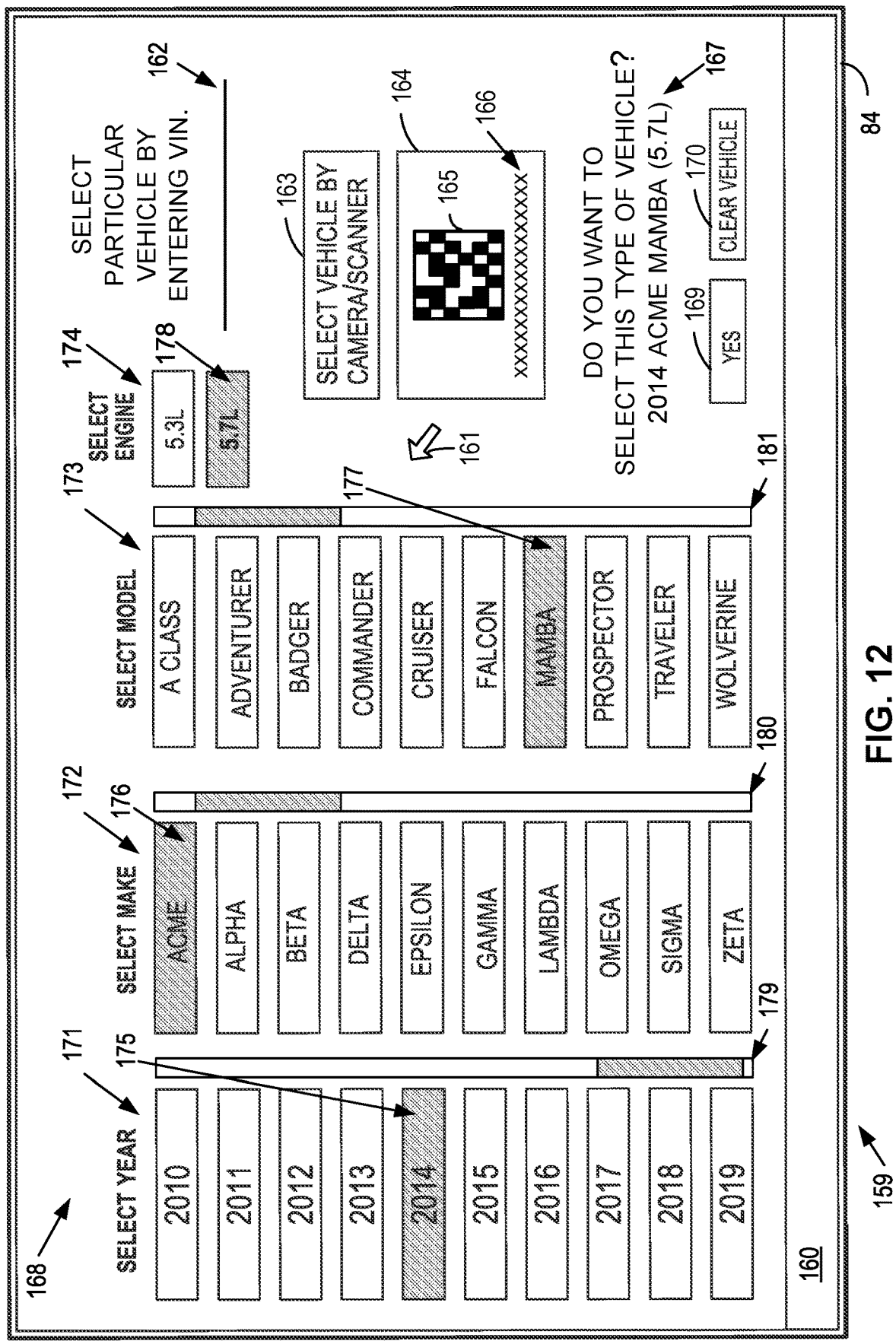

FIG. 12 shows a screen shot 159 of the display 84 while the display 84 is displaying a GUI 160. The GUI 160 includes a device selection menu 168. A device selection menu, such as the device selection menu 168, includes one or more user-selectable controls operable to provide a processor with a signal indicative of a selection of a characteristic of the device. In some implementations, the characteristic of the device is an identifier of the device itself such that no other characteristic needs to be entered to distinguish the device from other devices. In other implementations, the characteristic of the device is one of multiple characteristics a processor uses to distinguish the device from other devices. The device selection menu 168 includes user-selectable controls to select characteristics of a device in the form of a vehicle.

The GUI 160 can include a cursor 161 movable to point to a USC or another item of the GUI 160. The processor 81 can detect the USC or the other item of the GUI 160 is selected when the cursor 161 is disposed on the USC or the other item of the GUI 160. The other GUIs shown in the figures can also include a cursor, similar to the cursor 161, for use in selecting an item of that GUI. For implementations in which the display 84 includes a touch screen display, the GUIs shown in FIG. 12 to FIG. 16 may or may not include a cursor.

As shown in FIG. 12, the GUI 160 includes a year selection menu 171 in which a year USC 175 representing the year 2014 has been selected. The GUI 160 includes a make selection menu 172 in which a make USC 176 representing a make Acme has been selected. The GUI 160 includes a model selection menu 173 in which a model USC 177 representing the model Mamba has been selected. The makes and models shown in FIG. 8 are fictitious. In practice, the makes and models would include real vehicle makes and models. The GUI 160 includes an engine selection menu 174 in which an engine USC 178 representing a 5.7 L engine has been selected. The year selection menu 171 includes a scroll bar 179 to cause the year selection menu 171 to display year(s) not currently shown in the year selection menu 171. Similarly, the make selection menu 172 includes a scroll bar 180 to cause the make selection menu 172 to display make(s) not currently shown in the make selection menu 172. Likewise, the model selection menu 173 includes a scroll bar 181 to cause the model selection menu 173 to display model(s) not currently shown in the model selection menu 173. Other examples of a selected year, make, model, and engine are also possible.

In at least some implementations, the make selection menu 172 is populated with vehicle makes after a year is selected from the year selection menu 171. Similarly, in at least some implementations, the model selection menu 173 is populated with vehicle models after a year is selected from the year selection menu 171 and after a make is selected from the make selection menu 172. Similarly, in at least some implementations, the engine selection menu 174 is populated with engine identifiers after a model is selected from the model selection menu 173 is populated with vehicle models after a year is selected from the year selection menu 171 and after a make is selected from the make selection menu 172. In alternative implementations, each of the year selection menu 171, the make selection menu 172, the model selection menu 173, or the engine selection menu 174 is in a separate GUI without the other of the year selection menu 171, the make selection menu 172, the model selection menu 173, and the engine selection menu 174.

In at least some implementations, the GUI 160 also includes a VIN USC 162 for entering an identifier of a particular vehicle. As an example, the VIN USC 162 can be used to type or key-in a vehicle identification number (VIN) associated with the particular vehicle. As another example, the VIN USC 162 can be used to cause the communication interface 85 to request a VIN from an ECU in the particular vehicle. The processor 81 can receive the requested VIN and determine one or more from among a year, a make, a model, an engine or a serial number corresponding to the particular vehicle from the VIN.

The GUI 160 includes a vehicle selector USC 163 for capturing a visual indication of a particular vehicle. As an example, in response to selection of the vehicle selector USC 163, the processor 81 can cause a camera of the user interface 83 to capture an image, such as an image of a code 165 representing a VIN, and to cause a GUI, such as the GUI 160 or a different GUI, to display a window 164 showing the image of code 165 and to display a representation of the alpha-numeric representation of the VIN 166 as determined by the processor 81 decoding the code 165. As yet another example, in response to selection of the vehicle selector USC 163, the processor 81 can cause a scanner of the user interface 83 to generate an image, such as an image of the code 165, and to cause a GUI, such as the GUI 160 or a different GUI, to display the window 164 showing the image of the code 165 and to display a representation of the alpha-numeric representation of the VIN 166 as determined by the processor 81 decoding the code 165.

The GUI 160 also includes a USC 169 to select a device (e.g., a vehicle) based on YMME criteria entered using the GUI 160 and indicated by a vehicle identifier 167. The GUI 160 further includes a USC 170 to clear the vehicle identifier 167 and the YMME criteria entered using the GUI 160 so that a user can select different YMME criteria for a desired vehicle type.

Figure 13:
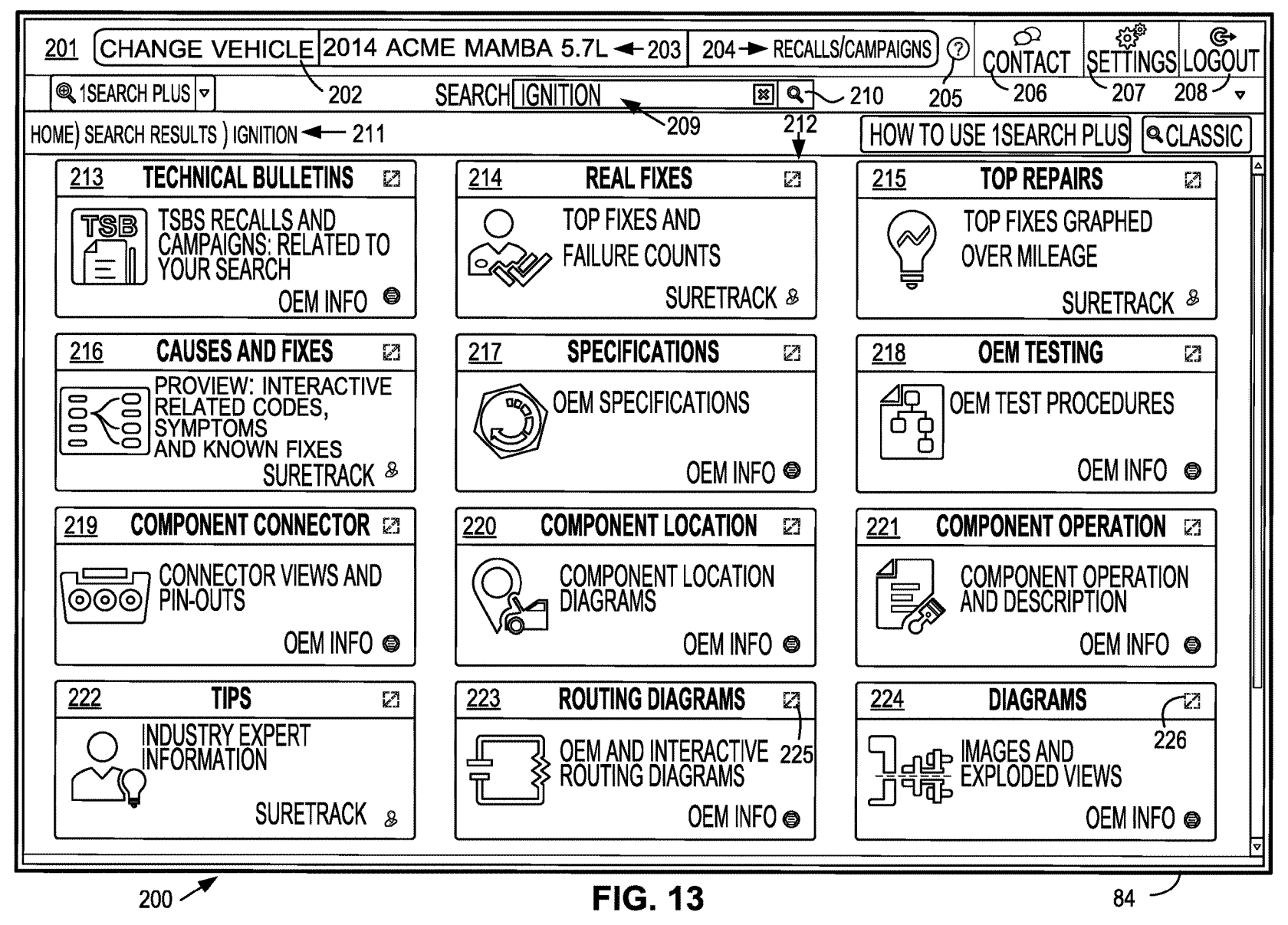

Next, FIG. 13 shows a screen shot 200 of the display 84 while the display 84 is displaying a GUI 201. As shown in FIG. 13, the GUI 201 includes a DUS GUI selector 202, a selected DUS identifier 203, a recalls/campaigns GUI selector 204, a help GUI selector 205, a contact GUI selector 206, a settings GUI selector 207, a logout GUI selector 208, a further search field 209, a search USC 210, a search result identifier 211, and a set of content selectors 212. In at least some implementations, a content selector of the set of content selectors 212 is selectable from the display 84 and the GUI 201. In at least some of those implementations, selection of a content selector causes a processor to expand a size of a container including the selected content selector on the display 84. In at least some other of those implementations, selection of a content selector causes a processor to display a different GUI on the display 84. In at least some other implementations, a content selector of the set of content selectors 212 can be un-selectable from the display 84 and the GUI 201 if content corresponding to that content selector is not available.

The DUS GUI selector 202 is selectable to cause the processor 81 to enter a mode for changing which DUS is identified in the selected DUS identifier 203. In some implementations, entering this mode can include clearing the selected DUS identifier 203 so that no DUS is indicated by the selected DUS identifier 203. In at least some implementations, entering this mode can include the processor 81 outputting a menu from which a DUS can be selected and entering an identifier of the selected DUS into the selected DUS identifier 203. In at least some implementations, selection of the DUS GUI selector 202 causes a processor 81 to output the GUI 160 shown in FIG. 12.

The selected DUS identifier 203 is selectable to cause the processor 81 to output an identifier of a selected DUS on the display 84. In accordance with the implementations, in which the DUS includes a vehicle, the selected DUS identifier 203 can indicate a year/make/model/engine (YMME) or some other type of vehicle identifier. Other types of identifiers can be used for other types of DUS.

The recalls/campaigns GUI selector 204 is selectable to cause the processor 81 to perform a search of the computer-readable memory 82 and/or to transmit to the server 100 a request to search the computer-readable memory 102 for information regarding recalls or campaigns, such as recalls or campaigns generated by an OEM of the DUS indicated in the selected DUS identifier 203 and/or an OEM of a component identified in the further search field 209 for the DUS indicated in the selected DUS identifier 203. The search performed or requested can be based on the text entered into the further search field 209 and/or the DUS indicated at the selected DUS identifier 203. Upon locating and/or receiving the information regarding recalls or campaigns, the processor 81 can output the information regarding recalls or campaigns on the display 84.

The help GUI selector 205 is selectable to cause the processor 81 to output on the display 84 a GUI configured for a user to enter a selection to search for and/or request help regarding some topic, such as the GUI 201 and/or the application 96.

The contact GUI selector 206 is selectable to cause the processor 81 to output on the display 84 a GUI configured for a user to enter a selection to search for and/or request information on how to contact an entity associated with the GUI 201 and/or the application 96.

The settings GUI selector 207 is selectable to cause the processor 81 to output on the display 84 one or more application settings and options for changing the application setting(s). As an example, the application setting can, but need not necessarily, include a font size setting, a communication network setting, a password setting, or some other application setting.

The logout GUI selector 208 is selectable to cause the processor 81 to log out of the application 96. Logging out of the application 96 could include the processor 81 transmitting to the server 100 a messaging indicating logging out has been requested.

The further search field 209 can include a text field to enter text indicative of a further search criterion, such as a component identifier. Text could be entered into the further search field 209 using the user interface 83. As an example, the text entered into the further search field could be indicative of a component located on the DUS indicated in the selected DUS identifier 203. As shown in FIG. 12, the text could include the search term "Ignition" indicative of an ignition system on the DUS indicated in the selected DUS identifier 203.

The search USC 210 is selectable to cause the processor 81 to perform a search of the computer-readable memory 82 and/or to transmit to the server 100 a request to search the computer-readable memory 102. The search performed or requested can be based on the text entered into the further search field 209 and/or the DUS indicated at the selected DUS identifier 203.

The search result identifier 211 indicates one or more search terms used to obtain content to populate within a content selector of the set of content selectors 212 and/or a GUI displayable in response to selecting the content selector. In at least some implementations, the search result identifier 211 indicates a search term entered at the selected DUS identifier 203 and/or at the further search field 209.

Each content selector of the set of content selectors 212 pertains to one or more categories of service information that is displayable in the content selector and/or within a GUI displayable in response to selecting the content selector. In at least some implementations, each content selector of the set of content selectors 212 includes a service information category title to indicate what type of service information will be displayed if that content selector is selected and/or expanded (e.g., expanded as a separate GUI). A content selector can be referred to by its service information category title. Accordingly, the set of content selectors 212 includes a technical bulletins content selector 213, a real fixes content selector 214, a top repairs content selector 215, a causes and fixes content selector 216, a specifications content selector 217, an OEM testing content selector 218, a component connector content selector 219, a component location content selector 220, a component operation content selector 221, a tips content selector 222, a routing diagrams content selector 223, and a diagrams content selector 224. Each content selector of the set of content selectors 212 can include an expander user-selectable control. An expander USC 225 of the routing diagrams content selector 223 and an expander USC 226 of the routing diagrams content selector 224 are specifically identified in FIG. 13.

The processor 81 is operable to determine that the routing diagrams content selector 223 has been selected from the GUI 201 and/or the display 84. In some implementations, in response to determining that the routing diagrams content selector 223 has been selected, the processor 81 transmits to the server 100 a request for a routing diagram. That request can include an identifier of a selected DUS (e.g., a 2014 Acme Mamba 5.7 L) and information entered into the further search field 209 (e.g., Ignition).

In at least some other implementations, in response to determining that the routing diagrams content selector 223 has been selected, the processor 81 can responsively output on the display 84 a particular routing diagram that corresponds to the search criteria, such as a DUS identifier and/or one or more terms entered into the further search field 209.

In at least some other implementations, in response to determining that the routing diagrams content selector 223 has been selected, the processor 81 responsively outputs on the display 84 a GUI with a list of selectable routing diagrams for a DUS identified by the selected DUS identifier 203 and/or an entry in the further search field 209, such as "Ignition." In some implementations, the list of selectable routing diagrams includes an identifier for a set of routing diagrams that includes two or more wiring diagrams. In some implementations, the processor 81 requests and receives the list of selectable routing diagrams from the server 100. In other implementations, the processor 81 determines the list of selectable routing diagrams by searching the computer-readable memory 82 based on search criteria, such as a DUS identifier and/or one or more terms entered into the further search field 209.

Figure 14:
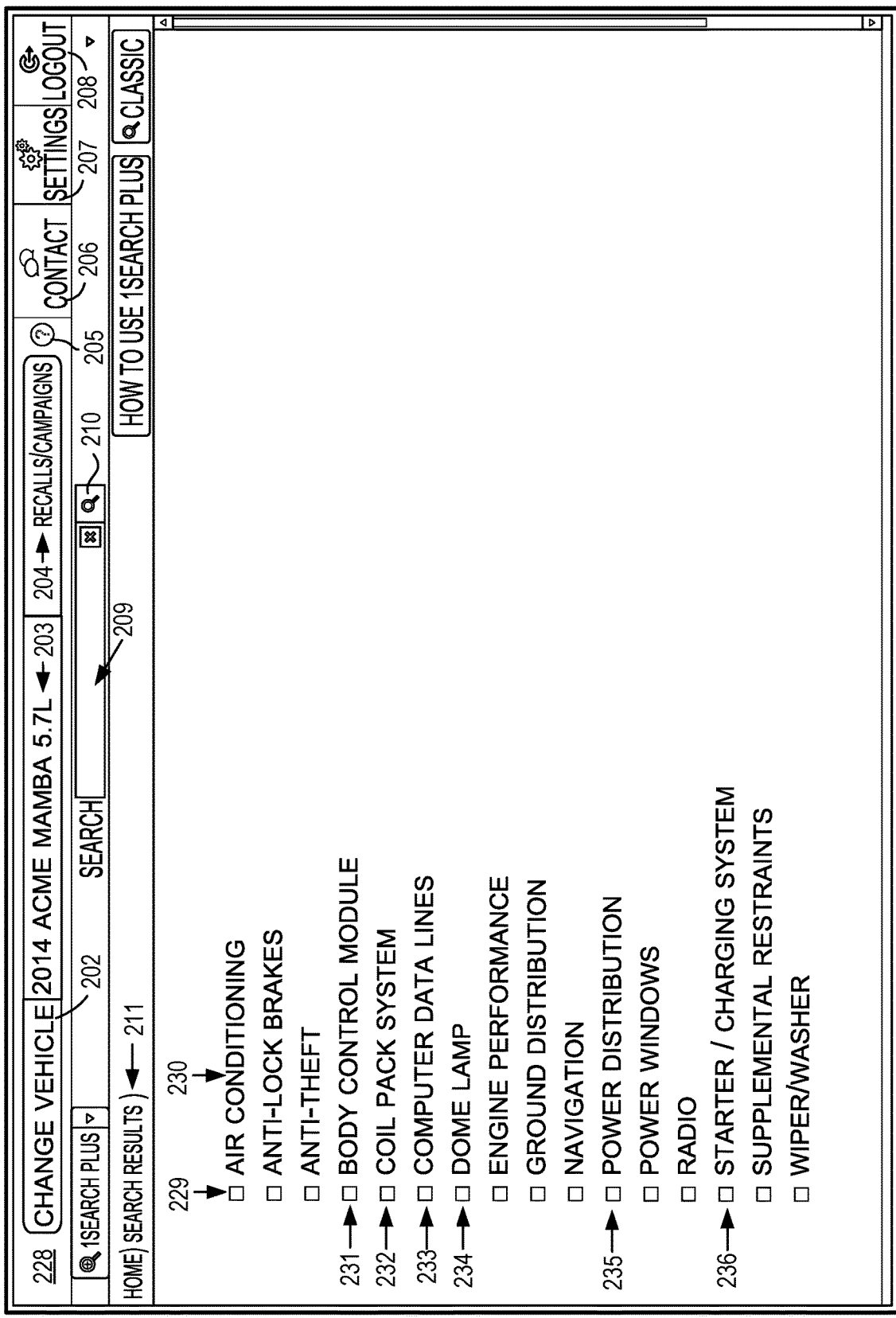

Next, FIG. 14 shows a screen shot 227 of the display 84 while the display 84 is displaying a GUI 228. The GUI 228 includes aspects shown in FIG. 13, although no term is entered into the further search field 209. The processor 81 can output the GUI 228 in response to a selection of the routing diagrams content selector 223 shown in FIG. 13. The GUI 228 includes user-selectable controls 229 and a list of selectable routing diagrams 230. The user-selectable controls 229 includes a separate USC for each selectable routing diagram within the list of selectable routing diagrams 230. In at least some implementations, a selectable routing diagram within the list of selectable routing diagrams 230 represents a set of routing diagrams.

As an example, the user-selectable controls 229 includes a USC 231 to select the routing diagrams set for a body control module, a USC 232 to select the routing diagrams for a coil pack system, a USC 233 to select the routing diagrams for computer data lines, a USC 234 to select the routing diagram for interior lamps, a USC 235 to select the routing diagrams for power distribution, and a USC 236 to select the routing diagrams for a starter/charging system. Sets of routing diagrams for the USC 231 to the USC 236 are shown in FIG. 4 and FIG. 5. The other USC in the user-selectable controls 229 pertain to other example topics for which a database can store a set of routing diagrams including one or more routing diagrams.

The processor 81 can determine that a USC from the user-selectable controls 229 has been selected. In some implementations, in response to determining a USC from the user-selectable controls 229 has been selected, the processor 81 sends to the server 100 a request for a diagram based on the selected USC. The server 100 can provide a sole routing diagram of a set of routing diagrams that corresponds to the selected USC or the first routing diagram of a set of routing diagrams if the set of routing diagrams that correspond to the selected USC includes multiple routing diagrams arranged in a particular sequence. In other implementations, the processor 81 determines a routing diagram from the routing diagram 91 based on the USC selected from the user-selectable controls 229.

Figure 15:
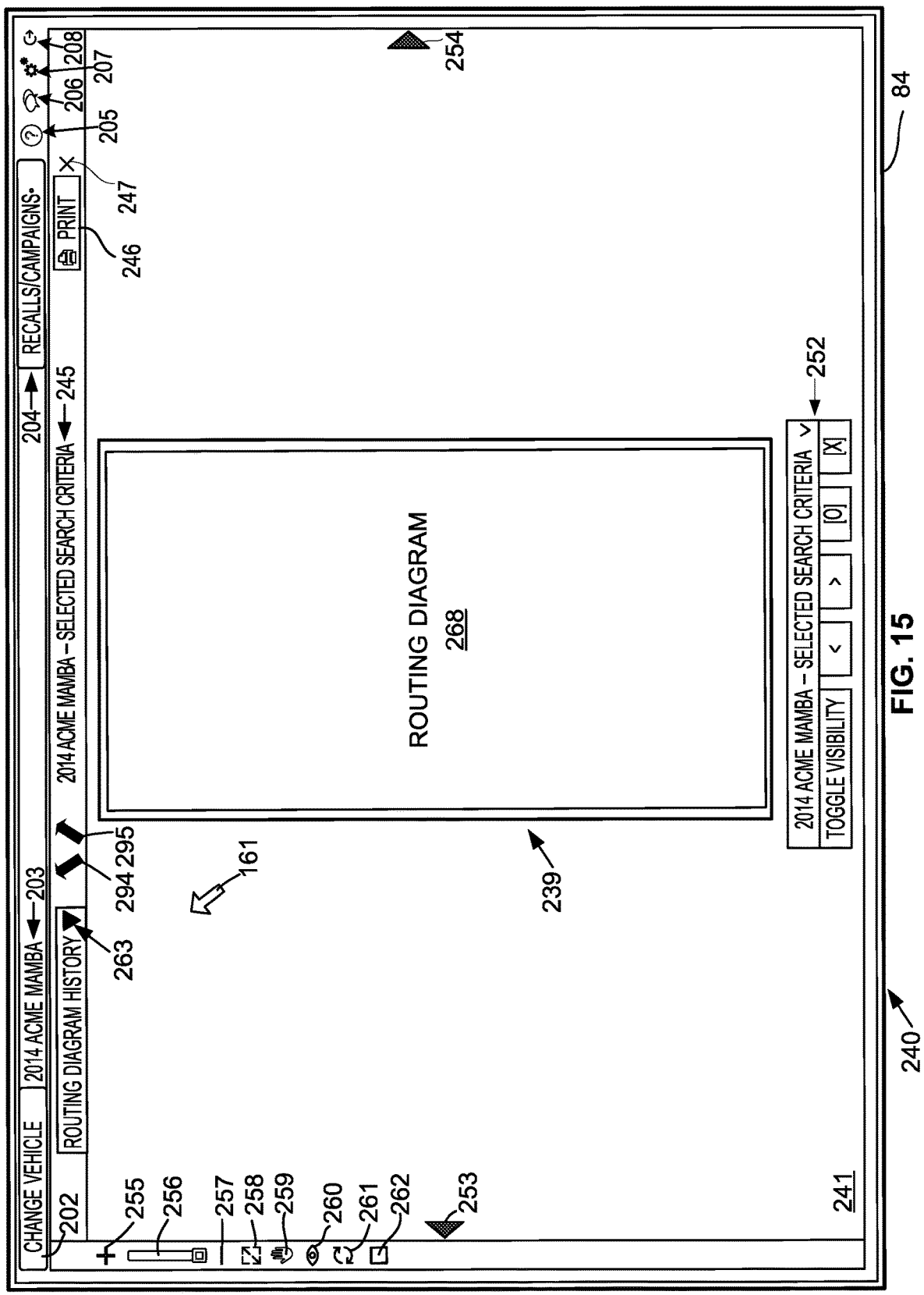

Next, FIG. 15 shows a screen shot 240 of the display 84 while the display 84 is displaying a GUI 241. The GUI 241 includes a container 239 for displaying a routing diagram 268. The container 239 can cover a different portion (e.g., a left-justified portion or a right justified portion) and/or different proportion (e.g., a larger or smaller proportion) of the GUI 241 than shown in FIG. 15. The routing diagram 268 can include any routing diagram, such as any routing diagram described in this description and/or shown in the drawings. Likewise, the routing diagram 268 can cover a different portion and/or proportion of the container 239 and/or the GUI 241. In at least some implementations, a GUI showing a routing diagram is a container for displaying the routing diagram.

Figure 16:
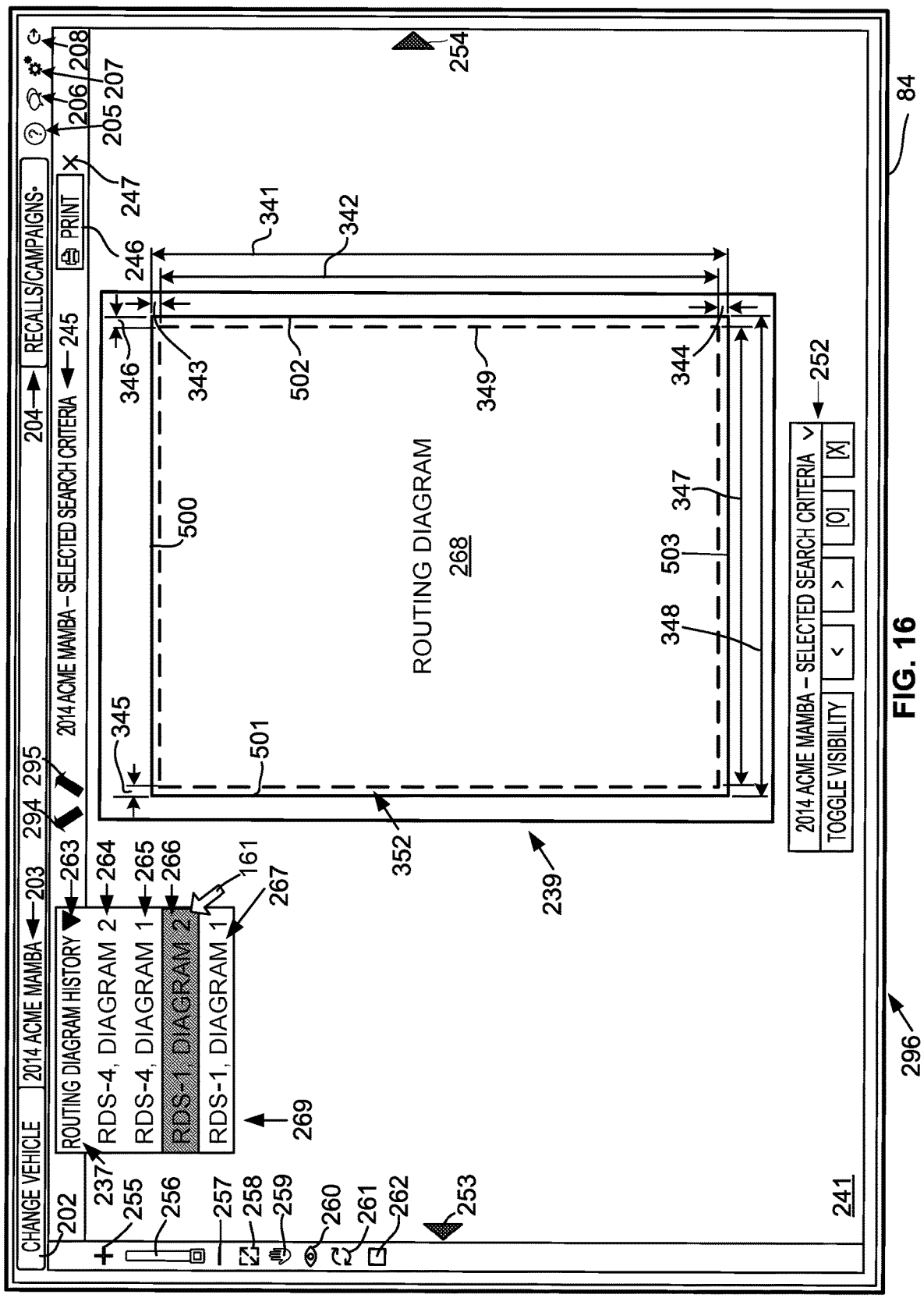

The GUI 241 includes a USC 263 that pertains to routing diagram(s) previously displayed on the display 84. Selection of the USC 263 can cause the processor 81 to display identifier(s) of previously-displayed routing diagram(s). FIG. 16 shows a screen shot 296 after the USC 263 has been selected.

Staying at FIG. 15, the GUI 241 includes a historical navigation USC 294, 295. The historical navigation USC 294, 295 can be selected to signal the processor 81 that a previously-displayed routing diagram is to be displayed. As an example, selection of the historical navigation USC 294 can signal the processor 81 to display an earlier routing diagram in a sequence of previously-displayed routing diagrams, whereas selection of the historical navigation USC 295 can signal the processor 81 to display a later routing diagram in a sequence of previously-displayed routing diagrams. In at least some implementations, if a currently-displayed routing diagram is an initial routing diagram to be displayed for a selected DUS, then the historical navigation USC 294, 295 can be inactive because there is no previously-displayed routing diagram corresponding to the DUS to be displayed.

Tables A, B, C, and D represent use of the historical navigation USC 294, 295 after one, two, three, and four routing diagrams corresponding to the selected DUS, respectively, have been displayed on the display 84. The left-most columns in Tables A to D show an order in which the routing diagram(s) were first displayed on the display 84. The second columns from the left in Tables A to D include routing diagram identifier(s) for those routing diagram(s). The third columns from the left in Tables A to D include data indicating which previously-displayed diagram will be displayed if the historical navigation USC 294 is selected while the routing diagram corresponding to the identifier in the corresponding second column is displayed or that the historical navigation USC 294 is inactive. The right-most columns in Tables A to D include data indicating which previously-displayed diagram will be displayed if the historical navigation USC 295 is selected while the routing diagram corresponding to the identifier in the corresponding second column is displayed or that the historical navigation USC 295 is inactive.

Table A is applicable when only one routing diagram for the DUS has been displayed and that one routing diagram is still displayed. Table B is applicable after two routing diagrams for the DUS have been displayed and one of the two routing diagrams is still displayed. Table C is applicable after three routing diagrams for the DUS have been displayed and one of the three routing diagrams is still displayed. Table D is applicable after four routing diagrams for the DUS have been displayed and one of the four routing diagrams is still displayed.

TABLE A

| Order of RD first appearance | RD Identifier | Selection of historical navigation USC 294 | Selection of historical navigation USC 295 |
|---|---|---|---|
| 1st | RDS-1, Diagram 1 | Inactive | Inactive |

TABLE B

| Order of RD first appearance | RD Identifier | Selection of historical navigation USC 294 | Selection of historical navigation USC 295 |
|---|---|---|---|
| 1st | RDS-1, Diagram 1 | Inactive | RDS-1, Diagram 2 |
| 2nd | RDS-1, Diagram 2 | RDS-1, Diagram 1 | Inactive |

TABLE C

| Order of RD first appearance | RD Identifier | Selection of historical navigation USC 294 | Selection of historical navigation USC 295 |
|---|---|---|---|
| 1st | RDS-1, Diagram 1 | Inactive | RDS-1, Diagram 2 |
| 2nd | RDS-1, Diagram 2 | RDS-1, Diagram 1 | RDS-4, Diagram 1 |
| 3rd | RDS-4, Diagram 1 | RDS-1, Diagram 2 | Inactive |

TABLE D

| Order of RD first appearance | RD Identifier | Selection of historical navigation USC 294 | Selection of historical navigation USC 295 |
|---|---|---|---|
| 1st | RDS-1, Diagram 1 | Inactive | RDS-1, Diagram 2 |
| 2nd | RDS-1, Diagram 2 | RDS-1, Diagram 1 | RDS-4, Diagram 1 |
| 3rd | RDS-4, Diagram 1 | RDS-1, Diagram 2 | RDS-4, Diagram 2 |
| 4th | RDS-4, Diagram 2 | RDS-4, Diagram 1 | Inactive |

In at least some implementations, the use of the historical navigation USC 294, 295 includes a wrap-around feature such that neither of the historical navigation USC 294, 295 is inactive when one of two or more displayed routing diagrams corresponding to the DUS is still displayed. As an example, for Table C, instead of being inactive, selection of the historical navigation USC 294 while the RDS-1, Diagram 1 is displayed can result in the RDS-4, Diagram 1 being displayed. Likewise, with respect to Table C, instead of being inactive, selection of the historical navigation USC 295 while the RDS-4, Diagram 1 is displayed can result in the RDS-1, Diagram 1 being displayed.

unless the first routing diagram in the sequence of routing diagrams is currently displayed. Likewise in those implementations, the use of the routing diagram selector USC 254 causes the display 84 to display a later routing diagram in the sequence of routing diagrams in the routing diagram set 22 unless the last routing diagram in the sequence of routing diagrams is currently displayed. Table E represents use of the routing diagram selector USC 253, 254 while a routing diagrams in the routing diagram set 22 is displayed on the display 84 in accordance with the aforementioned implementations.

TABLE E

| Routing diagram displayed on display | Routing diagram displayed after selection of routing diagram selector USC 253 | Routing diagram displayed after selection of routing diagram selector USC 254 |
|---|---|---|
| 37 | 37 | 38 |
| 38 | 37 | 39 |
| 39 | 38 | 40 |
| 40 | 39 | 41 |
| 41 | 40 | 41 |

The GUI 241 includes a routing diagram selector USC 253, 254. In at least some implementations, the processor 81 outputs a different routing diagram in the GUI 241 (e.g., within the container 239) in response to determining that the routing diagram selector USC 253, 254 has been selected.

Use of the routing diagram selector USC 253, 254 is now described with respect to the routing diagram set 22 that includes the routing diagram 37, 38, 39, 40, 41 (see, FIG. 4). Those routing diagrams can be arranged in a sequence such as routing diagrams (1 of 5), (2 of 5), (3 of 5), (4 of 5), and (5 of 5), respectively. In at least some implementations, the routing diagram selector USC 253 and the routing diagram selector USC 254 can be selected while one of the routing diagram 37, 38, 39, 40, 41 is displayed on the display 84.

In at least some implementations, while a routing diagram of the routing diagram set 22 is displayed on the display 84, the use of the routing diagram selector USC 253 causes the display 84 to display an earlier routing diagram in the sequence of routing diagrams in the routing diagram set 22

In at least some other implementations, while a routing diagram of the routing diagram set 22 is displayed on the display 84, the use of the routing diagram selector USC 253 causes the display 84 to display an earlier routing diagram in the sequence of routing diagrams in the routing diagram set 22 unless the first routing diagram in the sequence of routing diagrams is currently displayed. In that case, the last routing diagram in the routing diagram set 22 is responsively displayed. Likewise in those implementations, the use of the routing diagram selector USC 254 causes the display 84 to display a later routing diagram in the sequence of routing diagrams in the routing diagram set 22 unless the last routing diagram in the sequence of routing diagrams is currently displayed. In that case, the first routing diagram in the routing diagram set 22 is responsively displayed. Table F represents use of the routing diagram selector USC 253, 254 while a routing diagrams in the routing diagram set 22 is displayed on the display 84 in accordance with the aforementioned implementations.

TABLE F

| Routing diagram displayed on display | Routing diagram displayed after selection of routing diagram selector USC 253 | Routing diagram displayed after selection of routing diagram selector USC 254 |
|---|---|---|
| 37 | 41 | 38 |
| 38 | 37 | 39 |
| 39 | 38 | 40 |
| 40 | 39 | 41 |
| 41 | 40 | 37 |

The GUI 241 shown in FIG. 15 also includes the DUS GUI selector 202, the selected DUS identifier 203, the recalls/campaigns GUI selector 204, the help GUI selector 205, the contact GUI selector 206, the settings GUI selector 207, and the logout GUI selector 208, a zoom USC 256, a resize USC 258, a pan USC 259, a hide-or-show USC 260, a reset routable components USC 261, a multi-diagram view USC 262, a routing diagram identifier 245, a print USC 246, and a close GUI USC 247.

The zoom USC 256 includes a zoom-in USC 255 and a zoom-out USC 257. The zoom-in USC 255 is selectable to cause the processor 81 to zoom in on one or more routing diagrams displayed on the display 84. The zoom-out USC 257 is selectable to cause the processor 81 to zoom out on one or more routing diagrams displayed on the display 84.

The resize USC 258 is selectable to cause the processor 81 to change a size of a routing diagram displayed on the display 84. As an example, in response to determining the resize USC 258 has been selected when the displayed routing diagram is not a default diagram size, the processor 81 can change the size of the diagram displayed on the display 84 to the default diagram size. As an example, the default diagram size of can be a size to accommodate a fit-diagram-to-page size such that the routing diagram is displayed in its entirety on a screen of the display 84. In at least some implementations in which the routing diagram 268 is displayed in the container 239, selection of the resize USC 258 causes a corresponding change in size of the container 239 so that the routing diagram 268 is still displayed within the container 239 after the size of the routing diagram 268 has changed.

The pan USC 259 is selectable to cause the processor 81 to move a routing diagram displayed on the display 84, such as moving the routing diagram horizontally, vertically, or a combination of horizontally and vertically.

The hide-or-show USC 260 is selectable to cause the processor 81 to hide particular component(s) of a routing diagram displayed on the display 84 if those particular component(s) are not currently hidden and to unhide the particular component(s) of the routing diagram on the display 84 if those particular component(s) are currently hidden. The particular components are not visible when hidden, but are visible when not hidden. As an example, the particular components can be the routable components on a routing diagram. As another example, the particular components can be the connectable components on a routing diagram.

The reset routable components USC 261 is selectable to cause the processor 81 to un-highlight any routable component(s) disposed on a routing diagram and currently displayed as highlighted. Moreover, the processor 81 can modify the metadata 92 to indicate that any segment of a routable component disposed on a routing diagram that is not currently displayed but is part of a routable component having a segment disposed on a routing diagram currently displayed and highlighted is associated with an un-highlighted state.

The routing diagram identifier 245 includes a textual identifier of a routing diagram or a set of routing diagrams that include a routing diagram currently displayed on the display 84. The routing diagram identifier 245 can match the textual routing diagram identifier 3 of a routing diagram contained in the container 239.

The print USC 246 can be configured for performing various functions. In at least some implementations, the print USC 246 is selectable to cause the processor 81 to open a window including a USC that is selectable to cause the processor 81 to send the GUI including a routing diagram and/or the routing diagram displayed on the GUI with the print USC 246 to a printer. In at least some other implementations, the print USC 246 is selectable to cause the processor 81 to directly send the GUI including a routing diagram and/or the routing diagram displayed on the GUI with the print USC 246 to a printer.

The close GUI USC 247 is selectable to cause the processor 81 to close the GUI including the GUI USC 247. In accordance with at least some implementations, the processor 81 causes the display to display another GUI, such as the GUI 201 shown in FIG. 13 or the GUI 228 shown in FIG. 13, in response to determining the GUI USC 247 has been selected.

The GUI 241 also includes a USC 252 that includes controls selectable to make selections to change what routing diagrams are displayed on the GUI 241 and/or how the displayed routing diagrams appear within the GUI 241.

Next, FIG. 16 shows a screen shot 296 of the display 84 while the display 84 is displaying an alternative view of the GUI 241 (as compared to a view of the GUI 241 shown in FIG. 15). One difference between the screen shot 240 shown in FIG. 15 and the screen shot 296 is that the container 239 is shown to cover a different portion and different proportion of the GUI 241 as compared to the view of the container 239 in FIG. 15. Similarly, the routing diagram 268 is shown to cover different portions and different proportions of the container 239 and the GUI 241 as compared to the view of the routing diagram 268 in FIG. 15.

The screen shot 296 represents an instance after the USC 263 has been selected to cause the processor 81 to display identifier(s) of previously-displayed routing diagram(s) of a routing diagram history 237. As an example, the identifier(s) of previously-displayed routing diagram(s) can be shown in a drop-down menu 269. As another example, the identifier(s) of previously-displayed routing diagram(s) can be shown in within display cards or within buttons or some other GUI element(s). In at least some implementations, the identifier(s) of previously-displayed routing diagram(s) are limited to identifier(s) of routing diagram(s) for the DUS identified by the selected DUS identifier 203. In other implementations, the identifier(s) of previously-displayed routing diagram(s) can include identifier(s) of routing diagram(s) for a DUS other than the DUS identified by the selected DUS identifier 203. The identifier(s) of previously-displayed routing diagram(s) are selectable. For example, in response to determining an identifier from the drop-down menu 269 (or another GUI element) has been selected, the processor 81 can output on the display 84 a routing diagram corresponding to the selected identifier. In at least some implementations, the routing diagram history 237 is configured to contain no more than a maximum number of identifiers of previously-displayed routing diagrams. As an example, the maximum number can be a number between five and twenty, such as ten. Other examples of the maximum number are also possible.

As an example, the drop-down menu 269 includes an identifier 264, 265, 266, 267 that corresponds to the routing diagram 43, 42, 31, 30, respectively. FIG. 16 shows a point of the cursor 161 positioned on the identifier 266 and the identifier 266 is shaded to indicate that the cursor 161 is pointing to the identifier 266. In some implementations, the user interface 83 can be used (e.g., clicking a computer mouse) to select the identifier 266 while the cursor is pointing to the identifier 266. In response to selecting the identifier 266, the processor 81 can responsively output the routing diagram 31 on the display 84. In some implementations, the processor 81 retrieves the routing diagram 31 stored in the routing diagram 91. In some other implementations, the processor 81 requests and receives the routing diagram 31 from the server 100 in response to determining the identifier 266 has been selected.

In at least some implementations, the identifier 264, 265, 266, 267 is displayed in an order in which the corresponding routing diagram was departed. As an example, the order can be from a most-recent departure routing diagram to an earliest departure routing diagram. For instance, the identifier 264 can correspond to a most-recent departure routing diagram and the identifier 267 can correspond to an earliest departure routing diagram for the DUS identified by the DUS identifier 203. In accordance with these examples, a flow of displaying routing diagrams is as follows: the routing diagram 30 was displayed, a hotspot within the routing diagram 30 was selected making the routing diagram 30 a departure routing diagram in order to display the routing diagram 31, a hotspot within the routing diagram 31 was selected making the routing diagram 31 a departure routing diagram in order to display the routing diagram 42, a hotspot within the routing diagram 42 was selected making the routing diagram 42 a departure routing diagram in order to display the routing diagram 43, and a hotspot within the routing diagram 43 was selected making the routing diagram 43 a departure routing diagram in order to display the routing diagram 268 within the GUI 241.

FIG. 16 also shows further details pertaining to the routing diagram 268. For example, the routing diagram 268 is shown to include an edge 500, 501, 502 503. FIG. 15 also shows an internal perimeter 349. In at least some implementations, the internal perimeter 349 is not displayed when the routing diagram 268 is displayed on the display 84. FIG. 15 shows a dimension 341, 342, 343, 344, 345, 346, 347, 348 between one of the edge 500, 501, 502, 503 and the internal perimeter 349. The edge 500, 501, 502, 503 and the internal perimeter define a border area 352. The border area 352 is the area between the edge 500, 501, 502, 503 and a closest portion of the internal perimeter 349. The border area 352 is adjacent the edge 500, 501, 502, 503. The edge 500, 501, 502, 503 is an outer-most portion of the routing diagram 268.

In at least some implementations, the dimension 341, 342, 343, 344, 345, 346, 347, 348 is defined as a number of pixels. As an example, the dimension 341 is 1800 pixels, the dimension 343, 344, 345, 346 is 40 pixels, the dimension 342 is 1720 pixels, the dimension 347 is 1320 pixels, and the dimension 348 is 1400 pixels. Other examples of the dimension 342, 343, 344, 345, 346, 347, 348 and the units thereof are also possible.

The other routing diagrams discussed in this description and/or shown in the drawings can also include the edge 500, 501, 502, 503, the internal perimeter 349, and the border area 352. The routing diagrams shown in the other drawings show the edge 500, 501, 502 503.

V. Example Routing Diagrams

Figure 17:
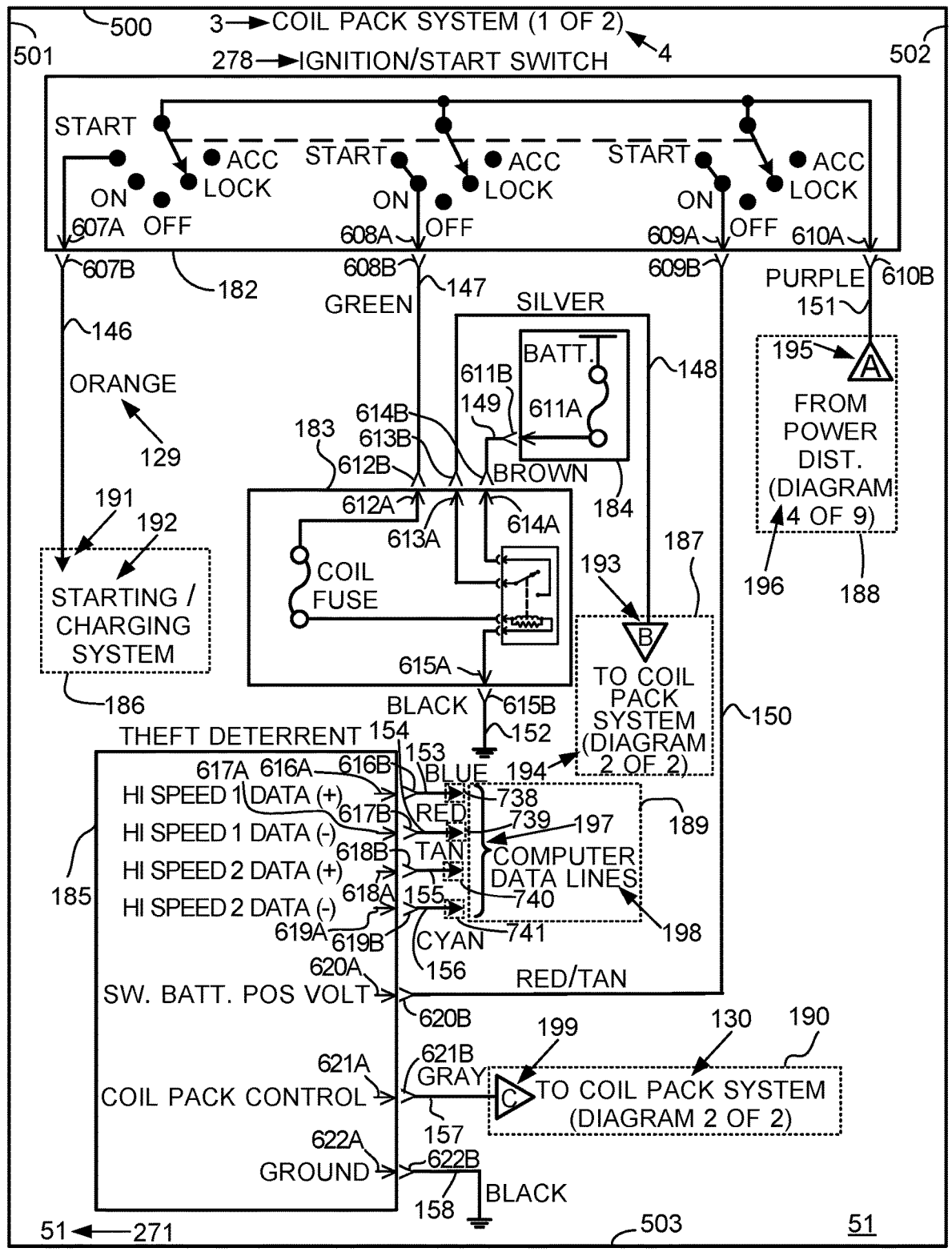
FIG. 17, FIG. 18, FIG. 19, FIG. 20, FIG. 21, FIG. 22, FIG. 23, FIG. 24, FIG. 25, FIG. 26, and FIG. 27 show at least a portion of a routing diagram in accordance with one or more of the example implementations.

Next, FIG. 17 shows the routing diagram 51. The routing diagram 51 includes a routing diagram identifier 271. In some implementations, the routing diagram identifier 271 is visible on the display 84 while the routing diagram 51 is displayed on the display 84. In those or in other implementations, the routing diagram identifier 271 is stored within metadata corresponding to the routing diagram 51. The routing diagram identifier 271 is indicative of the routing diagram 51, which is a first of two routing diagrams corresponding to a coil pack system. The textual routing diagram identifier 3 and the diagram count 4 within the routing diagram 51 indicate that the routing diagram 51 is the first of two routing diagrams corresponding to a coil pack system. The routing diagram 52 is a second of two routing diagrams corresponding to the coil pack system.

The routing diagram 51 includes a routable component 146, 147, 148, 149, 150, 151, 152, 153, 154, 155, 156, 157, 158. In at least some implementations, those reference numbers correspond to routable component numbers (e.g., electrical circuit numbers) visually present on the routing diagram. A routing diagram, such as the routing diagram 51 or some other routing diagram discussed in description, can include a textual description of a routable component. For example, the routing diagram 51 includes a textual description 129 indicating a color "orange" to describe the routable component 146. The routing diagram 51 also includes a connectable component 182, 183, 184, 185 representative of an ignition/start switch, a relay, a fuse panel or fuse holder including a fuse for the routable component 149, and an ECU for a theft deterrent system, respectively. A routing diagram can include a component identifier that corresponds to a connectable component or a routable component, such as a component identifier 278 corresponding to the connectable component 182 shown in FIG. 17.

Additionally, the routing diagram 51 includes a hotspot 186, 187, 188, 189, 190, 738, 739, 740, 741. Although the hotspot 186, 187, 188, 189, 190, 738, 739, 740, 741 is represented using a dashed rectangular line, the hotspot 186, 187, 188, 189, 190, 738, 739, 740, 741 or any other hotspot described herein and/or shown in the drawings can cover a rectangular or non-rectangular area (e.g., a circular area) within a routing diagram and a screen of the display 84.

The hotspot 186 includes an icon 191 and a textual description 192. Since the icon 191 and the textual description 192 are within the hotspot 186, the icon 191 and the textual description 192 are hotspots. The icon 191 is connected to and corresponds to the routable component 146. An icon that that corresponds to a hotspot (e.g., included within a hotspot) can indicate that a routable component corresponding to the hotspot continues on another routing diagram of a set of routing diagrams that comprises the routing diagram including the hotspot. In the application drawings, this icon appears as a solid, filled black triangle. Alternatively, an icon that that corresponds to a hotspot can indicate that the routable component corresponding to the hotspot continues on another routing diagram of a set of routing diagrams that does not comprise the routing diagram including the hotspot (i.e., a different set of routing diagrams). In the application drawings, this icon appears as a triangle including an alphanumeric character (e.g., a letter).

A textual description within and/or proximate a hotspot, such as the textual description 192, can describe a routing diagram on which a routable component corresponding to the hotspot continues. As an example, the textual description with a hotspot can indicate the textual routing diagram identifier 3 and the diagram count 4 for the other routing diagram.

In alternative implementations, a hotspot (e.g., the hotspot 186) on a routing diagram includes only an icon (e.g., the icon 191) or a textual description (e.g., the textual description 192), but is still selectable to cause the processor 81 to output a different routing diagram on the display 84. In still other alternative implementations, a hotspot includes neither an icon nor a textual description, but is still selectable to cause the processor 81 to output a different routing diagram on the display 84.

Figure 20:
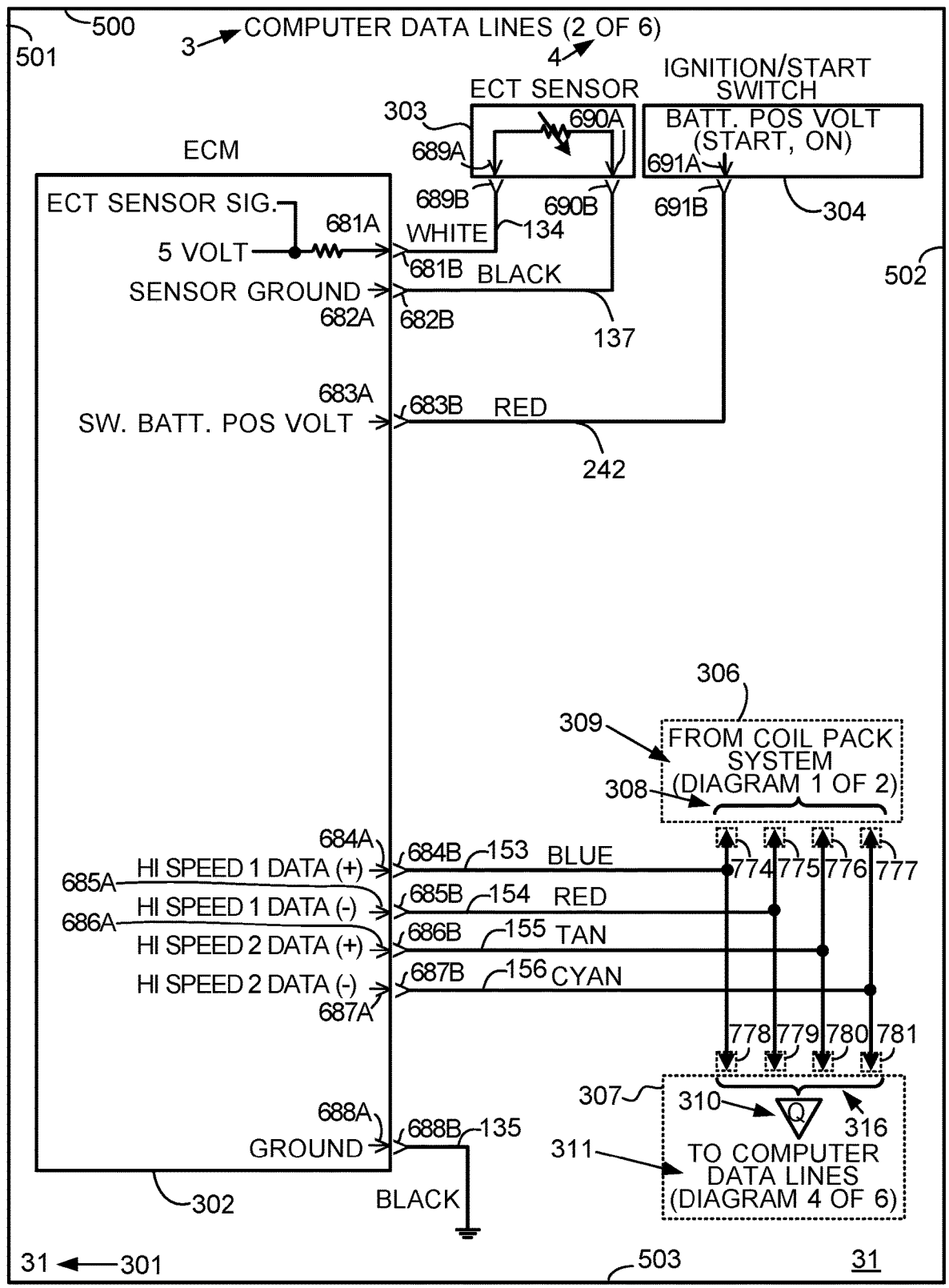

The hotspot 186, the icon 191, and the textual description 192 is selectable to select the routable component 146 and a routing diagram on which another portion of the routable component 146 is shown (i.e., the routing diagram 38 shown in FIG. 20). In at least some implementations, in response to determining the hotspot 186, the icon 191, or the textual description 192 is selected, the processor 81 outputs the routing diagram 38 on the display 84 with a portion of the routable component 146 highlighted and without highlighting the other routable components on the routing diagram 38.

Figure 18:
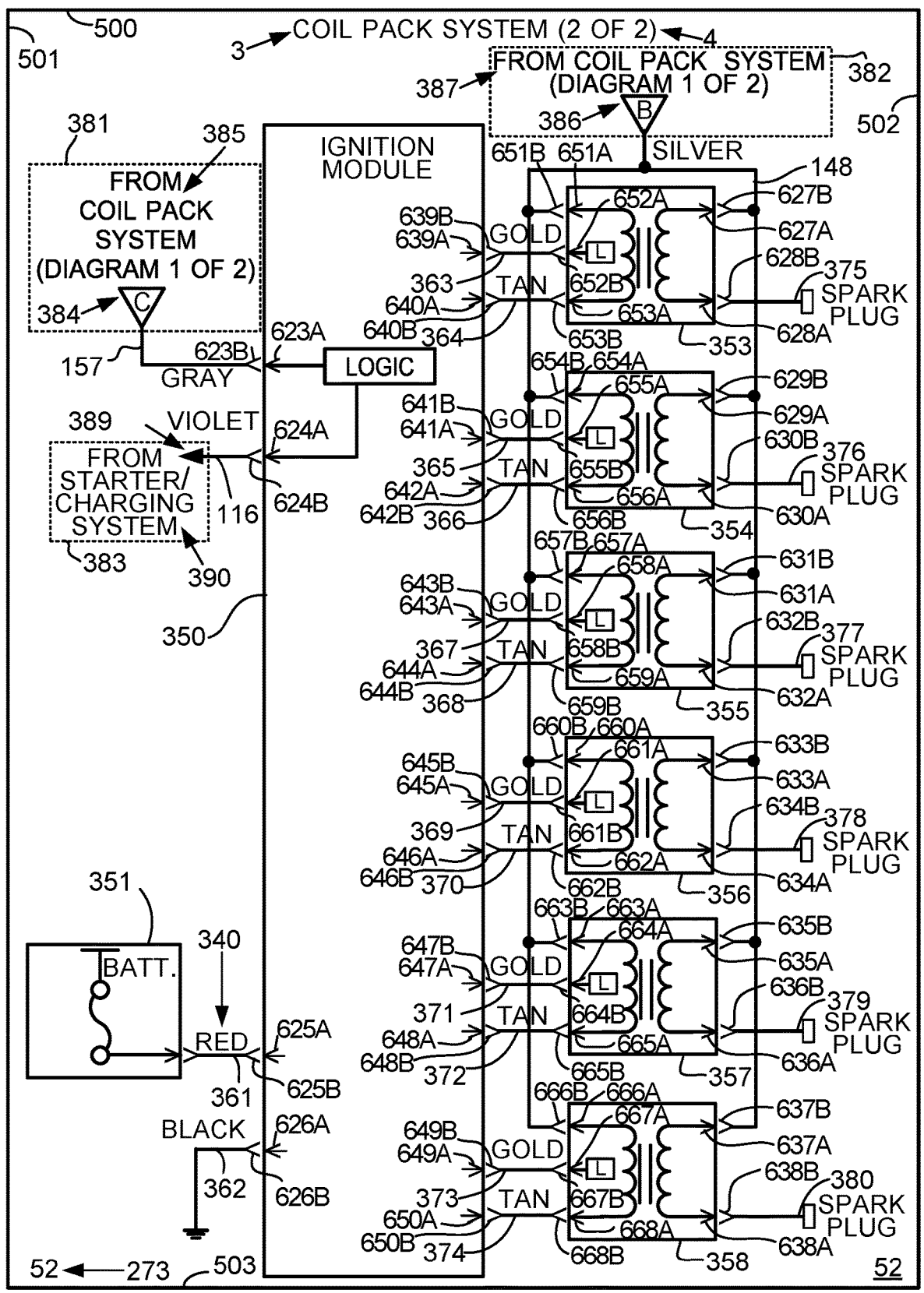

The hotspot 187 includes an icon 193 and a textual description 194. Since the icon 193 and the textual description 194 are within the hotspot 187, the icon 193 and the textual description 194 are hotspots. The icon 193 is connected to and corresponds to the routable component 148. The textual description 194 indicates the textual routing diagram identifier 3 and the diagram count 4 for the routing diagram 52 (which is shown in FIG. 18). The hotspot 187, the icon 193, and the textual description 194 is selectable to select the routable component 148 and the routing diagram 52 on which another portion of the routable component 148 is shown. In at least some implementations, in response to determining the hotspot 187, the icon 193, or the textual description 194 is selected, the processor 81 outputs the routing diagram 52 on the display 84 with a portion of the routable component 148 highlighted and without highlighting the other routable components on the routing diagram 52.

The hotspot 188 includes an icon 195 and a textual description 196. Since the icon 195 and the textual description 196 are within the hotspot 188, the icon 195 and the textual description 196 are hotspots. The icon 195 is connected to and corresponds to the routable component 151. The textual description 196 indicates the textual routing diagram identifier and the diagram count for the routing diagram 45 shown in FIG. 5. The hotspot 188, the icon 195, and the textual description 196 is selectable to select the routable component 151 and the routing diagram 45 on which another portion of the routable component 151 is shown. In at least some implementations, in response to determining the hotspot 188, the icon 195, or the textual description 196 is selected, the processor 81 outputs the routing diagram 45 on the display 84 with a portion of the routable component 151 highlighted and without highlighting the other routable components on the routing diagram 45.

The hotspot 189 includes a bracket icon 197 and a textual description 198. Since the bracket icon 197 and the textual description 198 are within the hotspot 189, the bracket icon 197 and the textual description 198 are hotspots. The textual description 198 indicates the textual routing diagram identifier for a routing diagram of the routing diagram set 20 shown in FIG. 5 (e.g., the routing diagram 31). In an alternative implementation, the textual description 198 can include a diagram count for a particular routing diagram of the routing diagram set 20 (e.g., the diagram count "2 of 6"). The bracket icon 197 corresponds to the routable component 153, 154, 155, 156 shown in the routing diagram 51 and to other portions of the routable component 153, 154, 155, 156 shown in the routing diagram 31. The bracket icon 197 is selectable to select the routable component 153, 154, 155, 156 via a single selection. The hotspot 189, the bracket icon 197, and the textual description 198 is selectable to select the routable component 153, the routable component 154, the routable component 155, the routable component 156, and the routing diagram 31 via a single selection. In at least some implementations, in response to determining the hotspot 189, the bracket icon 197, or the textual description 198 is selected, the processor 81 outputs the routing diagram 31 on the display 84 with a portion of each of the routable component 153, the routable component 154, the routable component 155, and the routable component 156 highlighted and without highlighting the other routable component(s) on the routing diagram 31.

The hotspot 738, 739, 740, 741 includes a solid, filled black triangle that is connected to and corresponds to the routable component 153, 154, 155, 156, respectively. The hotspot 738, 739, 740, 741 is selectable to separately select the routable component 153, the routable component 154, the routable component 155, the routable component 156, respectively, and the routing diagram 31 via a single selection. In at least some implementations, the routable component 153 is highlighted on the display 84 when the routing diagram 31 is displayed in response to selection of the hotspot 738 and without highlighting the other routable components on the routing diagram 31. Likewise, in at least some implementations, the routable component 154 is highlighted on the display 84 when the routing diagram 31 is displayed in response to selection of the hotspot 739 and without highlighting the other routable components on the routing diagram 31. Similarly, in at least some implementations, the routable component 155 is highlighted on the display 84 when the routing diagram 31 is displayed in response to selection of the hotspot 740 and without highlighting the other routable components on the routing diagram 31. And further, in at least some implementations, the routable component 156 is highlighted on the display 84 when the routing diagram 31 is displayed in response to selection of the hotspot 741 and without highlighting the other routable components on the routing diagram 31.

The hotspot 190 includes an icon 199 and a textual description 130. Since the icon 199 and the textual description 130 are within the hotspot 190, the icon 199 and the textual description 130 are hotspots. The icon 199 is connected to and corresponds to the routable component 157. The textual description 130 indicates the textual routing diagram identifier 3 and the diagram count 4 for the routing diagram 52 shown in FIG. 18. The hotspot 190, the icon 199, and the textual description 130 is selectable to select the routable component 157 and the routing diagram 52 on which another portion of the routable component 157 is shown. In at least some implementations, in response to determining the hotspot 190, the icon 199, or the textual description 130 is selected, the processor 81 outputs the routing diagram 52 on the display 84 with a portion of the routable component 157 highlighted and without highlighting the other routable components on the routing diagram 52.

The connectable component 182 includes a connector pin 607A, 608A, 609A, 610A. The connectable component 183 includes a connector pin 612A, 613A, 614A, 615A. The connectable component 184 includes a connector pin 611A. The connectable component 185 includes a connector pin 616A, 617A, 618A, 619A, 620A, 621A, 622A. The routable component 146 includes a connector pin 607B. The routable component 147 includes a connector pin 608B, 612B. The routable component 150 includes a connector pin 609B, 620B. The routable component 151 includes a connector pin 610B. The routable component 149 includes a connector pin 611B, 614B. The routable component 148 includes a connector pin 613B. The routable component 152 includes a connector pin 615B. The routable component 153 includes a connector pin 616B. The routable component 154 includes a connector pin 617B. The routable component 155 includes a connector pin 618B. The routable component 156 includes a connector pin 619B. The routable component 157 includes a connector pin 621B. The routable component 158 includes a connector pin 622B.

The routing diagram 51 includes an edge 500, 501, 502, 503. The edge 500 can be referred to as a "top edge." The edge 501 can be referred to as a "left edge." The edge 502 can be referred to as a "right edge." The edge 503 can be referred to as a "bottom edge." A routing diagram 52, 30, 31, 37, 38, 36, 56, 58, 838, 860 shown in one or more of FIG. 18 to FIG. 27 or FIG. 33 to FIG. 38 also include a top edge, a left edge, a right edge, and a bottom edge that are identified as the edge 500, 501, 502, 503, respectively in those figures. The other routing diagrams shown in 4 and routing diagrams within the database 10 can also include a top edge, a left edge, a right edge, and a bottom edge like those shown in FIG. 17 to FIG. 27 or FIG. 33 to FIG. 38.

In at least some implementations, neither the icon nor the textual description of a hotspot in a routing diagram is disposed at or in proximity to an edge of a routing diagram that includes the hotspot. In at least some implementations, an icon or the textual description is not disposed at or in proximity to the edge of a routing diagram if some other portion of a routable component or a connectable component on the routing diagram is closer to the edge than the icon or the textual description. In at least some of those implementations or in other implementations, an icon or the textual description is not disposed at or in proximity to the edge of a routing diagram if no portion of the icon or the textual description is contained within the border area 352 (see, FIG. 16) of the routing diagram.

In at least some implementations, an icon or the textual description is not disposed at or in proximity to the edge of a routing diagram if at least a threshold percentage of a width dimension (e.g., dimension 348 shown in FIG. 16) of the routing diagram is between the left edge or the right edge of the routing diagram and a closest portion of the hotspot (e.g., the icon or the textual description of the hotspot), and at least a threshold percentage of a height dimension (e.g., dimension 341 shown in FIG. 16) of the routing diagram is between the top edge or the bottom edge of the routing diagram and a closest portion of hotspot (e.g., the icon or the textual description of the hotspot). As an example, the threshold percentages discussed in this paragraph can be a threshold percentage between 1% and 10%, inclusive. In accordance with that example, the threshold percentage can be a threshold percentage between 1% and 2% inclusive, between 2% and 3% inclusive, between 3% and 4% inclusive, between 4% and 5% inclusive, between 5% and 6% inclusive, between 6% and 7% inclusive, between 7% and 8% inclusive, between 8% and 9% inclusive, or between 9% and 10% inclusive. Also accordance with that example, the threshold percentage can be 1%, 2%, 3%, 4%, 5%, 6%, 7%, 8%, 9% or 10%.

In at least some implementations, an icon or the textual description is not disposed at or in proximity to the edge of a routing diagram if at least a threshold distance exists between the icon or the textual description of the hotspot and a closest edge of the routing diagram. In at least some implementations, the threshold distance is measured as a quantity of pixels. The quantity of pixels can be a discrete number of pixels, such as 40 pixels or a percentage of pixels of the quantity of vertical or horizontal pixels of the routing diagram. For example, if the routing diagram is 1400 pixels wide and 1800 pixels high (the number of pixels can be 2.85% of the quantity of horizontal pixels (rounded to the nearest integer). In accordance with the example of a routing diagram 1400 pixels wide, 2.85% of the horizontal pixels is 39.9 (or 40 pixels when rounded.) Other examples of a threshold distance in terms of a number of pixels or a percentage of pixels of the quantity of vertical or horizontal pixels of the routing diagram are also possible.

Next, FIG. 18 shows the routing diagram 52. The routing diagram 52 includes a routing diagram identifier 273. In some implementations, the routing diagram identifier 273 is visible on the display 84 while the routing diagram 52 is displayed on the display 84. In those or in other implementations, the routing diagram identifier 273 is stored within metadata corresponding to the routing diagram 52. The routing diagram identifier 273 is indicative of the routing diagram 52, which is a second of two routing diagrams corresponding to a coil pack system. The textual routing diagram identifier 3 and the diagram count 4 within the routing diagram 52 indicate that the routing diagram 52 is the second of two routing diagrams corresponding to a coil pack system.

The routing diagram 52 includes a routable component 116, 148, 157, 361, 362, 363, 364, 365, 366, 367, 368, 369, 370, 371, 372, 373, 374, 375, 376, 377, 378, 379, 380. The routable component 375 to 380 are commonly referred to as "spark plug wires." In at least some implementations, those reference numbers correspond to routable component numbers (e.g., electrical circuit numbers) visually present on the routing diagram 52. The routing diagram 52 can include a textual description of a routable component. For example, the routing diagram 52 includes a textual description 340 indicating a color "red" to describe the routable component 361. The routing diagram 52 also includes a connectable component 350, 351, representative of an ignition module, and a fuse panel or fuse holder including a fuse for the routable component 361, respectively. The routing diagram 52 also includes a connectable component 353, 354, 355, 356, 357, 358, each of which is a coil of a coil pack system.

Additionally, the routing diagram 52 includes a hotspot 381, 382, 383. Although the hotspot 381, 382, 383 is represented using a dashed rectangular line, the hotspot 381, 382, 383 can cover a rectangular or non-rectangular area (e.g., a circular area) within the routing diagram 52 and a screen of the display 84.

The hotspot 381 includes an icon 384 and a textual description 385. Since the icon 384 and the textual description 385 are within the hotspot 381, the icon 384 and the textual description 385 are hotspots. The icon 384 is connected to and corresponds to the routable component 157. The textual description 385 indicates the textual routing diagram identifier 3 and the diagram count 4 for the routing diagram 51 shown in FIG. 17. The alphanumeric character within the icon 384 is identical to the alphanumeric character within the icon 199 shown in FIG. 17. The icon 199, 384 including the same alphanumeric character (i.e., "C") are both connected to a portion of the routable component 157. The hotspot 381, the icon 384, and the textual description 385 is selectable to select the routable component 157 and the routing diagram 51 on which another portion of the routable component 157 is shown. In at least some implementations, in response to determining the hotspot 381, the icon 384, or the textual description 385 is selected, the processor 81 outputs the routing diagram 51 on the display 84 with a portion of the routable component 157 highlighted and without highlighting the other routable components on the routing diagram 51. In other words, upon displaying a routing diagram corresponding to a selected hotspot, a routable component or routable components corresponding to a hotspot in that routing diagram is or are highlighted. Moreover, in at least some implementations, connectable components connectable to the highlighted routable components can also be highlighted upon displaying a different routing diagram in response to a selection of a hotspot.

The hotspot 382 includes an icon 386 and a textual description 387. Since the icon 386 and the textual description 387 are within the hotspot 382, the icon 386 and the textual description 387 are hotspots. The icon 386 is connected to and corresponds to the routable component 148. The textual description 387 indicates the textual routing diagram identifier 3 and the diagram count 4 for the routing diagram 51 shown in FIG. 17. The alphanumeric character within the icon 386 is identical to the alphanumeric character within the icon 193 shown in FIG. 17. The icon 193, 386 including the same alphanumeric character (i.e., "B") are both connected to a different portion of the routable component 148. The hotspot 382, the icon 386, and the textual description 387 is selectable to select the routable component 148 and the routing diagram 51 on which another portion of the routable component 148 is shown. In at least some implementations, in response to determining the hotspot 382, the icon 386, or the textual description 387 is selected, the processor 81 outputs the routing diagram 51 on the display 84 with a portion of the routable component 148 highlighted and without highlighting the other routable components on the routing diagram 51.

The hotspot 383 includes an icon 389 and a textual description 390. Since the icon 389 and the textual description 390 are within the hotspot 383, the icon 389 and the textual description 390 are hotspots. The icon 389 is connected to and corresponds to the routable component 116. The textual description 390 indicates the textual routing diagram identifier 3 and the diagram count 4 for another routing diagram, such as the routing diagram 38 (shown in FIG. 5 and FIG. 22). The hotspot 383, the icon 389, and the textual description 390 is selectable to select the routable component 116 and the routing diagram 38 on which another portion of the routable component 116 is shown. In at least some implementations, in response to determining the hotspot 383, the icon 389, or the textual description 390 is selected, the processor 81 outputs the routing diagram 38 on the display 84 with a portion of the routable component 116 highlighted and without highlighting the other routable components on the routing diagram 38.

In at least some implementations, a textual description within a hotspot (e.g., the textual description 390) does not include any description of a particular routing diagram. In those and/or alternative implementations, metadata corresponding to the hotspot 383 includes an identifier of a particular routing diagram (e.g., the routing diagram 38) corresponding to the hotspot.

The connectable component 350 includes a connector pin 623A, 624A, 625A, 626A, 639A, 640A, 641A, 642A, 643A, 644A, 645A, 646A, 647A, 648A, 649A, 650A. The connectable component 353 includes a connector pin 627A, 628A, 651A, 652A, 653A. The connectable component 354 includes a connector pin 629A, 630A, 654A, 655A, 656A. The connectable component 355 includes a connector pin 631A, 632A, 657A, 658A, 659A. The connectable component 356 includes a connector pin 633A, 634A, 660A, 661A, 662A. The connectable component 357 includes a connector pin 635A, 636A, 663A, 664A, 665A. The connectable component 358 includes a connector pin 637A, 638A, 666A, 667A, 668A.

The routable component 157 includes a connector pin 623B. The routable component 116 includes a connector pin 624B. The routable component 361 includes a connector pin 625B. The routable component 362 includes a connector pin 626B. The routable component 148 includes a connector pin 627B, 629B, 631B, 633B, 635B, 637B, 651B, 654B, 657B, 660B, 663B, 666B. The routable component 363 includes a connector pin 639B, 652B. The routable component 364 includes a connector pin 640B, 653B. The routable component 365 includes a connector pin 641B, 655B. The routable component 366 includes a connector pin 642B, 656B. The routable component 367 includes a connector pin 643B, 658B. The routable component 368 includes a connector pin 644B, 659B. The routable component 369 includes a connector pin 645B, 661B. The routable component 370 includes a connector pin 646B, 662B. The routable component 371 includes a connector pin 647B, 664B. The routable component 372 includes a connector pin 648B, 665B. The routable component 373 includes a connector pin 649B, 667B. The routable component 374 includes a connector pin 650B, 668B. The routable component 375 includes connector pin 628B. The routable component 376 includes connector pin 630B. The routable component 377 includes connector pin 632B. The routable component 378 includes connector pin 634B. The routable component 379 includes connector pin 636B. The routable component 380 includes connector pin 638B.

Figure 19:
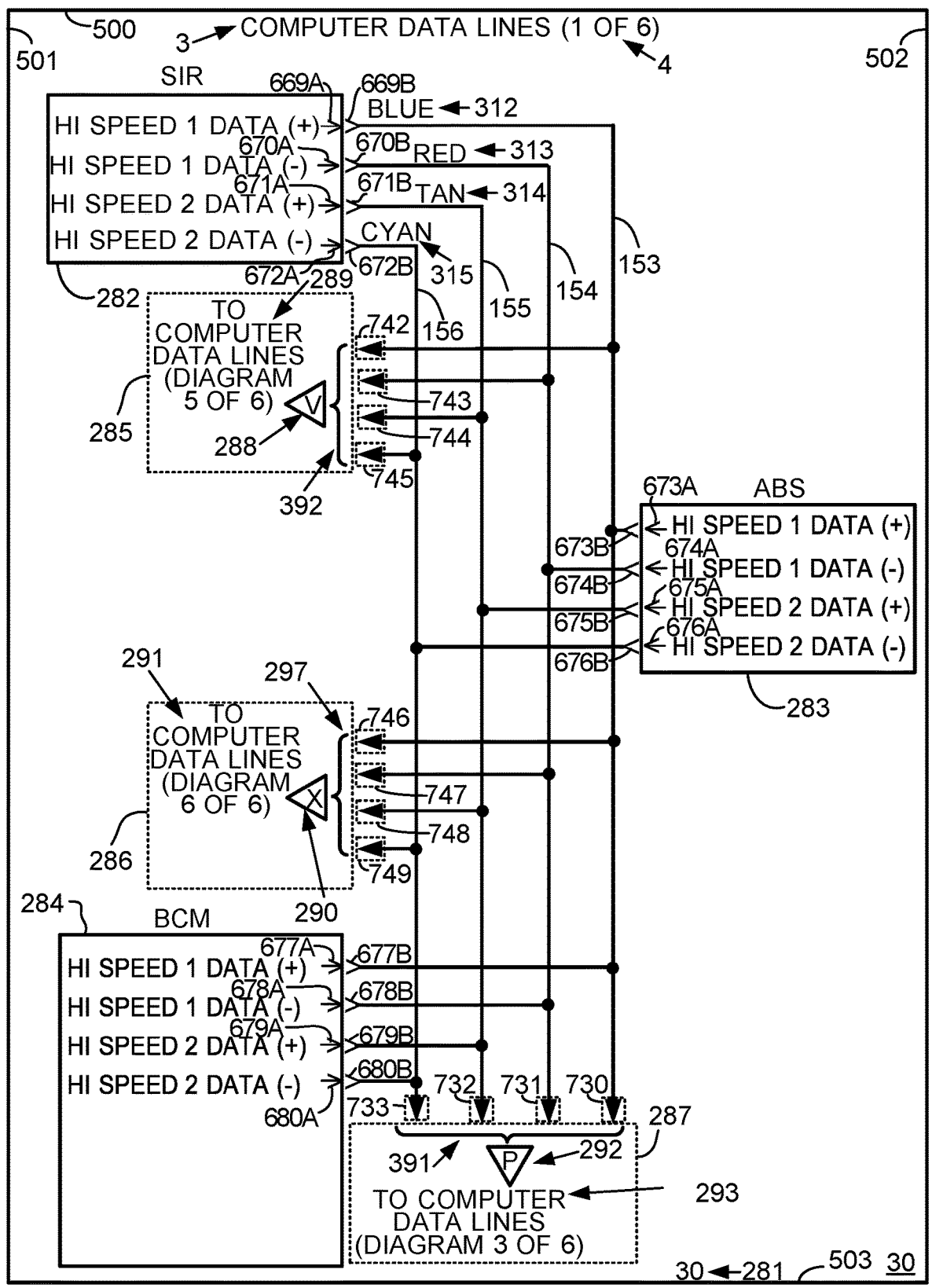

Next, FIG. 19 shows the routing diagram 30. The routing diagram 30 includes a routing diagram identifier 281. In some implementations, the routing diagram identifier 281 is visible on the display 84 while the routing diagram 30 is displayed on the display 84. In those or in other implementations, the routing diagram identifier 281 is stored within metadata corresponding to the routing diagram 30. The routing diagram identifier 281 is indicative of the routing diagram 30, which is a first of six routing diagrams corresponding to computer data lines. The textual routing diagram identifier 3 and the diagram count 4 within the routing diagram 30 indicate that the routing diagram 30 is the first of six routing diagrams corresponding to computer data lines.

The routing diagram 30 includes the routable component 153, 154, 155, 156. In at least some implementations, those reference numbers correspond to routable component numbers (e.g., electrical circuit numbers) visually present on the routing diagram 30. The routing diagram 30 includes a textual description 312, 313, 314, 315 that describes a color of the routable component 153, 154, 155, 156. The routing diagram 30 also includes a connectable component 282, 283, 284 representative of a supplemental inflatable restraint (SIR) ECU, an anti-lock brake system (ABS) ECU, and a body control module (BCM) ECU, respectively.

Additionally, the routing diagram 30 includes a hotspot 285, 286, 287, 730, 731, 732, 733, 742, 743, 744, 745, 746, 747, 748, 749. Although the hotspot 285, 286, 287, 730, 731, 732, 733, 742, 743, 744, 745, 746, 747, 748, 749 is represented using a dashed rectangular line, the hotspot 285, 286, 287, 730, 731, 732, 733, 742, 743, 744, 745, 746, 747, 748, 749 can cover a rectangular or non-rectangular area (e.g., a circular area) within the routing diagram 30 and a screen of the display 84.

The hotspot 285 includes an icon 288, a bracket icon 392, and a textual description 289. Since the icon 288, the bracket icon 392, and the textual description 289 are within the hotspot 285, the icon 288, the bracket icon 392, and the textual description 289 are hotspots. The textual description 289 indicates the textual routing diagram identifier for a routing diagram of the routing diagram set 20 shown in FIG. 5 (e.g., the routing diagram 34). That routing diagram would include a hotspot identifier (e.g., the letter "V" within a triangle) that matches and/or corresponds to the hotspot identifier within the icon 288. The bracket icon 392 corresponds to the routable component 153, 154, 155, 156 shown in the routing diagram 30 and to other portions of the routable component 153, 154, 155, 156 shown in the routing diagram 34. The bracket icon 392 is selectable to select the routable component 153, 154, 155, 156 via a single selection.

The icon 288 includes an alphanumeric character (i.e., the letter "V" within a triangle). That alphanumeric character is identical to an alphanumeric character within an icon within the routing diagram 34. The icon 288 is selectable to select the routable component 153, 154, 155, 156 via a single selection.

The hotspot 285, the icon 288, the bracket icon 392, and the textual description 289 is selectable to select the routable component 153, the routable component 154, the routable component 155, the routable component 156, and the routing diagram 31 via a single selection. In at least some implementations, in response to determining the hotspot 285, the icon 288, the bracket icon 392, or the textual description 289 is selected, the processor 81 outputs the routing diagram 34 on the display 84 with a portion of each of the routable component 153, the routable component 154, the routable component 155, the routable component 156 highlighted and without highlighting the other routable components on the routing diagram 34.

The hotspot 742, 743, 744, 745 includes a solid, filled black triangle that is connected to and corresponds to the routable component 153, 154, 155, 156, respectively. The hotspot 742, 743, 744, 745 is selectable to separately select the routable component 153, the routable component 154, the routable component 155, the routable component 156, respectively, and the routing diagram 34 via a single selection. In at least some implementations, the routable component 153 is highlighted on the display 84 when the routing diagram 34 is displayed in response to selection of the hotspot 742 and without highlighting the other routable components on the routing diagram 34. Likewise, in at least some implementations, the routable component 154 is highlighted on the display 84 when the routing diagram 34 is displayed in response to selection of the hotspot 743 and without highlighting the other routable components on the routing diagram 34. Similarly, in at least some implementations, the routable component 155 is highlighted on the display 84 when the routing diagram 34 is displayed in response to selection of the hotspot 744 and without highlighting the other routable components on the routing diagram 34. And further, in at least some implementations, the routable component 156 is highlighted on the display 84 when the routing diagram 34 is displayed in response to selection of the hotspot 745 and without highlighting the other routable components on the routing diagram 34.

The hotspot 286 includes an icon 290, a bracket icon 297, and a textual description 291. Since the icon 290, the bracket icon 297, and the textual description 291 are within the hotspot 286, the icon 290, the bracket icon 297 and the textual description 291 are hotspots. The textual description 291 indicates the textual routing diagram identifier for a routing diagram of the routing diagram set 20 shown in FIG. 5 (e.g., the routing diagram 35). That routing diagram would include a hotspot identifier (e.g., the letter "X" within a triangle) that matches and/or corresponds to the hotspot identifier within the icon 290. The bracket icon 297 corresponds to the routable component 153, 154, 155, 156 shown in the routing diagram 30 and to other portions of the routable component 153, 154, 155, 156 shown in the routing diagram 35. The bracket icon 297 is selectable to select the routable component 153, 154, 155, 156 via a single selection.

The icon 290 includes an alphanumeric character (i.e., the letter "X" within a triangle). That alphanumeric character is identical to an alphanumeric character within an icon within the routing diagram 35. The icon 290 is selectable to select the routable component 153, 154, 155, 156 via a single selection.

The hotspot 286, the icon 290, the bracket icon 297, and the textual description 291 is selectable to select the routable component 153, the routable component 154, the routable component 155, the routable component 156, and the routing diagram 31 via a single selection. In at least some implementations, in response to determining the hotspot 286, the icon 290, the bracket icon 297, or the textual description 291 is selected, the processor 81 outputs the routing diagram 30 on the display 84 with a portion of each of the routable component 153, the routable component 154, the routable component 155, the routable component 156 highlighted and without highlighting the other routable components on the routing diagram 30.

The hotspot 746, 747, 748, 749 includes a solid, filled black triangle that is connected to and corresponds to the routable component 153, 154, 155, 156, respectively. The hotspot 746, 747, 748, 749 is selectable to separately select the routable component 153, the routable component 154, the routable component 155, the routable component 156, respectively, and the routing diagram 34 via a single selection. In at least some implementations, the routable component 153 is highlighted on the display 84 when the routing diagram 30 is displayed in response to selection of the hotspot 746 and without highlighting the other routable components on the routing diagram 30. Likewise, in at least some implementations, the routable component 154 is highlighted on the display 84 when the routing diagram 30 is displayed in response to selection of the hotspot 747 and without highlighting the other routable components on the routing diagram 30. Similarly, in at least some implementations, the routable component 155 is highlighted on the display 84 when the routing diagram 30 is displayed in response to selection of the hotspot 748 and without highlighting the other routable components on the routing diagram 30. And further, in at least some implementations, the routable component 156 is highlighted on the display 84 when the routing diagram 30 is displayed in response to selection of the hotspot 749 and without highlighting the other routable components on the routing diagram 30.

The hotspot 287 includes an icon 292, a bracket icon 391, and a textual description 293. Since the icon 292, the bracket icon 391, and the textual description 293 are within the hotspot 287, the icon 292, the bracket icon 391 and the textual description 293 are hotspots. The textual description 293 indicates the textual routing diagram identifier for a routing diagram of the routing diagram set 20 shown in FIG. 5 (e.g., the routing diagram 32). That routing diagram would include a hotspot identifier (e.g., the letter "P" within a triangle) that matches and/or corresponds to the hotspot identifier within the icon 292. The bracket icon 391 corresponds to the routable component 153, 154, 155, 156 shown in the routing diagram 30 and to other portions of the routable component 153, 154, 155, 156 shown in the routing diagram 32. The bracket icon 391 is selectable to select the routable component 153, 154, 155, 156 via a single selection.

The icon 292 includes an alphanumeric character (i.e., the letter "P" within a triangle). That alphanumeric character is identical to an alphanumeric character within an icon within the routing diagram 32. The icon 292 is selectable to select the routable component 153, 154, 155, 156 via a single selection.

The hotspot 287, the icon 292, the bracket icon 391, and the textual description 293 is selectable to select the routable component 153, the routable component 154, the routable component 155, the routable component 156, and the routing diagram 31 via a single selection. In at least some implementations, in response to determining the hotspot 287, the icon 292, the bracket icon 391, or the textual description 293 is selected, the processor 81 outputs the routing diagram 32 on the display 84 with a portion of each of the routable component 153, the routable component 154, the routable component 155, the routable component 156 highlighted and without highlighting the other routable components on the routing diagram 32.

The hotspot 730, 731, 732, 733 includes a solid, filled black triangle that is connected to and corresponds to the routable component 153, 154, 155, 156, respectively. The hotspot 730, 731, 732, 733 is selectable to separately select the routable component 153, the routable component 154, the routable component 155, the routable component 156, respectively, and the routing diagram 34 via a single selection. In at least some implementations, the routable component 153 is highlighted on the display 84 when the routing diagram 32 is displayed in response to selection of the hotspot 730 and without highlighting the other routable components on the routing diagram 32. Likewise, in at least some implementations, the routable component 154 is highlighted on the display 84 when the routing diagram 32 is displayed in response to selection of the hotspot 731 and without highlighting the other routable components on the routing diagram 32. Similarly, in at least some implementations, the routable component 155 is highlighted on the display 84 when the routing diagram 32 is displayed in response to selection of the hotspot 732 and without highlighting the other routable components on the routing diagram 32. And further, in at least some implementations, the routable component 156 is highlighted on the display 84 when the routing diagram 32 is displayed in response to selection of the hotspot 733 and without highlighting the other routable components on the routing diagram 32.

The connectable component 282 includes a connector pin 669A, 670A, 671A, 672A. The connectable component 283 includes a connector pin 673A, 674A, 675A, 676A. The connectable component 284 includes a connector pin 677A, 678A, 679A, 680A. The routable component 153 includes a connector pin 669B, 673B, 677B. The routable component 154 includes a connector pin 670B, 674B, 678B. The routable component 155 includes a connector pin 671B, 675B, 679B. The routable component 156 includes a connector pin 672B, 676B, 680B.

Next, FIG. 20 shows the routing diagram 31. The routing diagram 31 includes a routing diagram identifier 301. In some implementations, the routing diagram identifier 301 is visible on the display 84 while the routing diagram 31 is displayed on the display 84. In those or in other implementations, the routing diagram identifier 301 is stored within metadata corresponding to the routing diagram 31. The routing diagram identifier 301 is indicative of the routing diagram 31, which is a second of six routing diagrams corresponding to computer data lines. The textual routing diagram identifier 3 and the diagram count 4 within the routing diagram 31 indicate that the routing diagram 31 is the second of six routing diagrams corresponding to computer data lines.

The routing diagram 31 includes the routable component 134, 135, 137, 153, 154, 155, 156, 242. In at least some implementations, those reference numbers correspond to routable component numbers (e.g., electrical circuit numbers) visually present on the routing diagram 31. The routing diagram 31 also includes a connectable component 302, 303, 304 representative of an engine control module ECU, an engine coolant temperature sensor, and an ignition/start switch, respectively. The routable component 134, 137 connects and/or is connectable to the connectable component 302, 303. The routable component 242 connects and/or is connectable to the connectable component 302, 304.

Additionally, the routing diagram 31 includes a hotspot 306, 307, 774, 775, 776, 777, 778, 779, 780, 781. Although the hotspot 306, 307, 774, 775, 776, 777, 778, 779, 780, 781 is represented using a dashed rectangular line, the hotspot 306, 307, 774, 775, 776, 777, 778, 779, 780, 781 can cover a rectangular or non-rectangular area (e.g., a circular area) within the routing diagram 31 and a screen of the display 84.

The hotspot 306 includes a bracket icon 308 and a textual description 309. Since the bracket icon 308 and the textual description 309 are within the hotspot 306, the bracket icon 308 and the textual description 309 are hotspots. The textual description 309 indicates the textual routing diagram identifier for a routing diagram 51 shown in FIG. 17. The bracket icon 308 corresponds to the routable component 153, 154, 155, 156 shown in the routing diagram 31. The bracket icon 308 is selectable to select the routable component 153, 154, 155, 156 via a single selection.

The hotspot 306, the bracket icon 308, and the textual description 309 is selectable to select the routable component 153, the routable component 154, the routable component 155, the routable component 156, and the routing diagram 51 via a single selection. In at least some implementations, in response to determining the hotspot 306, the bracket icon 308, or the textual description 309 is selected, the processor 81 outputs the routing diagram 51 on the display 84 with a portion of each of the routable component 153, the routable component 154, the routable component 155, the routable component 156 highlighted and without highlighting the other routable components on the routing diagram 51.

The hotspot 774, 775, 776, 777 includes a solid, filled black triangle that is connected to and corresponds to the routable component 153, 154, 155, 156, respectively. The hotspot 774, 775, 776, 777 is selectable to separately select the routable component 153, the routable component 154, the routable component 155, the routable component 156, respectively, and the routing diagram 51 via a single selection. In at least some implementations, the routable component 153 is highlighted on the display 84 when the routing diagram 51 is displayed in response to selection of the hotspot 774 and without highlighting the other routable components on the routing diagram 51. Likewise, in at least some implementations, the routable component 154 is highlighted on the display 84 when the routing diagram 51 is displayed in response to selection of the hotspot 775 and without highlighting the other routable components on the routing diagram 51. Similarly, in at least some implementations, the routable component 155 is highlighted on the display 84 when the routing diagram 51 is displayed in response to selection of the hotspot 776 and without highlighting the other routable components on the routing diagram 51. And further, in at least some implementations, the routable component 156 is highlighted on the display 84 when the routing diagram 51 is displayed in response to selection of the hotspot 777 and without highlighting the other routable components on the routing diagram 51.

The hotspot 307 includes an icon 310, a bracket icon 316, and a textual description 311. Since the icon 310, the bracket icon 316, and the textual description 311 are within the hotspot 307, the icon 310, the bracket icon 316, and the textual description 311 are hotspots. The textual description 311 indicates the textual routing diagram identifier for the routing diagram 33 shown in FIG. 5 (i.e., the fourth of six routing diagrams of the routing diagram set 20 regarding computer data lines). That routing diagram would include a hotspot identifier (e.g., the letter "Q" within a triangle) that matches and/or corresponds to the hotspot identifier within the icon 310. The bracket icon 316 corresponds to the routable component 153, 154, 155, 156 shown in the routing diagram 31 and to other portions of the routable component 153, 154, 155, 156 shown in the routing diagram 33. The bracket icon 316 is selectable to select the routable component 153, 154, 155, 156 via a single selection.

The icon 310 includes an alphanumeric character (i.e., the letter "Q" within a triangle). That alphanumeric character is identical to an alphanumeric character within an icon within the routing diagram 33. The icon 310 is selectable to select the routable component 153, 154, 155, 156 via a single selection.

The hotspot 307, the icon 310, the bracket icon 316, and the textual description 311 is selectable to select the routable component 153, the routable component 154, the routable component 155, the routable component 156, and the routing diagram 33 via a single selection. In at least some implementations, in response to determining the hotspot 307, the icon 310, the bracket icon 316, or the textual description 311 is selected, the processor 81 outputs the routing diagram 33 on the display 84 with a portion of each of the routable component 153, the routable component 154, the routable component 155, the routable component 156 highlighted and without highlighting the other routable components on the routing diagram 33.

The hotspot 778, 779, 780, 781 includes a solid, filled black triangle that is connected to and corresponds to the routable component 153, 154, 155, 156, respectively. The hotspot 778, 779, 780, 781 is selectable to separately select the routable component 153, the routable component 154, the routable component 155, the routable component 156, respectively, and the routing diagram 33 via a single selection. In at least some implementations, the routable component 153 is highlighted on the display 84 when the routing diagram 33 is displayed in response to selection of the hotspot 778 and without highlighting the other routable components on the routing diagram 33. Likewise, in at least some implementations, the routable component 154 is highlighted on the display 84 when the routing diagram 33 is displayed in response to selection of the hotspot 779 and without highlighting the other routable components on the routing diagram 33. Similarly, in at least some implementations, the routable component 155 is highlighted on the display 84 when the routing diagram 33 is displayed in response to selection of the hotspot 780 and without highlighting the other routable components on the routing diagram 33. And further, in at least some implementations, the routable component 156 is highlighted on the display 84 when the routing diagram 33 is displayed in response to selection of the hotspot 781 and without highlighting the other routable components on the routing diagram 33.

The connectable component 302 includes a connector pin 681A, 682A, 683A, 684A, 685A, 686A, 687A, 688A. The connectable component 303 includes a connector pin 689A, 690A. The connectable component 304 includes a connector pin 691A. The routable component 134 includes a connector pin 681B, 689B. The routable component 137 includes a connector pin 682B, 690B. The routable component 242 includes a connector pin 683B, 691B. The routable component 153 includes a connector pin 684B. The routable component 154 includes a connector pin 685B. The routable component 155 includes a connector pin 686B. The routable component 156 includes a connector pin 687B. The routable component 135 includes a connector pin 688B.

Figure 21:
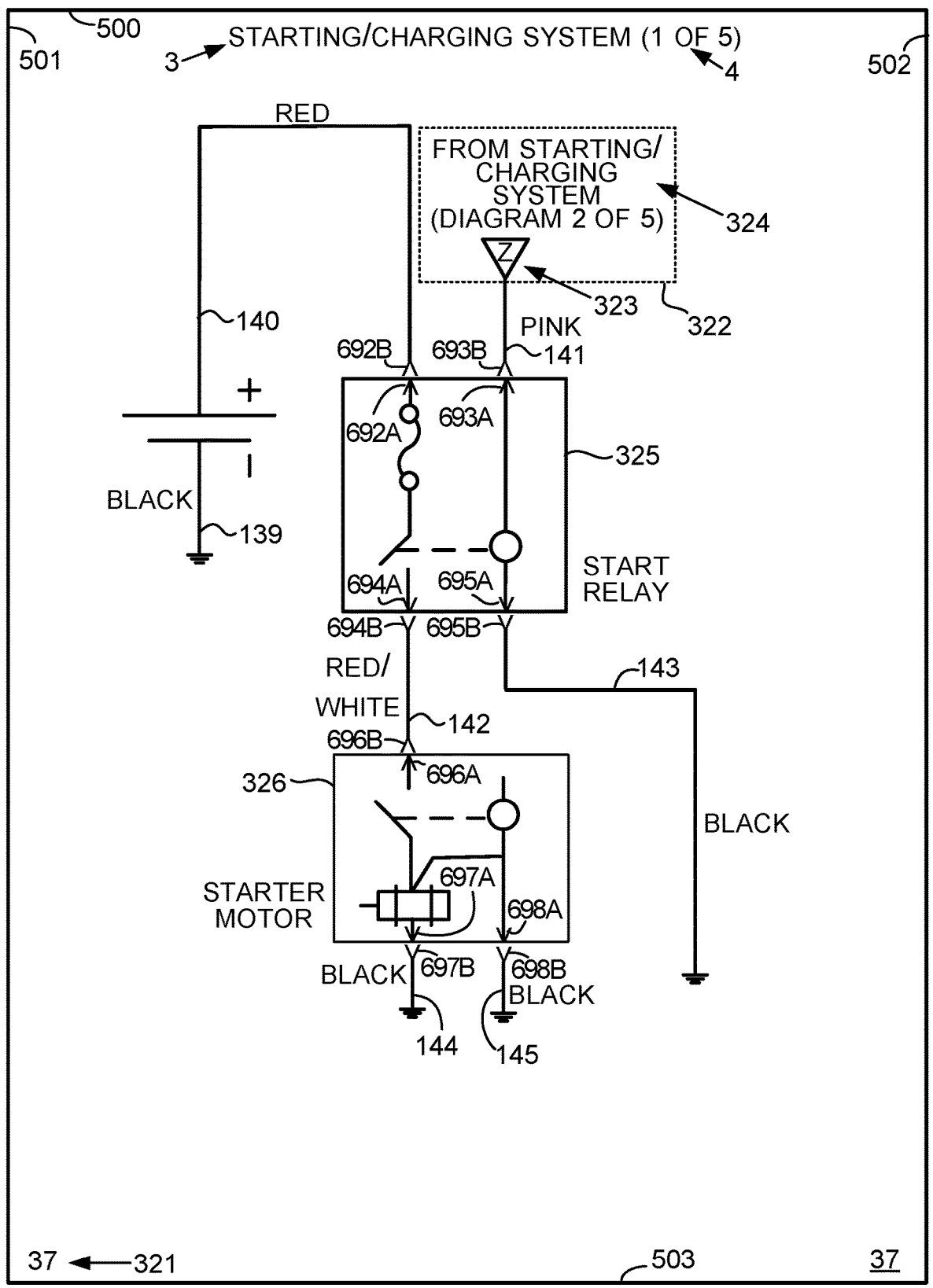

Next, FIG. 21 shows the routing diagram 37. The routing diagram 37 includes a routing diagram identifier 321. In some implementations, the routing diagram identifier 321 is visible on the display 84 while the routing diagram 37 is displayed on the display 84. In those or in other implementations, the routing diagram identifier 321 is stored within metadata corresponding to the routing diagram 37. The routing diagram identifier 321 is indicative of the routing diagram 37, which is a first of five routing diagrams corresponding to a starting/charging system. The textual routing diagram identifier 3 and the diagram count 4 within the routing diagram 37 indicate that the routing diagram 37 is the first of five routing diagrams corresponding to the starting/charging system.

The routing diagram 37 includes the routable component 139, 140, 141, 142, 143, 144, 145. In at least some implementations, those reference numbers correspond to routable component numbers (e.g., electrical circuit numbers) visually present on the routing diagram 37. Similar to other routing diagrams described above, the routing diagram 37 includes a textual description that describes a color of the routable component 139, 140, 141, 142, 143, 144, 145. The routing diagram 37 also includes a connectable component 325, 326 representative of a start relay, and a starter motor, respectively.

Additionally, the routing diagram 37 includes a hotspot 322. Although the hotspot 322 is represented using a dashed rectangular line, the hotspot 322 can cover a rectangular or non-rectangular area (e.g., a circular area) within the routing diagram 37 and a screen of the display 84.

Figure 22:
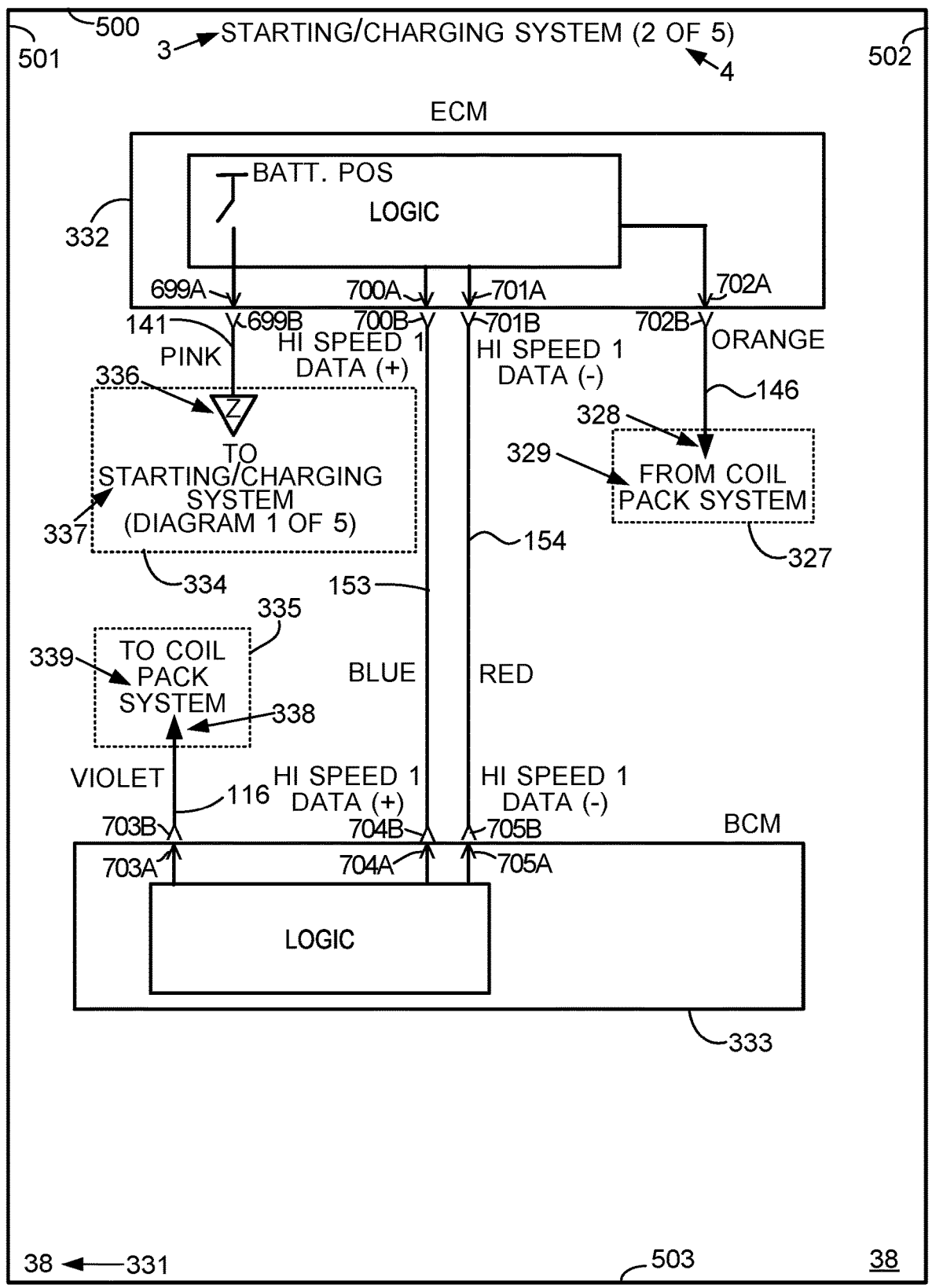

The hotspot 322 includes an icon 323 and a textual description 324. Since the icon 323 and the textual description 324 are within the hotspot 322, the icon 323 and the textual description 324 are hotspots. The textual description 324 indicates the textual routing diagram identifier 3 and the diagram count 4 for the routing diagram 38 (which is shown in FIG. 22). The icon 323 is connected to and corresponds to the routable component 141.

The hotspot 322, the icon 323, and the textual description 324 is selectable to select the routable component 141 and the routing diagram 38 via a single selection. In at least some implementations, in response to determining the hotspot 322, the icon 323, or the textual description 324 is selected, the processor 81 outputs the routing diagram 38 on the display 84 with a portion of each of the routable component 141 highlighted and without highlighting the other routable components on the routing diagram 38.

The connectable component 325 includes a connector pin 692A, 693A, 694A, 695A. The connectable component 326 includes a connector pin 696A, 697A, 698A. The routable component 140 includes a connector pin 692B. The routable component 141 includes a connector pin 693B. The routable component 142 includes a connector pin 694B, 696B. The routable component 143 includes a connector pin 695B. The routable component 144 includes a connector pin 697B. The routable component 145 includes a connector pin 698B.

Next, FIG. 22 shows the routing diagram 38. The routing diagram 38 includes a routing diagram identifier 331. In some implementations, the routing diagram identifier 331 is visible on the display 84 while the routing diagram 38 is displayed on the display 84. In those or in other implementations, the routing diagram identifier 331 is stored within metadata corresponding to the routing diagram 38. The routing diagram identifier 331 is indicative of the routing diagram 38, which is a second of five routing diagrams corresponding to the starting/charging system. The textual routing diagram identifier 3 and the diagram count 4 within the routing diagram 38 indicate that the routing diagram 38 is the second of five routing diagrams corresponding to the starting/charging system.

The routing diagram 38 includes the routable component 116, 141, 146, 153, 154. In at least some implementations, those reference numbers correspond to routable component numbers (e.g., electrical circuit numbers) visually present on the routing diagram 38. Similar to other routing diagrams described above, the routing diagram 38 includes a textual description that describes a color of the routable component 116, 141, 146, 153, 154. The routing diagram 38 also includes a connectable component 332, 333 representative of an engine control module (ECM) ECU, and a body control module BCM ECU, respectively.

Additionally, the routing diagram 38 includes a hotspot 327, 334, 335. Although the hotspot 327, 334, 335 is represented using a dashed rectangular line, the hotspot 327, 334, 335 can cover a rectangular or non-rectangular area (e.g., a circular area) within the routing diagram 38 and a screen of the display 84.

The hotspot 327 includes an icon 328 and a textual description 329. Since the icon 328 and the textual description 329 are within the hotspot 327, the icon 328 and the textual description 329 are hotspots. The icon 328 is connected to and corresponds to the routable component 146. The textual description 329 indicates the textual routing diagram identifier 3 and the diagram count 4 for another routing diagram, such as the routing diagram 51 shown in FIG. 5 and FIG. 17. Metadata corresponding to the hotspot 327 can include an identifier of the routing diagram 51 and the routable component 146. In at least some implementations, in response to determining the hotspot 327, the processor 81 can output the routing diagram 51 on the display 84. Furthermore, in response to a selection of the hotspot 327, the icon 328, or the textual description 329 is selected, the processor 81 can display the routing diagram 51 on the display 84 with the routable component 146 highlighted and without highlighting the other routable components on the routing diagram 51.

The hotspot 334 includes an icon 336 and a textual description 337. Since the icon 336 and the textual description 337 are within the hotspot 334, the icon 336 and the textual description 337 are hotspots. The textual description 337 indicates the textual routing diagram identifier 3 and the diagram count 4 for the routing diagram 37 (which is shown in FIG. 21). The icon 336 is connected to and corresponds to the routable component 141.

The hotspot 334, the icon 336, and the textual description 337 is selectable to select the routable component 141 and the routing diagram 37 via a single selection. In at least some implementations, in response to determining the hotspot 334, the icon 336, or the textual description 337 is selected, the processor 81 outputs the routing diagram 37 on the display 84 with a portion of each of the routable component 141 highlighted and without highlighting the other routable components on the routing diagram 37.

The hotspot 335 includes an icon 338 and a textual description 339. Since the icon 338 and the textual description 339 are within the hotspot 335, the icon 338 and the textual description 339 are hotspots. The icon 338 is connected to and corresponds to the routable component 116. The textual description 339 indicates the textual routing diagram identifier 3 and the diagram count 4 for another routing diagram, such as the routing diagram 52 shown in FIG. 5 and FIG. 16. Metadata corresponding to the hotspot 335 can include an identifier of the routing diagram 52 and the routable component 116. In at least some implementations, in response to a selection of the hotspot 335, the icon 338, or the textual description 339, the processor 81 can output the routing diagram 52 on the display 84. Furthermore, in response to a selection of the hotspot 335, the icon 338, or the textual description 339, the processor 81 can display the routing diagram 52 on the display 84 with the routable component 116 highlighted and without highlighting the other routable components on the routing diagram 52.

The connectable component 332 includes a connector pin 699A, 700A, 701A, 702A. The connectable component 333 includes a connector pin 703A, 704A, 705A. The routable component 141 includes a connector pin 699B. The routable component 153 includes a connector pin 700B, 704B. The routable component 154 includes a connector pin 701B, 705B. The routable component 146 includes a connector pin 702B. The routable component 116 includes a connector pin 703B.

Figure 23:
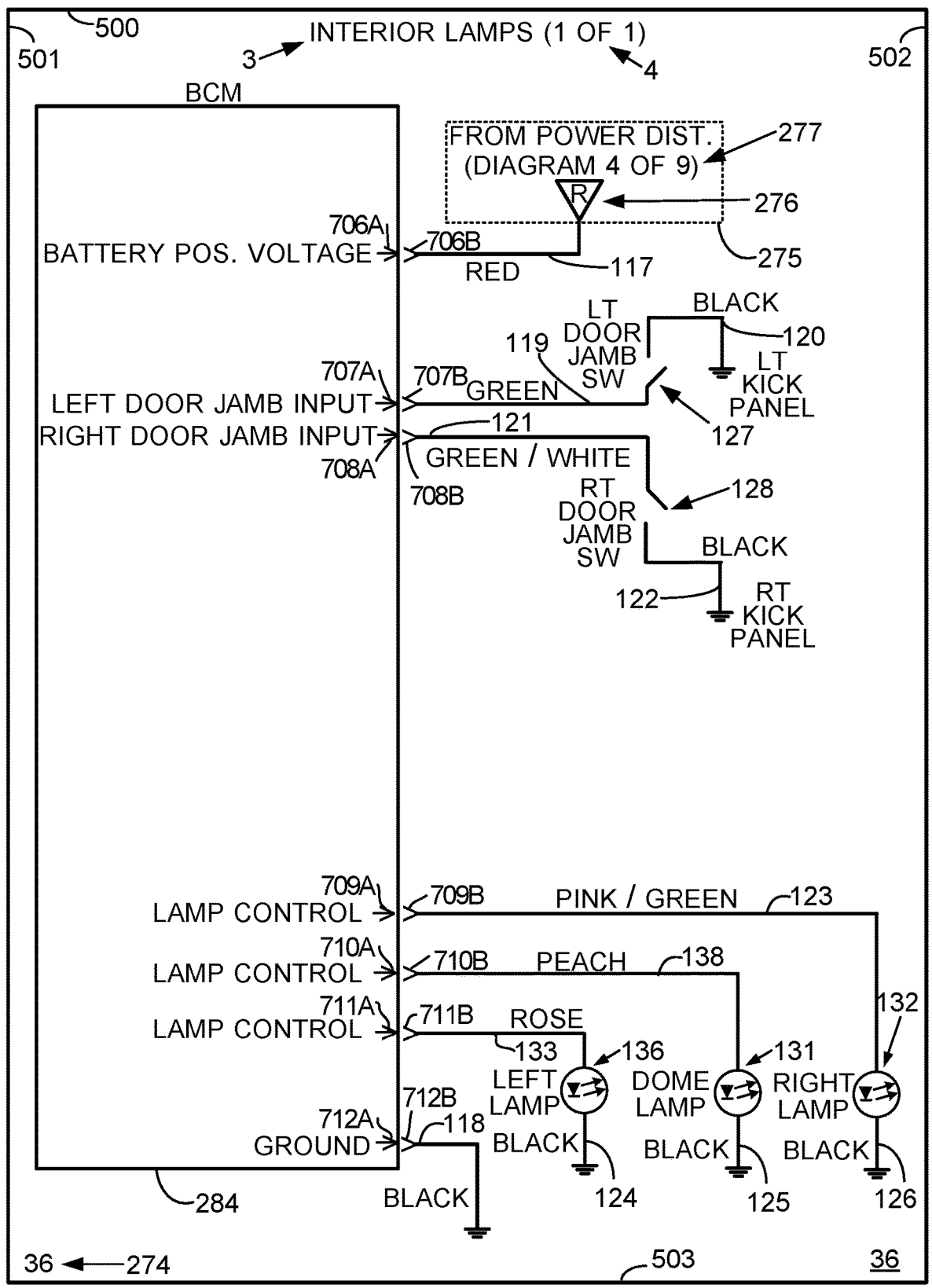

Next, FIG. 23 shows the routing diagram 36. The routing diagram 36 includes a routing diagram identifier 274. In some implementations, the routing diagram identifier 274 is visible on the display 84 while the routing diagram 36 is displayed on the display 84. In those or in other implementations, the routing diagram identifier 274 is stored within metadata corresponding to the routing diagram 36. The routing diagram identifier 274 is indicative of the routing diagram 36, which is a first of one routing diagram corresponding to interior lamps. The textual routing diagram identifier 3 and the diagram count 4 within the routing diagram 36 indicate that the routing diagram 36 is the first of one routing diagram corresponding to the interior lamps.

The routing diagram 36 includes the routable component 117, 118, 119, 120, 121, 122, 123, 124, 125, 126, 133, 138. In at least some implementations, those reference numbers correspond to routable component numbers (e.g., electrical circuit numbers) visually present on the routing diagram 36. The routing diagram 36 also includes a connectable component 127, 128, 131, 132, 136, 284 representative of a left-side door jamb switch, a right-side door jamb switch, a left-side lamp, a dome lamp, a right-side lamp, and a BCM ECU, respectively.

Additionally, the routing diagram 36 includes a hotspot 275. Although the hotspot 275 is represented using a dashed rectangular line, the hotspot 275 can cover a rectangular or non-rectangular area (e.g., a circular area) within the routing diagram 36 and a screen of the display 84.

The hotspot 275 includes an icon 276 and a textual description 277. Since the icon 276 and the textual description 277 are within the hotspot 275, the icon 276 and the textual description 277 are hotspots. The icon 276 is connected to and corresponds to the routable component 117. The textual description 277 indicates the textual routing diagram identifier and the diagram count for the routing diagram 45 shown in FIG. 5. The hotspot 275, the icon 276, and the textual description 277 is selectable to select the routable component 117 and the routing diagram 45 on which another portion of the routable component 117 is shown. In at least some implementations, in response to determining the hotspot 275, the icon 276, or the textual description 277 is selected, the processor 81 outputs the routing diagram 45 on the display 84 with a portion of the routable component 117 highlighted and without highlighting any other routable component(s) on the routing diagram 45.

The connectable component 284 includes a connector pin 706A, 707A, 708A, 709A, 710A, 711A, 712A. The routable component 117 includes a connector pin 706B. The routable component 119 includes a connector pin 707B. The routable component 121 includes a connector pin 708B. The routable component 123 includes a connector pin 709B. The routable component 138 includes a connector pin 710B. The routable component 133 includes a connector pin 711B. The routable component 118 includes a connector pin 712B.

Next, FIG. 24, FIG. 25, FIG. 26, and FIG. 27 show the routing diagram 37, 38, 31, and 31, also shown in FIG. 21, FIG. 22, FIG. 20, and FIG. 20, respectively, except that in FIG. 24, FIG. 25, FIG. 26, and FIG. 27, the routing diagram 37, 38, 31, and 31, respectively, include at least one routable component that is highlighted with highlighting 299.

Figure 24:
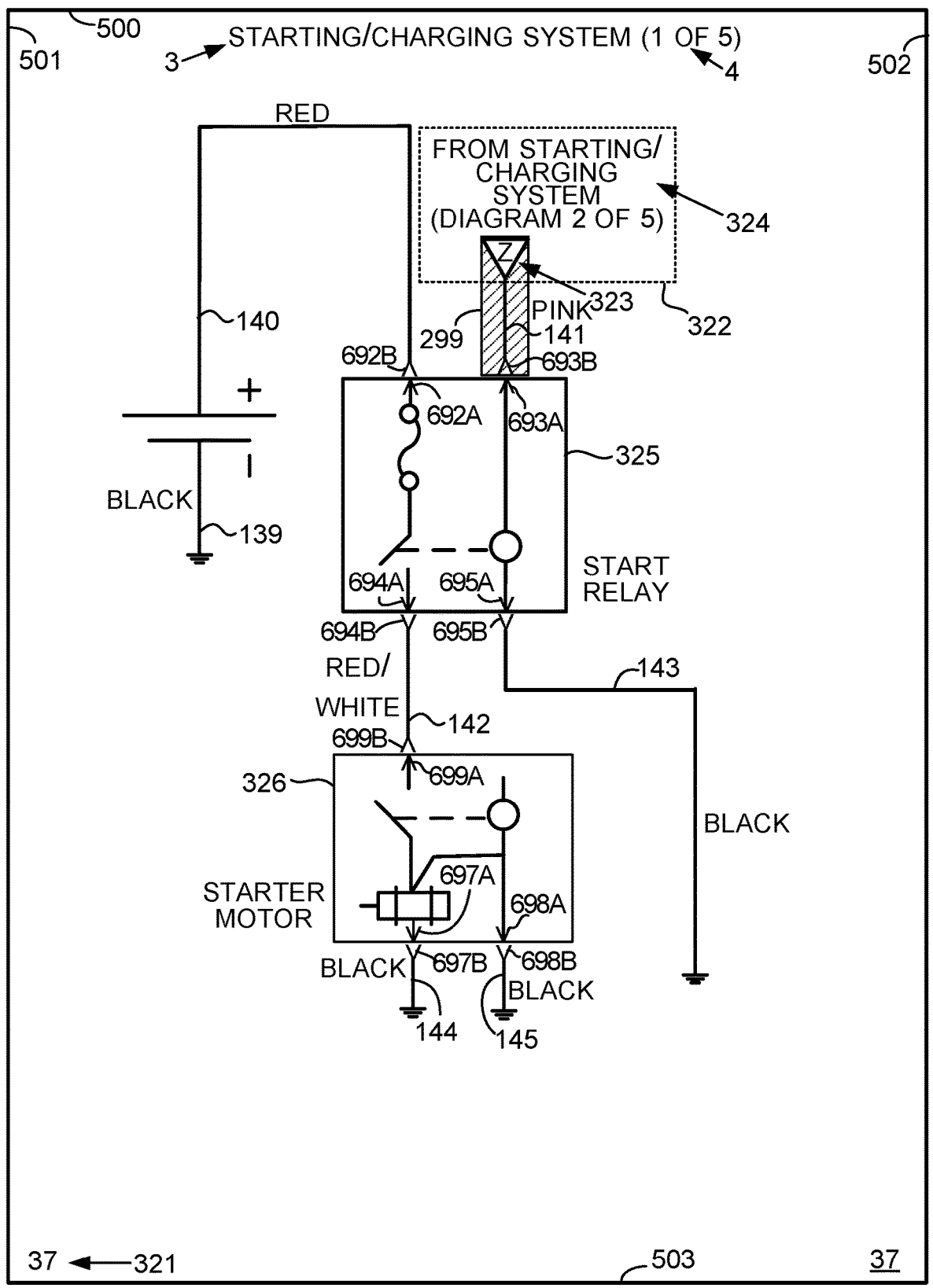

For example, in FIG. 24, the routable component 141 is highlighted. The display 84 can show the routing diagram 37 with the routable component 141 highlighted in response to a selection of the hotspot 334, the icon 336, or the textual description 337 in the routing diagram 38 shown in FIG. 22 and FIG. 25. Displaying the routable component 141 in FIG. 24 highlighted after selecting the hotspot 334, the icon 336, or the textual description 337 in FIG. 22 represents that a routable component corresponding to a hotspot can be highlighted in a routing diagram displayed in response to a selection of the hotspot even if the routable component was not highlighted (in the departure routing diagram containing the hotspot) when the hotspot was selected. Displaying the routable component 141 in FIG. 24 highlighted after selecting the hotspot 334, the icon 336, or the textual description 337 in FIG. 25 represents that a routable component corresponding to a hotspot can be highlighted in a routing diagram displayed in response to a selection of the hotspot if the routable component was highlighted (in the departure routing diagram containing the hotspot) when the hotspot was selected and/or in response to a selection of the hotspot corresponding to the routable component.

Figure 25:
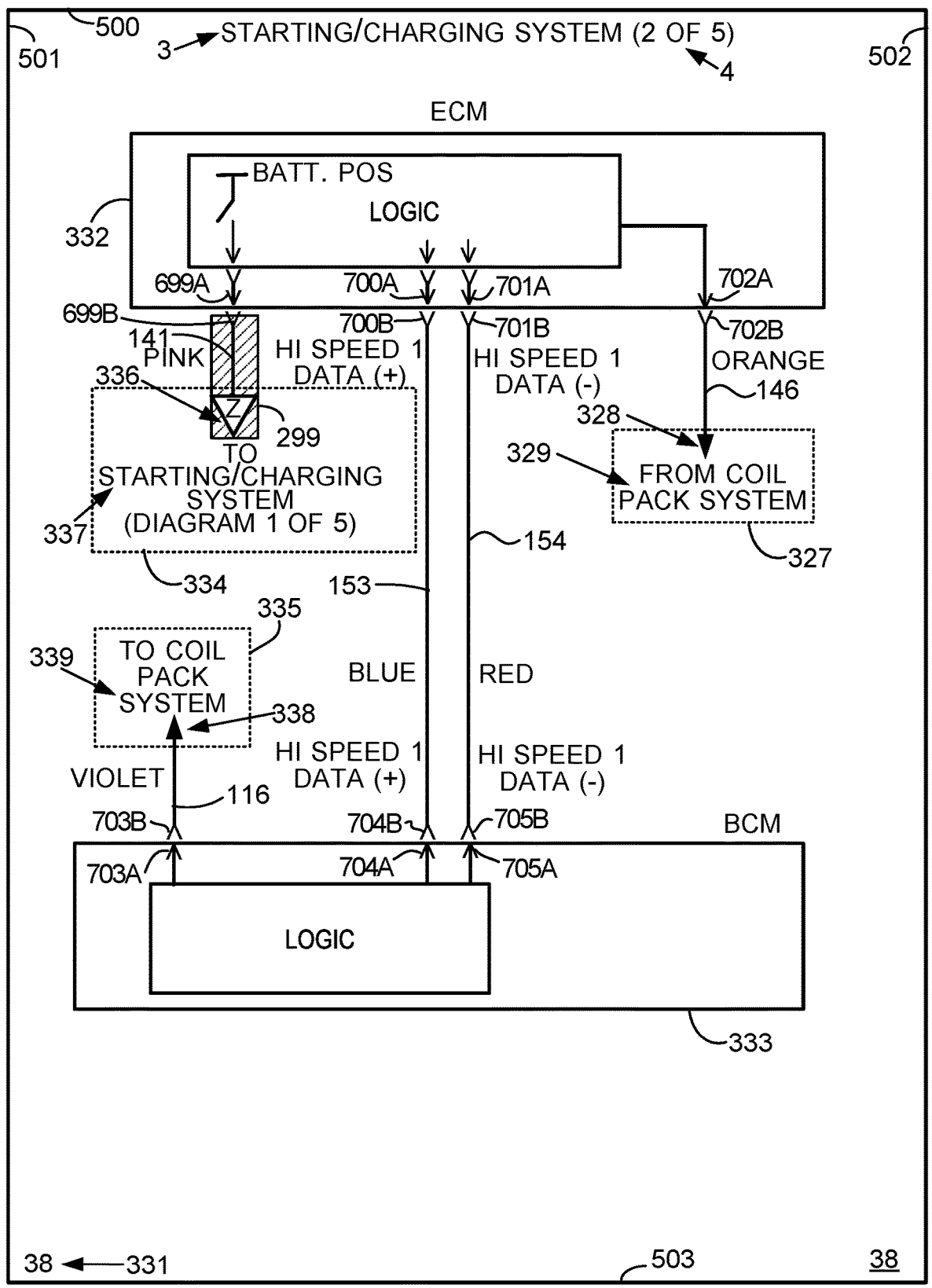

As another example, in FIG. 25, the routable component 141 is highlighted. The display 84 can show the routing diagram 38 with the routable component 141 highlighted in response to a selection of the hotspot 322, the icon 323, or the textual description 324 from the routing diagram 37 shown in FIG. 21 and FIG. 24. Displaying the routable component 141 in FIG. 25 highlighted after selecting the hotspot 322, the icon 323, or the textual description 324 in FIG. 21 represents that a routable component corresponding to a hotspot can be highlighted in a routing diagram displayed in response to a selection of the hotspot even if the routable component was not highlighted (in the departure routing diagram containing the hotspot) when the hotspot was selected. Displaying the routable component 141 in FIG. 25 highlighted after selecting the hotspot 322, the icon 323, or the textual description 324 in FIG. 24 represents that a routable component corresponding to a hotspot can be highlighted in a routing diagram displayed in response to a selection of the hotspot if the routable component was highlighted (in the departure routing diagram containing the hotspot) when the hotspot was selected and/or in response to a selection of the hotspot corresponding to the routable component.

Figure 26:
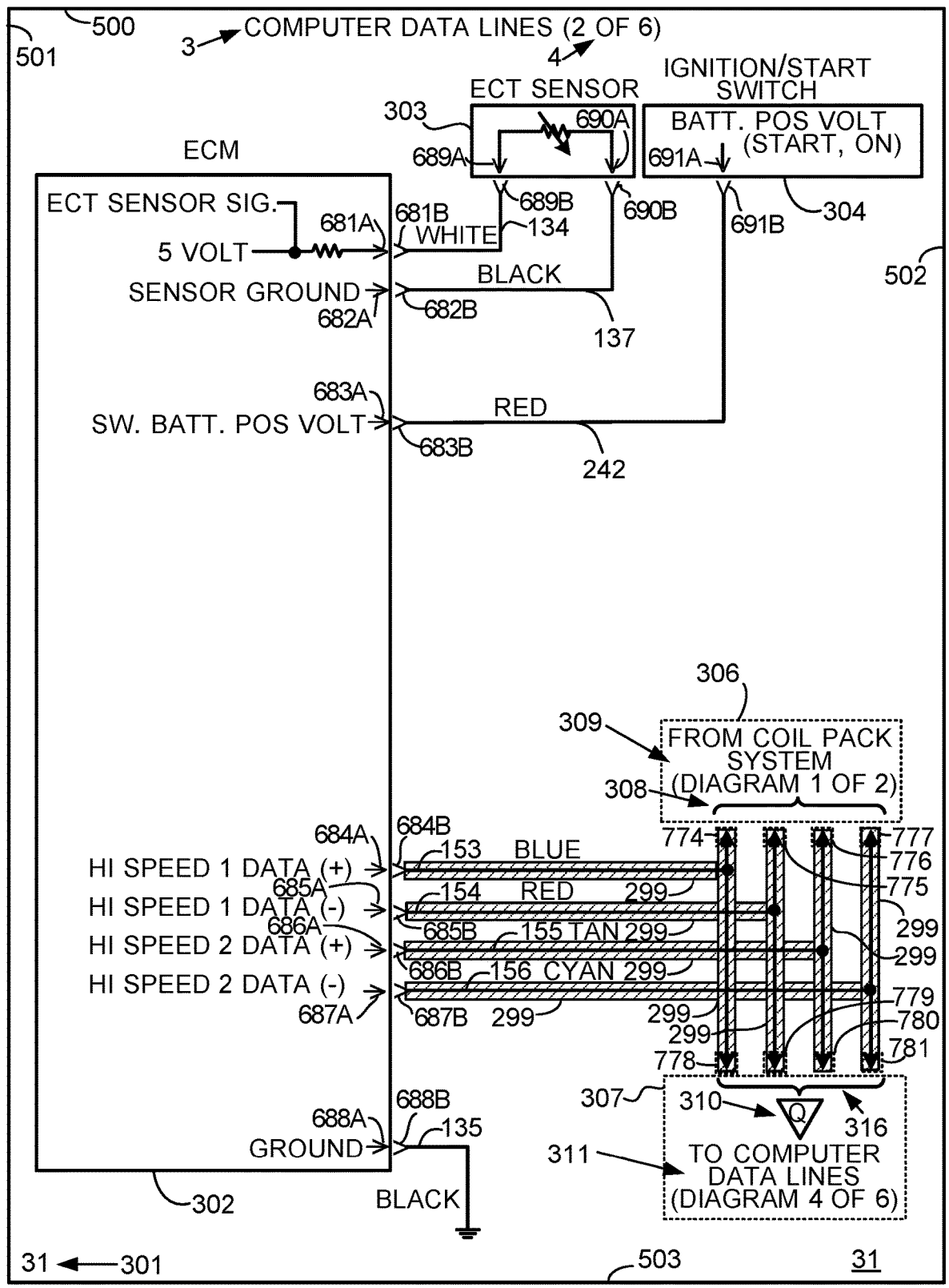

As yet another example, in FIG. 26, the routable component 153, the routable component 154, the routable component 155, and the routable component 156 are highlighted. The display 84 can show the routing diagram 31 with the routable component 153, the routable component 154, the routable component 155, and the routable component 156 highlighted in response to a selection of the hotspot 189, the bracket icon 197, or the textual description 198 (all within the routing diagram 51 shown in FIG. 17), even if one or more or none of the routable component 153, the routable component 154, the routable component 155, or the routable component 156 is not highlighted at the time of that selection. The routable component 153, the routable component 154, the routable component 155, and the routable component 156 can also be displayed as highlighted in FIG. 26 because the routable component 153, the routable component 154, the routable component 155, and the routable component 156 were highlighted at the time of the selection of the hotspot 189, the bracket icon 197, or the textual description 198 and/or in response to a selection of a hotspot contained in the routing diagram 33 (i.e., a routing diagram that described by the textual description 311).

Figure 27:
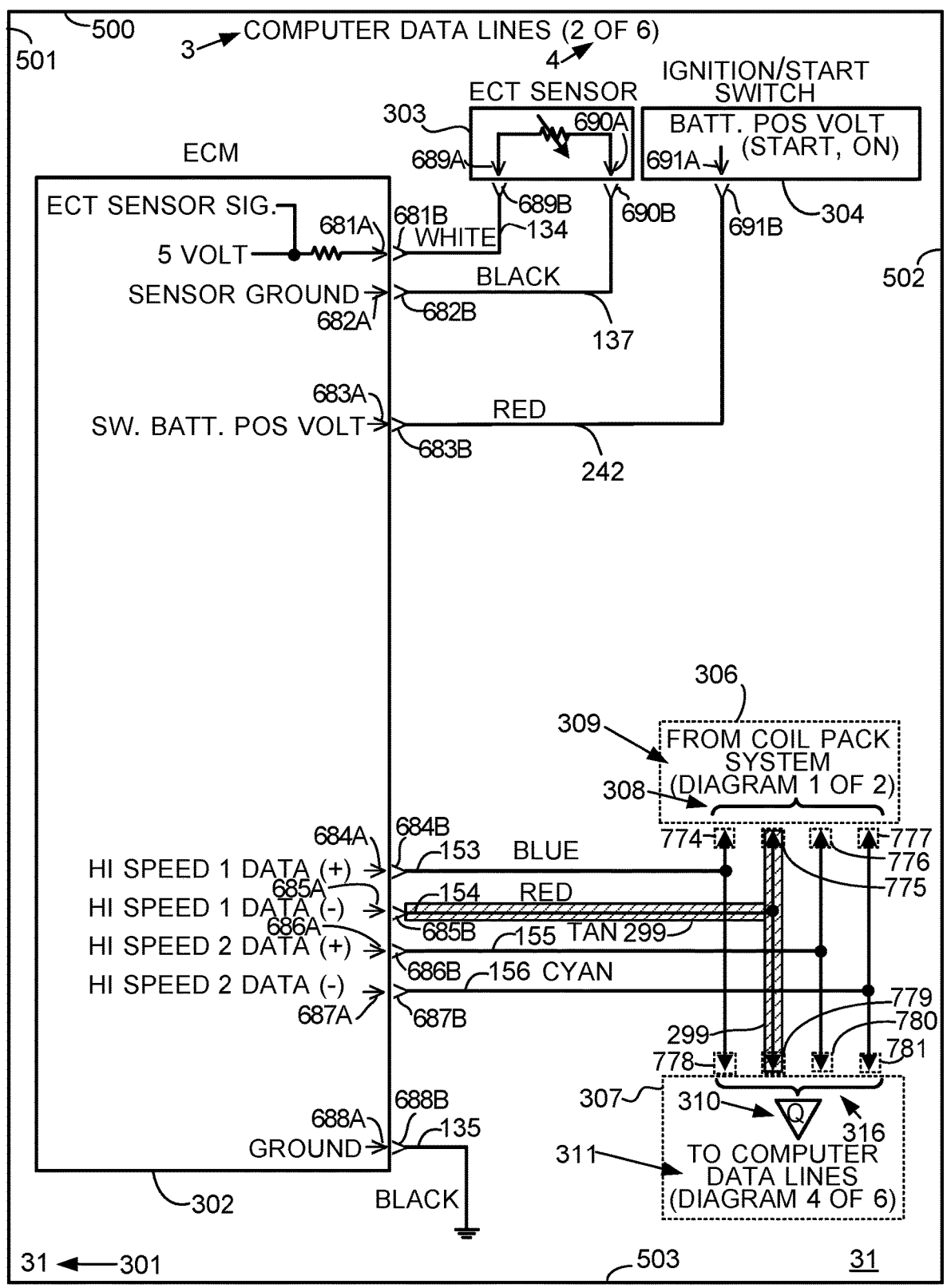

As still yet another example, in FIG. 27, the routable component 154 is highlighted, but the other routable components in FIG. 27 are not highlighted. The display 84 can show the routing diagram 31 with the routable component 154 highlighted and the other routable components in FIG. 27 not highlighted in response to a selection of the hotspot 739 in the routing diagram 51 shown in FIG. 17, even if the routable component 154 is not highlighted at the time of that selection. The display 84 can also show the routing diagram 31 with the routable component 154 highlighted and the other routable components in FIG. 27 not highlighted in response to a selection of a hotspot corresponding to the routable component 154 within a routing diagram indicated by textual description 311.

VI. Example Operation

A. First Flow Chart

Next, FIG. 28A shows a flow chart 410 depicting a set of functions that can be carried out in accordance with the example implementations described in this description. The flow chart 410 includes a block 411, 412, 413. The following description of the flow chart 410 includes references to elements shown in other figures described in this description, but the functions of the flow chart 410 are not limited to being carried out only by the referenced elements. A variety of methods can be performed using all of the functions shown in the flow chart 410 or any proper subset of the functions shown in the flow chart 410. Any of those methods can be performed with other functions such as one or more of the other functions described in this description.

Block 411 includes displaying a first routing diagram on a display. The first routing diagram is a member of a first set of routing diagrams that includes multiple different routing diagrams. Displaying the first routing diagram includes displaying, within the first routing diagram, a first USC and a first portion of a particular routable component, a first terminal connected to the particular routable component, and a second terminal connected or connectable to the first terminal. The first user-selectable control corresponds to the first terminal or the second terminal. As an example displaying the first routing diagram can include displaying the first routing diagram within a GUI container such as the container 239 within the GUI 241 shown in FIG. 15. In accordance with the implementations corresponding to FIG. 5, the first set of routing diagrams can be one of the routing diagram set 20, 22, 23, 24, 25, 26, 27.

In at least some implementations, the first USC is arranged as and/or incudes a screen hotspot (or more simply, a "hotspot"). The first USC can define an area on the first routing diagram that selectable (e.g., selectable using a cursor 161). The defined area can include a graphical icon and/or a textual description. The textual description can include a description of the particular routable component.

In at least some implementations, the first routing diagram includes multiple user-selectable controls arranged as separate hotspots. Each of those user-selectable controls corresponds to a first portion of a particular routable component that continues on some other routing diagram. Two or more of those first portions of a particular routable component may continue on different routing diagrams. In at least some implementations, the first routing diagram and other routing diagram include an equal quantity of hotspots. In other implementations, the first routing diagram and other routing diagram include different quantities of hotspots.

In at least some implementations, the first routing diagram is displayed on the display 84 after selection of a device (e.g., a DUS, such as a vehicle). The device (e.g., the vehicle) can be selected from a GUI, such as the GUI 160 shown in FIG. 12. Additionally or alternatively, in at least some implementations, the first routing diagram is displayed on the display 84 after selection of a USC (e.g., the routing diagrams content selector 223 shown in FIG. 13) operable to signal a processor that displaying a routing diagram for the identified device is desired. Additionally or alternatively, in at least some implementations, the first routing diagram is displayed on the display 84 after selection of a USC (e.g., one of user-selectable controls 229 shown in FIG. 14) operable to signal a processor that displaying a routing diagram of a particular set of routing diagrams is desired.

Block 412 includes determining, by a processor, a selection of the first user-selectable control occurs while the first routing diagram is displayed on the display. A selection of the first user-selectable control can be made using the user interface 83. The processor 81 can execute the CRPI 90 to determine that the user-selectable control was selected using the user interface 83.

Block 413 includes displaying, on the display in response to determining the selection of the first user-selectable control occurs while the first routing diagram is displayed on the display, a second routing diagram with a second portion of the particular routable component highlighted. As an example displaying the second routing diagram can include displaying the second routing diagram within a GUI container such as the container 239 within the GUI 241 shown in FIG. 15 in place of the first routing diagram being displayed in that container.

In at least some implementations of a method including one or more or all of the functions shown in the flow chart 410, displaying the second routing diagram includes displaying: a second user-selectable control, a third user-selectable control, a fourth user-selectable control, a first portion of a second routable component, and a first portion of a third routable component. The second user-selectable control corresponds to a terminal portion of the second routable component shown within the second routing diagram. The third user-selectable control corresponds to a terminal portion of the third routable component shown within the second routing diagram. The fourth user-selectable control corresponds to the second routable component and the third routable component. The method of these implementations also include one from among: (i) determining, by the processor, a selection of the second user-selectable control occurs while the second routing diagram is displayed on the display and responsively displaying the first routing diagram on the display with a second portion of the second routable component highlighted, (ii) determining, by the processor, a selection of the third user-selectable control occurs while the second routing diagram is displayed on the display and responsively displaying the first routing diagram on the display with a second portion of the third routable component highlighted, or (iii) determining, by the processor, a selection of the fourth user-selectable control occurs while the second routing diagram is displayed on the display and responsively displaying the first routing diagram on the display with both a second portion of the second routable component and a second portion of the third routable component highlighted.

In at least some of the implementations described in the preceding paragraph or elsewhere in this description, the second routable component or the third routable component is the particular routable component.

In at least some implementations of a method including one or more or all of the functions shown in the flow chart 410, the second routing diagram is a member of the first set of routing diagrams.

In at least some implementations of a method including one or more or all of the functions shown in the flow chart 410, the multiple different routing diagrams are arranged according to a sequence of multiple routing diagrams, and the sequence of multiple routing diagrams includes at least one routing diagram between the first routing diagram and the second routing diagram.

In at least some of the implementations described in the preceding paragraph or elsewhere in this description, the method further includes displaying, on the display, a second user-selectable control and a third user-selectable control. A selection of the second user-selectable control signals the processor to display an earlier diagram in the sequence of multiple routing diagrams, if any, compared to a currently-displayed diagram of the sequence of multiple routing diagrams. A selection of the third user-selectable control signals the processor to display a later diagram in the sequence of multiple routing diagrams, if any, compared to the currently-displayed diagram of the sequence of multiple routing diagrams.

In at least some implementations of a method including one or more or all of the functions shown in the flow chart 410, (i) the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit, (ii) the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line, (iii) the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line, (iv) the first routing diagram includes a first pneumatic line diagram, the second routing diagram includes a second pneumatic line diagram, the first portion of the particular routable component represents a first portion of a particular pneumatic line, and the second portion of the particular routable component represents a second portion of the particular pneumatic line, or (v) the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

In at least some implementations of a method including one or more or all of the functions shown in the flow chart 410, the first user-selectable control corresponds to first metadata. The first metadata includes an identifier of the particular routable component within the second routing diagram. The method also includes after determining the selection of the first user-selectable control occurs while the first routing diagram is displayed on the display, but before displaying the second routing diagram, determining, by the processor based at least in part on the identifier of the particular routable component, the second portion of the particular routable component is within the second routing diagram.

In at least some implementations of a method including one or more or all of the functions shown in the flow chart 410, the second routing diagram is a member of a second set of routing diagrams. Furthermore, the second set of routing diagrams includes one or more routing diagrams not contained in the first set of routing diagrams. Furthermore still, the second routing diagram is not a member of the first set of routing diagrams.

In at least some of the implementations described in the preceding paragraph or elsewhere in this description, (i) the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit, (ii) the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line, (iii) the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line, (iv) the first routing diagram includes a first pneumatic line diagram, the second routing diagram includes a second pneumatic line diagram, the first portion of the particular routable component represents a first portion of a particular pneumatic line, and the second portion of the particular routable component represents a second portion of the particular pneumatic line, or (v) the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

In at least some of the implementations described two paragraphs above or elsewhere in this description, each routing diagram of the first set of routing diagrams and each routing diagram of the second set of routing diagrams is a different routing diagram.

In at least some of the implementations described three paragraphs above or elsewhere in this description, the first user-selectable control corresponds to first metadata. The first metadata includes an identifier of the second routing diagram, an identifier of the particular routable component on the second routing diagram, and an identifier of the second set of routing diagrams. Additionally, the method further comprises in response to determining the selection of the first user-selectable control occurs while the first routing diagram is displayed on the display: (i) retrieving, by the processor based at least in part on the identifier of the second routing diagram and the identifier of the second set of routing diagrams, the second routing diagram from a database; (ii) determining, by the processor, a path of the particular routable component on the second routing diagram; and (iii) displaying, on the display, the second routing diagram with the particular routable component on the second routing diagram highlighted along the path.

In at least some implementations of a method including one or more or all of the functions shown in the flow chart 410, the first user-selectable control corresponds to first metadata. The first metadata includes an identifier corresponding to the particular routable component within the second routing diagram. Additionally, the method further comprises after determining the selection of the first user-selectable control occurs while the first routing diagram is displayed on the display, but before displaying the second routing diagram, determining, by the processor based at least in part on the identifier corresponding to the particular routable component, the second portion of the particular routable component is within the second routing diagram.

In at least some implementations of a method described in the preceding paragraph or elsewhere in this description, the identifier corresponding to the particular routable component within the second routing diagram includes: (i) an identifier of the particular routable component within the second routing diagram, or (ii) an identifier of one or more from among: a third terminal contained in the second routing diagram, a fourth terminal contained in the second routing diagram, or a connectable component contained in the second routing diagram. Additionally, the third terminal is connected to the particular routable component. Furthermore, the fourth terminal is connected or connectable to the third terminal, and the connectable component includes the fourth terminal.

In at least some implementations of a method including one or more or all of the functions shown in the flow chart 410, the first routing diagram includes a second routable component. The method further comprises determining, by the processor, a selection of the first portion of the particular routable component and a selection of the second routable component occur while the first routing diagram is displayed on the display. The method also includes displaying, in response to the selection of the first portion of the particular routable component, the first portion of the particular routable component as highlighted. The method further includes displaying, in response to the selection of the second routable component, the second routable component as highlighted.

In at least some implementations of a method including one or more or all of the functions shown in the flow chart 410, the first routing diagram includes a second routable component. A color of highlighting for the first portion of the particular routable component is different than a color of highlighting for the second routable component. Additionally, the method includes determining, by the processor, a selection of the first portion of the particular routable component and a selection of the second routable component occur while the first routing diagram is displayed on the display. The method further includes displaying, in response to the selection of the first portion of the particular routable component, the first portion of the particular routable component as highlighted. Furthermore, the method includes displaying, in response to the selection of the second routable component, the second routable component as highlighted. Furthermore still, the method includes determining, by the processor, the color of highlighting for the first portion of the particular routable component and the color of highlighting for the second routable component based on an order the selection of the first portion of the particular routable component and the selection of the second routable component.

In at least some implementations of a method including one or more or all of the functions shown in the flow chart 410, displaying the second routing diagram includes displaying the second routing diagram instead of the first routing diagram.

In at least some implementations of a method including one or more or all of the functions shown in the flow chart 410, the method also includes determining, by the processor prior to determining the selection of the first user-selectable control occurs while the first routing diagram is displayed on the display, a selection of the particular routable component occurs while the first routing diagram is displayed on the display. Furthermore, the method includes displaying, on the display in response to determining the selection of the particular routable component occurs while the first routing diagram is displayed on the display, the particular routable component highlighted instead of un-highlighted. The particular routable component in the first routing diagram is highlighted when the selection of the first user-selectable control occurs. The particular routable component in the second routing diagram is highlighted when displaying the second routing diagram in response to determining the selection of the first user-selectable control occurs.

B. Second Flow Chart

Figure 28B:
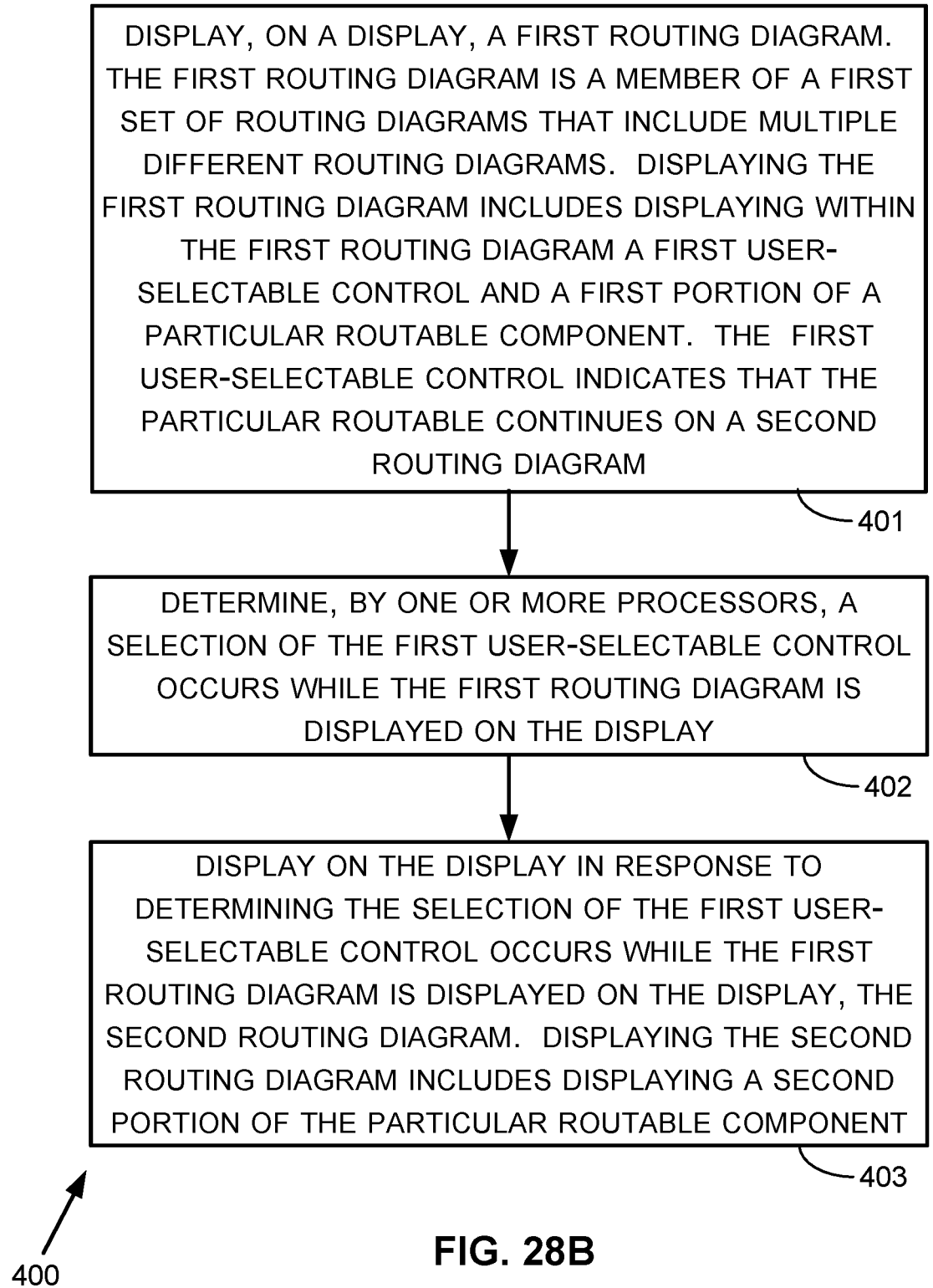

Next, FIG. 28B shows a flow chart 400 depicting a set of functions that can be carried out in accordance with the example implementations described in this description. The flow chart 400 includes a block 401, 402, 403. The following description of the flow chart 400 includes references to elements shown in other figures described in this description, but the functions of the flow chart 400 are not limited to being carried out only by the referenced elements. A variety of methods can be performed using all of the functions shown in the flow chart 400 or any proper subset of the functions shown in the flow chart 400. Any of those methods can be performed with other functions such as one or more of the other functions described in this description.

Block 401 includes displaying a first routing diagram on a display. The first routing diagram is a member of a first set of routing diagrams that includes multiple different routing diagrams. Displaying the first routing diagram includes displaying, within the first routing diagram, a first USC and a first portion of a particular routable component. The first user-selectable control indicates that the particular routable component continues on a second routing diagram. As an example displaying the first routing diagram can include displaying the first routing diagram within a GUI container such as the container 239 within the GUI 241 shown in FIG. 15. In accordance with the implementations corresponding to FIG. 5, the first set of routing diagrams can be one of the routing diagram set 20, 22, 23, 24, 25.

In at least some implementations, the first USC is arranged as and/or incudes a screen hotspot (or more simply, a "hotspot"). The first USC can define an area on the first routing diagram that is selectable (e.g., selectable using a cursor 161). The defined area can include a graphical icon and/or a textual description. The textual description can include a description of the particular routable component.

In at least some implementations, the first routing diagram includes multiple user-selectable controls arranged as separate hotspots. Each of those user-selectable controls corresponds to a first portion of a particular routable component that continues on some other routing diagram. Two or more of those first portions of a particular routable component may continue on different routing diagrams. In at least some implementations, the first routing diagram and other routing diagram include an equal quantity of hotspots. In other implementations, the first routing diagram and other routing diagram include different quantities of hotspots.

In at least some implementations, the first routing diagram is displayed on the display 84 after selection of a device (e.g., a DUS, such as a vehicle). The device (e.g., the vehicle) can be selected from a GUI, such as the GUI 160 shown in FIG. 12. Additionally or alternatively, in at least some implementations, the first routing diagram is displayed on the display 84 after selection of a USC (e.g., the routing diagrams content selector 223 shown in FIG. 13) operable to signal a processor that displaying a routing diagram for the identified device is desired. Additionally or alternatively, in at least some implementations, the first routing diagram is displayed on the display 84 after selection of a USC (e.g., one of user-selectable controls 229 shown in FIG. 14)

operable to signal a processor that displaying a routing diagram of a particular set of routing diagrams is desired.

Block 402 includes determining, by a processor, a selection of the first user-selectable control occurs while the first routing diagram is displayed on the display. A selection of the first user-selectable control can be made using the user interface 83. The processor 81 can execute the CRPI 90 to determine that the user-selectable control was selected using the user interface 83.

Block 403 includes displaying, on the display in response to determining the selection of the first user-selectable control occurs while the first routing diagram is displayed on the display, the second routing diagram. Displaying the second routing diagram includes displaying a second portion of the particular routable component. As an example displaying the second routing diagram can include displaying the second routing diagram within a GUI container such as the container 239 within the GUI 241 shown in FIG. 15 in place of the first routing diagram being displayed in that container.

In at least some implementations of a method including one or more or all of the functions shown in the flow chart 400, the second routing diagram is a member of the first set of routing diagrams. As an example, the first and second routing diagrams are any two routing diagrams of the routing diagram set 20, any two routing diagrams of the routing diagram set 22, any two routing diagrams of the routing diagram set 23, the two routing diagrams of the routing diagram set 24, or any two routing diagrams of the routing diagram set 25.

In at least some of the implementations described in the preceding paragraph or elsewhere in this description, the multiple different routing diagrams are arranged according to a sequence of multiple routing diagrams. Moreover, the sequence of multiple routing diagrams includes at least one routing diagram between the first routing diagram and the second routing diagram. As an example, the routing diagrams in the routing diagram set 20 are arranged in a sequence from a first routing diagram to a sixth routing diagram as follows: routing diagram 30, routing diagram 31, routing diagram 32, routing diagram 33, routing diagram 34, routing diagram 35, and routing diagram 36.

In at least some of the implementations described in the preceding paragraph or elsewhere in this description, the method further includes displaying, on the display, a second user-selectable control and a third user-selectable control. A selection of the second user-selectable control signals the processor to display an earlier diagram in the sequence of multiple diagrams, if any, compared to a currently-displayed diagram of the sequence of multiple diagrams. A selection of the third user-selectable control signals the processor to display a later diagram in the sequence of multiple diagrams, if any, compared to the currently-displayed diagram of the sequence of multiple diagrams. As an example, the second user-selectable control can be arranged like and/or operable like the routing diagram selector USC 253 shown in FIG. 15. As an example, the third user-selectable control can be arranged like and/or operable like the routing diagram selector USC 254 shown in FIG. 15.

In at least some of the implementations described in the preceding three paragraphs or elsewhere in this description, the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit. Alternatively, the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line. Further alternatively, the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line. Still further alternatively, the first routing diagram includes a first pneumatic line diagram, the second routing diagram includes a second pneumatic line diagram, the first portion of the particular routable component represents a first portion of a particular pneumatic line, and the second portion of the particular routable component represents a second portion of the particular pneumatic line. Yet still further alternatively, the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

In at least some of the implementations described four paragraphs above or elsewhere in this description, the first user-selectable control corresponds to first metadata, and the first metadata includes an identifier of the particular routable component within the second routing diagram. Moreover, the method of these implementations includes after determining the selection of the first user-selectable control occurs while the first routing diagram is displayed on the display, but before displaying the second routing diagram, determining, by the processor based at least in part on the identifier of the particular routable component, the second portion of the particular routable component is within the second routing diagram.

In at least some implementations of a method including one or more or all of the functions shown in the flow chart 400, the second routing diagram is a member of a second set of routing diagrams. Furthermore, the second set of routing diagrams includes one or more routing diagrams not contained in the first set of routing diagrams. Furthermore still, the second routing diagram is not a member of the first set of routing diagrams. As an example, the first routing diagram is a routing diagram of the routing diagram set 24 (e.g., the routing diagram 51 shown in FIG. 5 and FIG. 17) and the second routing diagram is a routing diagram of the routing diagram set 20 (e.g., the routing diagram 31 shown in FIG. 5 and FIG. 18).

In at least some of the implementations described in the preceding paragraph or elsewhere in this description, the multiple different routing diagrams are arranged according to a first sequence of multiple routing diagrams and the second set of routing diagrams includes multiple different routing diagrams are arranged according to a second sequence of multiple routing diagrams.

In at least some of the implementations described in the preceding two paragraphs or elsewhere in this description, the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit. Alternatively, the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line. Further alternatively, the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line. Still further alternatively, the first routing diagram includes a first pneumatic line diagram, the second routing diagram includes a second pneumatic line diagram, the first portion of the particular routable component represents a first portion of a particular pneumatic line, and the second portion of the particular routable component represents a second portion of the particular pneumatic line. Yet still further alternatively, the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

In at least some of the implementations described in the preceding three paragraphs or elsewhere in this description, each routing diagram of the first set of routing diagrams and each routing diagram of the second set of routing diagrams is a different routing diagram.

In at least some of the implementations described two, three, or four paragraphs above or elsewhere in this description, each routing diagram of the first set of routing diagrams and each routing diagram of the second set of routing diagrams is a different routing diagram. Additionally, the first metadata includes an identifier of the second routing diagram, an identifier of the particular routable component on the second routing diagram, and an identifier of the second set of routing diagrams. Moreover, in response to determining the selection of the first user-selectable control occurs while the first routing diagram is displayed on the display, the method of these implementations also includes retrieving, by the processor based at least in part on the identifier of the second routing diagram and the identifier of the second set of routing diagrams, the second routing diagram from a database. Also in response to determining the selection of the first user-selectable control occurs while the first routing diagram is displayed on the display, the method of these implementations includes determining, by the processor, a path of the particular routable component on the second routing diagram, and displaying, on the display, the second routing diagram with the particular routable component on the second routing diagram highlighted along the path.

In at least some of the implementations described in the preceding paragraph or elsewhere in this description, the identifier of the particular routable component on the second routing diagram and the identifier of the second set of routing diagrams are distinct identifiers.

In at least some of the implementations described two paragraphs above or elsewhere in this description, the first metadata further includes an identifier of a connectable component corresponding to the particular routable component. Furthermore, the second routing diagram includes the connectable component. Furthermore still, displaying the second routing diagram in response to determining the selection of the first user-selectable control occurs further includes displaying the connectable component highlighted.

In at least some of the implementations described three paragraphs above or elsewhere in this description, second metadata corresponds to the connectable component. The second metadata includes an identifier of two or more routable components. Also, the two or more components are represented in the second routing diagram as being connected to the connectable component. Moreover, the two or more routable components include the particular routable component. Additionally, displaying the second routing diagram in response to determining the selection of the first user-selectable control occurs further includes displaying the two or more routable components highlighted.

In at least some implementations of a method including one or more or all of the functions shown in the flow chart 400, the first user-selectable control corresponds to first metadata. Furthermore, the first metadata includes an identifier of the particular routable component within the second routing diagram. Furthermore still, the method also includes after determining the selection of the first user-selectable control occurs while the first routing diagram is displayed on the display, but before displaying the second routing diagram, determining, by the processor based at least in part on the identifier of the particular routable component, the second portion of the particular routable component is within the second routing diagram.

In at least some implementations of a method including one or more or all of the functions shown in the flow chart 400, the first user-selectable control corresponds to first metadata. Additionally, the first metadata includes an identifier of the second routing diagram and an identifier of the particular routable component on the second routing diagram. In accordance with these implementations, the method also includes after determining the selection of the first user-selectable control occurs while the first routing diagram is displayed on the display, but before displaying the second routing diagram, retrieving, by the processor based at least in part on the identifier of the second routing diagram, the second routing diagram from a database. The method further includes searching, by the processor, the second routing diagram to determine a path of the particular routable component on the second routing diagram. Even more, the method includes displaying, on the display, the second routing diagram with the particular routable component on the second routing diagram highlighted.

In at least some implementations of a method described in the preceding paragraph or elsewhere in this description, the second routing diagram includes a second user-selectable control. Also, the second user-selectable control includes an indicator that indicates the particular routable component continues on the first routing diagram. Moreover, the second user-selectable control corresponds to second metadata. Even more, the second metadata includes an identifier of the first routing diagram and an identifier of the particular routable component on the first routing diagram.

In at least some implementations of a method described in the preceding paragraph or elsewhere in this description, the identifier of the particular routable component on the first routing diagram is different than identifier of the particular routable component on the second routing diagram.

In at least some implementations of a method described two paragraphs above or elsewhere in this description, the method also includes determining, by processor, a selection of the second user-selectable control occurs while the second routing diagram is displayed on the display. The method further includes after determining the selection of the second user-selectable control occurs while the second routing diagram is displayed on the display, but before displaying the first routing diagram again, retrieving, by the processor based at least in part on the identifier of the first routing diagram, the first routing diagram from the database. Furthermore, the method includes searching, by the processor, the first routing diagram to determine a path of the particular routable component on the first routing diagram. Furthermore still, the method includes displaying, on the display, the first routing diagram with the particular routable component on the first routing diagram highlighted.

In at least some implementations of a method described in the preceding paragraph or elsewhere in this description, the first routing diagram includes a third user-selectable control. The third user-selectable control includes an indicator that indicates the particular routable component continues on a third routing diagram. Additionally, the third routing diagram is a member of the first set of routing diagrams. Moreover, the third user-selectable control corresponds to third metadata. Furthermore, the third metadata includes an identifier of the third routing diagram and an identifier of the particular routable component on the third routing diagram. Furthermore still, the method includes determining, by a processor, a selection of the third user-selectable control occurs while the first routing diagram is displayed on the display. The method also includes after determining the selection of the third user-selectable control occurs while the first routing diagram is displayed on the display, but before displaying the third routing diagram, retrieving, by the processor based at least in part on the identifier of the third routing diagram, the third routing diagram from the database. Even more, the method includes searching, by the processor, the third routing diagram to determine a path of the particular routable component on the third routing diagram. Still even more, the method includes displaying, on the display, the third routing diagram with the particular routable component on the third routing diagram highlighted.

In at least some implementations of a method described in the preceding paragraph or elsewhere in this description, the identifier of the particular routable component on the first routing diagram is identical to the identifier of the particular routable component on the third routing diagram.

In at least some implementations of a method described five paragraphs above or elsewhere in this description, the second routing diagram is a member of a second set of routing diagrams. The second set of routing diagrams includes one or more routing diagrams not contained in the first set of routing diagrams. Moreover, the second routing diagram is not a member of the first set of routing diagrams. Additionally, the second routing diagram includes a third user-selectable control. The third user-selectable control includes an indicator that indicates the particular routable component continues on a third routing diagram. Moreover, the third routing diagram is contained within the second set of routing diagrams. Additionally, the third user-selectable control corresponds to third metadata. The third metadata includes an identifier of the third routing diagram and an identifier of the particular routable component on the third routing diagram. Furthermore, the method includes determining, by a processor, a selection of the third user-selectable control occurs while the second routing diagram is displayed on the display. The method also includes after determining the selection of the third user-selectable control occurs, but before displaying the third routing diagram, retrieving, by the processor based at least in part on the identifier of the third routing diagram, the third routing diagram from the database. Even more, the method includes searching, by the processor, the third routing diagram to determine a path of the particular routable component on the third routing diagram. Still even more, the method includes displaying, on the display, the third routing diagram with the particular routable component on the third routing diagram highlighted.

In at least some of the implementations described in the preceding paragraph or elsewhere in this description, the identifier of the particular routable component on the second routing diagram is identical to the identifier of the particular routable component on the third routing diagram.

In at least some implementations of a method described eight paragraphs above or elsewhere in this description, displaying the second routing diagram with the particular routable component on the second routing diagram highlighted includes displaying the particular routable component within the particular routable component defined by a first stroke width, a first color, and a path and displaying highlighting defined by a second stroke width, a second color, an opacity value, and the path.

In at least some implementations of a method including one or more or all of the functions shown in the flow chart 400, the first routing diagram includes a second routable component. Moreover, the method includes determining, by the processor, a selection of the first portion of the particular routable component and a selection of the second routable component occur while the first routing diagram is displayed on the display. The method also includes displaying, in response to the selection of the first portion of the particular routable component, the first portion of the routable component as highlighted. Furthermore, the method includes displaying, in response to the selection of the second routable component, the second routable component as highlighted.

In at least some of the implementations described in the preceding paragraph or elsewhere in this description, a color of highlighting for the first portion of the particular routable component is different than a color of highlighting for the second routable component.

In at least some implementations of a method including one or more or all of the functions shown in the flow chart 400, the first routing diagram includes a second routable component. Moreover, a color of highlighting for the first portion of the particular routable component is different than a color of highlighting for the second routable component. Furthermore, the method includes determining, by the processor, a selection of the first portion of the particular routable component and a selection of the second routable component occur while the first routing diagram is displayed on the display. The method also includes displaying, in response to the selection of the first portion of the particular routable component, the first portion of the routable component as highlighted. The method further includes displaying, in response to the selection of the second routable component, the second routable component as highlighted. Even more, the method includes determining, by the processor, the color of highlighting for the first portion of the particular routable component and the color of highlighting for the second routable component based on an order the selection of the first portion of the particular routable component and the selection of the second routable component. A benefit of selecting highlighting in sequence is that some highlight colors may be preferable such that the preferable colors are used before using any less preferable colors to highlight components in the routing diagram.

In at least some implementations of a method including one or more or all of the functions shown in the flow chart 400, displaying the second routing diagram includes displaying the second routing diagram instead of the first routing diagram.

In at least some implementations of a method including one or more or all of the functions shown in the flow chart 400, the method further includes determining, by the processor prior to determining the selection of the first user-selectable control occurs while the first routing diagram is displayed on the display, a selection of the particular routable component occurs while the first routing diagram is displayed on the display. The method also includes displaying, on the display in response to determining the selection of the particular routable component occurs while the first routing diagram is displayed on the display, the particular routable component highlighted instead of un-highlighted. Moreover, the particular routable component in the first routing diagram is highlighted when the selection of the first user-selectable control occurs. Even more, the particular routable component in the second routing diagram is highlighted when displaying the second routing diagram in response to determining the selection of the first user-selectable control occurs. In at least some implementations of a method including one or more or all of the functions shown in the flow chart 400, displaying the first routing diagram includes displaying, within the first routing diagram, a second user-selectable control and a first portion of a second particular routable component. Additionally, the second user-selectable control indicates that the second particular routable component continues on a third routing diagram. Moreover, the second routing diagram is a member of the first set of routing diagrams or a second set of routing diagrams not including the first routing diagram. Furthermore, the third routing diagram is a member of the other of first set of routing diagrams or the second set of routing diagrams. Furthermore still, the first user-selectable control and the second user-selectable control include different symbols to distinguish the second routing diagram and the third routing diagram continue on routing diagrams contained in different sets of routing diagrams.

VII. Example Data

Next, FIG. 29A and FIG. 29B show metadata corresponding to a routing diagram in accordance with one or more of the example implementations. In particular, FIG. 29A and FIG. 29B show a metadata file 510. In FIG. 29A and FIG. 29B, the metadata file 510 is arranged as an extensible markup language (XML) file, but the data within the metadata file 510 can be arranged in other file formats as well, such as a YAML (YAML Ain't Markup Language) file, a comma separated variable (CSV) file, a flat file, a JavaScript Object Notation (JSON) file, or some other file or data repository. The metadata file 510 includes file elements 511 to 553, which are described below.

The file element 511 includes a DUS identifier. The file element 511 thus provides context for other file elements in the metadata file 510 (e.g., which type of DUS corresponds to the other file elements).

The file element 512, 513, 514, 515, 516 517 represents file elements including metadata for the routing diagram set 20, 21, 22, 23, 24, 25 that pertain to the DUS identified by the file element 511. FIG. 29A and FIG. 29B show the file element 512, 513, 514, 515, 517 includes a file element include a routing diagram set identifier. Each of the file element 512, 513, 514, 515, 517 can include other file elements, such as file elements shown in the file element 516 among others, except these other file elements pertain to the routing diagram set 20, 21, 22, 23, 24, 25, respectively.

The file element 516 includes a file element 518 that includes a routing diagram set identifier for the routing diagram set 24. The file element 516 includes a file element 519, 570 for the routing diagram 51, 52, respectively, within the routing diagram set 24. The file element 516 can include separate file elements (similar to those contained within the file element 519) for each of the other routing diagrams (i.e., routing diagram 52) within the routing diagram set 24, but some of those separate file elements are not shown in FIG. 29A.

The file element 519 includes a file element 520 indicative of an identifier of the routing diagram 51 and a file element 521 indicative of a textual description and diagram count corresponding to the routing diagram 51.

The file element 519 includes a file element 522, 523, 524, 525, 526, 531, 532, 533, 534, 535 that corresponds to the hotspot 186, 187, 188, 189, 190, the bracket icon 197, the hotspot 738, 739, 740, 741 respectively, within the routing diagram 51. Each of the file element 522, 523, 525, 526, 531, 532, 533, 534, 535 can include other file elements, such as file elements shown in the file element 524 among others except that those other file elements pertain to the hotspot 186, 187, 189, 190, the bracket icon 197, the hotspot 738, 739, 740, 741, respectively. The file element 522, 523, 524, 525, 526, 531, 532, 533, 534, 535 includes a file element 537, 538, 527, 539, 540, 541, 542, 543, 544, 545 indicative of an identifier of a hotspot within the routing diagram 51.

The file element 524 also includes a file element 528, 529 which include an identifier of the routing diagram set 23 and an identifier of the routing diagram 45, respectively. The file element 528 and the file element 529, in combination, can include information that can be used in and/or as a jump instruction within the CRPI 90 to cause the display 84 to display a routing diagram corresponding to the metadata within the file element 528, 529. The file element 530 includes a component identifier 536 of a component within the routing diagram 45 that is to be highlighted upon displaying the routing diagram 45 in response to the hotspot 188 being selected. As an example, the jump instruction can include the metadata within the file element 528, 529. As another example, the jump instruction can include metadata indicating which routable component(s) and/or connectable component(s) is/are to be highlighted after jumping from the departure routing diagram to the routing diagram corresponding to a selected hotspot. For example, for the selection of the hotspot 188, the jump instruction can include the metadata within the file element 528, 529, 530.

The file element 525 also includes a file element 546, 547 which include an identifier of the routing diagram set 20 and an identifier of the routing diagram 31, respectively. The file element 546 and the file element 547, in combination, can include information that can be used in and/or as a jump instruction within the CRPI 90 to cause the display 84 to display a routing diagram corresponding to the metadata within the file element 546, 547. The file element 548 includes a file element 549, 550, 551, 552 including a component identifier of a component within the routing diagram 31 that is to be highlighted upon displaying the routing diagram 31 in response to the hotspot 189 being selected. As an example, the jump instruction can include the metadata within the file element 546, 547. As another example, the jump instruction can include metadata indicating which routable component(s) and/or connectable component(s) is/are to be highlighted after jumping from the departure routing diagram to the routing diagram corresponding to a selected hotspot. For example, for the selection of the hotspot 189, the jump instruction can include the metadata within the file element 546, 547, 549, 550, 551, 552.

The file element 531 also includes a file element 553, 554 which include an identifier of the routing diagram set 20 and an identifier of the routing diagram 31, respectively. The file element 553 and the file element 554, in combination, can include information that can be used in and/or as a jump instruction within the CRPI 90 to cause the display 84 to display a routing diagram corresponding to the metadata within the file element 553, 554. The file element 555 includes a component identifier 556, 557, 558, 559 of a component within the routing diagram 31 that is to be highlighted upon displaying the routing diagram 31 in response to the bracket icon 197 being selected. As an example, the jump instruction can include the metadata within the file element 553, 554. As another example, the jump instruction can include metadata indicating which routable component(s) and/or connectable component(s) is/are to be highlighted after jumping from the departure routing diagram to the routing diagram corresponding to a selected hotspot. For example, for the selection of the bracket icon 197, the jump instruction can include the metadata within the file element 553, 554, 555.

The file element 533 also includes a file element 560, 561 which include an identifier of the routing diagram set 20 and an identifier of the routing diagram 31, respectively. The file element 560 and the file element 561, in combination, can include information that can be used in and/or as a jump instruction within the CRPI 90 to cause the display 84 to display a routing diagram corresponding to the metadata within the file element 560, 561. The file element 533 includes a file element 562 including a component identifier of a component within the routing diagram 31 that is to be highlighted upon displaying the routing diagram 31 in response to the hotspot 739 being selected. As an example, the jump instruction can include the metadata within the file element 560, 561. As another example, the jump instruction can include metadata indicating which routable component(s) and/or connectable component(s) is/are to be highlighted after jumping from the departure routing diagram to the routing diagram corresponding to a selected hotspot. For example, for the selection of the hotspot 739, the jump instruction can include the metadata within the file element 560, 561, 562.

The file element 570 includes a file element 564 indicative of an identifier of the routing diagram 52 and a file element 565 indicative of a textual description and diagram count corresponding to the routing diagram 52. The file element 570 includes a file element 566, 567 that corresponds to the hotspot 381, 383, respectively, within the routing diagram 52. The file element 566, 567 includes a file element 568, 569 indicative of a hotspot identifier of the hotspot 381, 383, respectively, within the routing diagram 52.

Next, FIG. 30 shows a table 475 including navigation sequence data and highlight status data pertaining to displaying routing diagrams in accordance with one or more of the example implementations. The table 475 includes a column 476, 477, 478, 479, 480 and a row 481, 482, 483, 484, 485. The column 476 includes routing diagram set identifiers for the routing diagram set 20, 23. The column 477 includes routing diagram identifiers for routing diagrams within a corresponding routing diagram set. A combination 486 includes the column 476, 477. The data in each of the bottom four rows of the combination 486 represents a routing diagram identifier of a previously displayed routing diagram. Other forms of a routing diagram identifier described in this description or otherwise can be used to represent a previously displayed routing diagram.

The column 478 includes DUS identifiers that correspond to the previously displayed routing diagram indicated by the data in the combination 486. In at least some implementations, the computing system 80 can store the DUS identifier in the device selection data 95 and/or the server 100 can store the DUS identifier within the device selection data 115 for the computing system 80. In this way, the computing system 80 and/or the server 100 does not have to store a separate instance of a DUS identifier for each previously displayed routing diagram because the computing system 80 and/or the server 100 know the identifier of a DUS currently selected for the computing system 80. The data within the column 476, 477 and 478 represent the navigation sequence data upon which the computing system 80 and/or the server 100 can use to request, obtain, and/or provide a previously displayed routing diagram for displaying on the display 84.

The column 479 includes highlight status data that indicates which routable components and/or connectable components were highlighted upon departure from a particular routing diagram.

The column 480 includes an indication of which user-selectable control (e.g., a hotspot) was selected to cause the computing system to depart from showing the previously displayed routing diagram to a routing diagram corresponding to the user-selectable control in the column 480.

Figure 31:
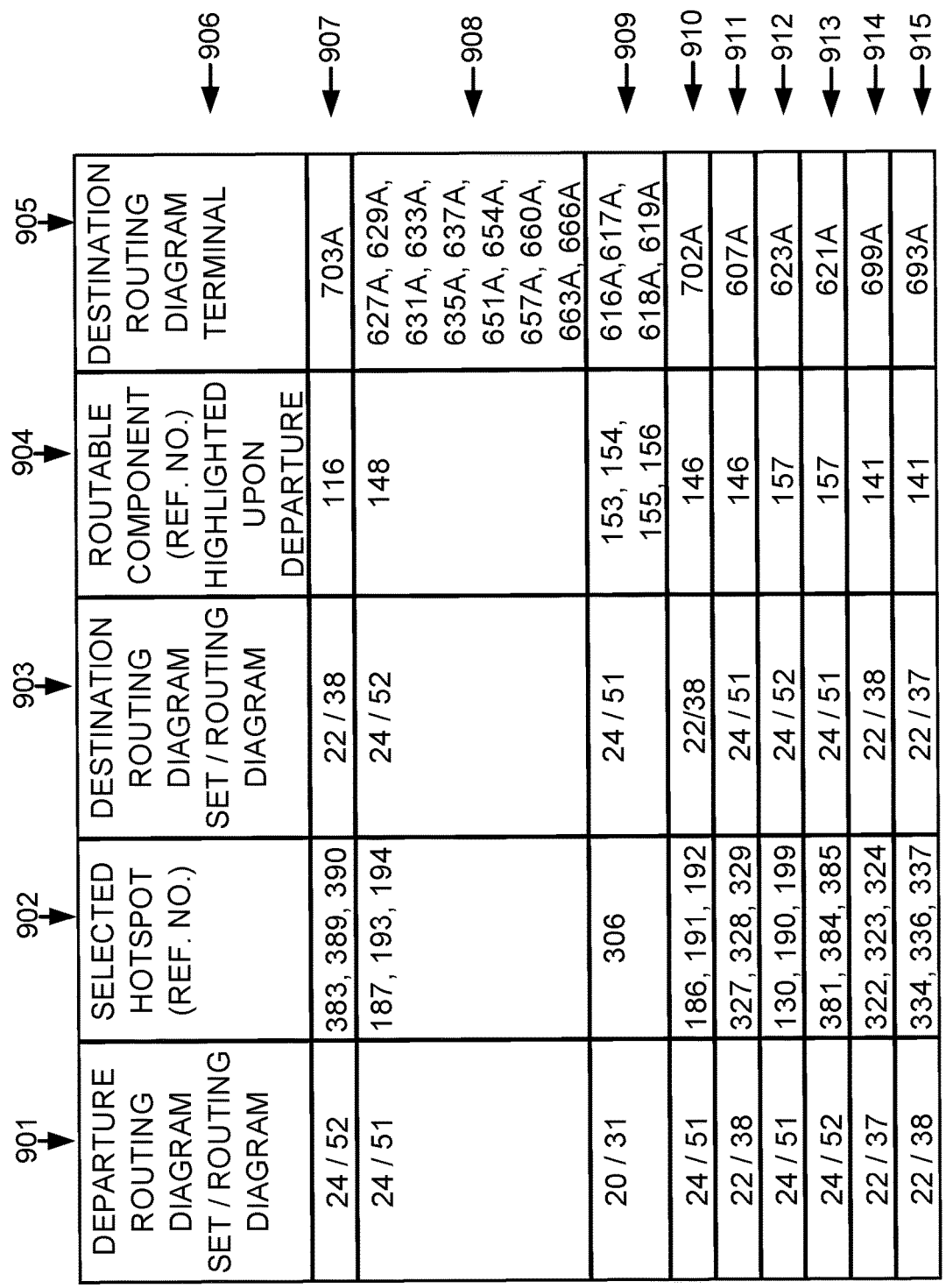

Next, FIG. 31 shows a table 900 including metadata corresponding to routing diagrams in accordance with one or more of the example implementations. The table 900 includes a column 901, 902, 903, 904, 905, and a row 906 to row 915. The row 906 indicates the type of metadata in each column. In particular, the column 901 includes metadata indicating a routing diagram set and routing diagram that includes the hotspot indicated by the metadata in the column 902. The column 903 includes metadata indicating a destination routing diagram set and routing diagram. Selection of a hotspot indicated in the column 902 within the routing diagram shown in column 901 in the same row provides for displaying the routing diagram indicated in the column 903 in the same row with the routable component(s) shown in that same row highlighted when the destination routing diagram is displayed. The row 907, 908, 909, 910, 911, 912, 913, 914, 915 show metadata indicating a departure routing diagram set and routing diagram, a hotspot, a destination routing diagram set and routing diagram, a routable component to be highlighted in the destination routing diagram, and a destination diagram terminal.

The processor 81 can know which routing diagram is currently displayed and which hotspot is selected within the routing diagram that is currently displayed. The processor 81 can refer to metadata like the metadata in the table 900 to determine the destination routing diagram set and routing diagram and the routable component within the destination routing diagram that is to be highlighted. The processor 81 can determine the routable component within the destination routing diagram that is to be highlighted based on the applicable routable component within the column 904 and/or the applicable destination diagram terminal within the column 905. The processor 81 can use the data within the table 900 within a jump instruction within the CRPI 90 to cause the display 84 to display a routing diagram with a routable component highlighted based on the selected hotspot in the departure routing diagram.

Next, FIG. 32 shows a table 450 including metadata corresponding to routing diagrams in accordance with one or more of the example implementations. The table 450 includes a column 451, 452, 453, 454. Each row in the column 451 (other than the first row) includes a reference number corresponding to one of the routing diagrams shown in FIG. 5. For each row within the column 452, 453, 454 (other than the first row) includes a routing diagram identifier of the routing diagram referenced by the reference number in column 451 of that same row.

The metadata within or corresponding to a routing diagram can include one or more routing diagram identifiers shown in the table 450 to indicate a destination routing diagram. The destination routing diagram corresponds to a hotspot within a routing diagram currently displayed on the display 84. In other words, if the processor 81 detects a selection of the hotspot from within the currently displayed routing diagram, the processor 81 refers to the metadata to determine the routing diagram identifier corresponding to the selected hotspot and the destination routing diagram.

The routing diagram identifiers in the column 452 are in a form of (X, Y), where X represents a routing diagram set identifier, and Y represents a drawing identifier within a routing diagram set indicated by X. The routing diagram identifiers in the column 453 are in a form of a textual routing diagram identifier and a diagram count (e.g., the textual routing diagram identifier 3 and a diagram count 4 shown in FIG. 17 to FIG. 23). The column 454 represents that a routing diagram identifier can be in a form of a hotspot index value. The hotspot index values shown in FIG. 32 that are numeric represent the reference numbers corresponding to hotspots shown in FIG. 17 to FIG. 23. The hotspot index values "N.S." shown in FIG. 32 indicate that hotspots corresponding to the routing diagram of that row are "Not Shown" in the application drawings. A quantity of N hotspots for all routing diagrams for a given DUS can correspond to a hotspot index value ranging from, for example, 1 to N. In at least some implementations, it may take less data to request a routing diagram from the server 71, 100 using a hotspot index value as compared to the data needed to request a routing diagram using a different form of a routing diagram identifier.

In at least some implementations, the processor 81 uses the routing diagram identifier determined from the metadata in the table 450 to obtain the destination routing diagram from the routing diagram 91.

In at least some other implementations, the processor 81 transmits to the server 71, 100 a request including the routing diagram identifier in order to obtain the destination routing diagram from the server 71, 100 (e.g., from the database 72 or the routing diagram 111). In response to receiving the routing diagram identifier (e.g., a routing diagram identifier in a form of: (20, 3), Computer Data Lines (3 of 6), or 307), the server 71, 100 can refer to data that maps the routing diagram identifier to a routing diagram (e.g., data including the data in column 451 and data in at least one of column 452, column 453 or column 454) to determine that routing diagram 32 corresponds to the routing diagram identifier in the request from the computing system 80.

VIII. Additional Example Routing Diagrams

Figure 33:
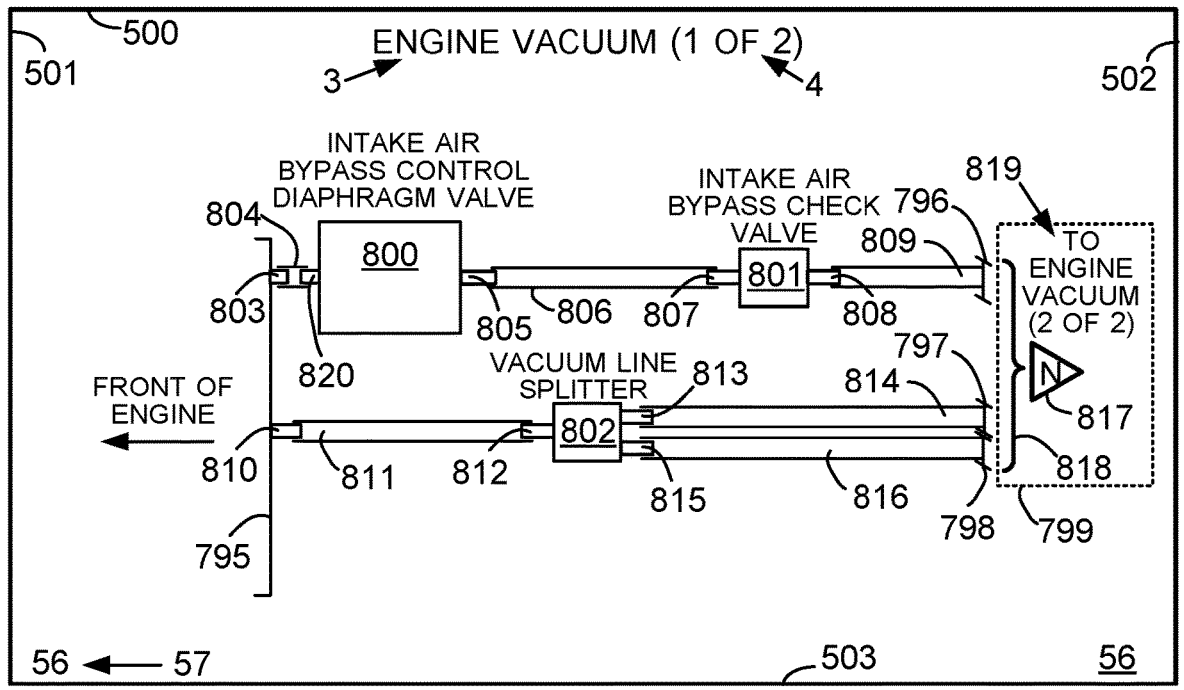
FIG. 33, FIG. 34, FIG. 35, FIG. 36, FIG. 37, and FIG. 38 show at least a portion of a routing diagram in accordance with one or more of the example implementations.

Next, FIG. 33 shows the routing diagram 56. The routing diagram 56 includes a routing diagram identifier 57. In some implementations, the routing diagram identifier 57 is visible on the display 84 while the routing diagram 56 is displayed on the display 84. In those or in other implementations, the routing diagram identifier 57 is stored within metadata corresponding to the routing diagram 56. The routing diagram identifier 57 is indicative of the routing diagram 56, which is a first of two routing diagrams corresponding to engine vacuum. The textual routing diagram identifier 3 and the diagram count 4 within the routing diagram 56 indicate that the routing diagram 56 is the first of two routing diagrams corresponding to engine vacuum.

The routing diagram 56 includes a routable component 804, 806, 809, 811, 814, 816. In at least some implementations, those reference numbers correspond to routable component numbers (e.g., vacuum line numbers) visually present on the routing diagram 56. The routing diagram 56 can include a textual description of a routable component. The routing diagram 56 also includes a connectable component 795, 800, 801, 802, representative of an internal combustion engine, an intake air bypass control diaphragm valve, an intake bypass check valve, and a vacuum line splitter, respectively.

Additionally, the routing diagram 56 includes a hotspot 796, 797, 798, 799. Although the hotspot 799 is represented using a dashed rectangular line, the hotspot 799 can cover a rectangular or non-rectangular area (e.g., a circular area) within the routing diagram 56 and a screen of the display 84.

The hotspot 796, 797, 798 includes an icon corresponding to a point where the routable component 809, 814, 816, respectively is broken within the routing diagram 56. The hotspot 796, 797, 798 is selectable to separately select the routable component 809, 814, 816, respectively and to cause the display 84 to display a routing diagram (i.e., the routing diagram 58 shown on FIG. 34) on which the routable component 809, 814, 816 continues from the broken point of the routable component 809, 814, 816. Additionally, in response to selecting the hotspot 796, 797, 798, the routable component 809, 814, 816, respectively is highlighted in the routing diagram displayed in response to selecting the hotspot 796, 797, 798.

The hotspot 799 includes an icon 817, a bracket icon 818, and a textual description 819. Since the icon 817, the bracket icon 818, and the textual description 819 are within the hotspot 799, the icon 817, the bracket icon 818, and the textual description 819 are hotspots that correspond to the routable component 809, the routable component 814, and the routable component 816. The textual description 819 indicates the textual routing diagram identifier for a routing diagram 58 shown in FIG. 34. The icon 817 includes an alphanumeric character. That alphanumeric character is identical to an alphanumeric character within an icon 827 shown in FIG. 34.

The hotspot 799, the icon 817, the bracket icon 818, and the textual description 819 are each selectable to select the routable component 809, the routable component 814, and the routable component 816 via a single selection. In at least some implementations, in response to determining the hotspot 799, the icon 817, the bracket icon 818, or the textual description 819 is selected, the processor 81 outputs the routing diagram 58 on the display 84 with a portion of each of the routable component 809, the routable component 814, and the routable component 816 highlighted and without highlighting any other routable component(s) on the routing diagram 58.

The connectable component 795 includes a terminal 803, 810. The connectable component 800 includes a terminal 805, 820. The connectable component 801 include a terminal 807, 808. The connectable component 802 includes a terminal 812, 813, 815. The routable component 804 is connected and/or connectable to the terminal 803, 805. The routable component 806 is connected and/or connectable to the terminal 805, 807. The routable component 809 is connected and/or connectable to the terminal 808. The routable component 811 is connected and/or connectable to the terminal 810, 812. The routable component 814 is connected and/or connectable to the terminal 813. The routable component 816 is connected and/or connectable to the terminal 815.

Figure 34:
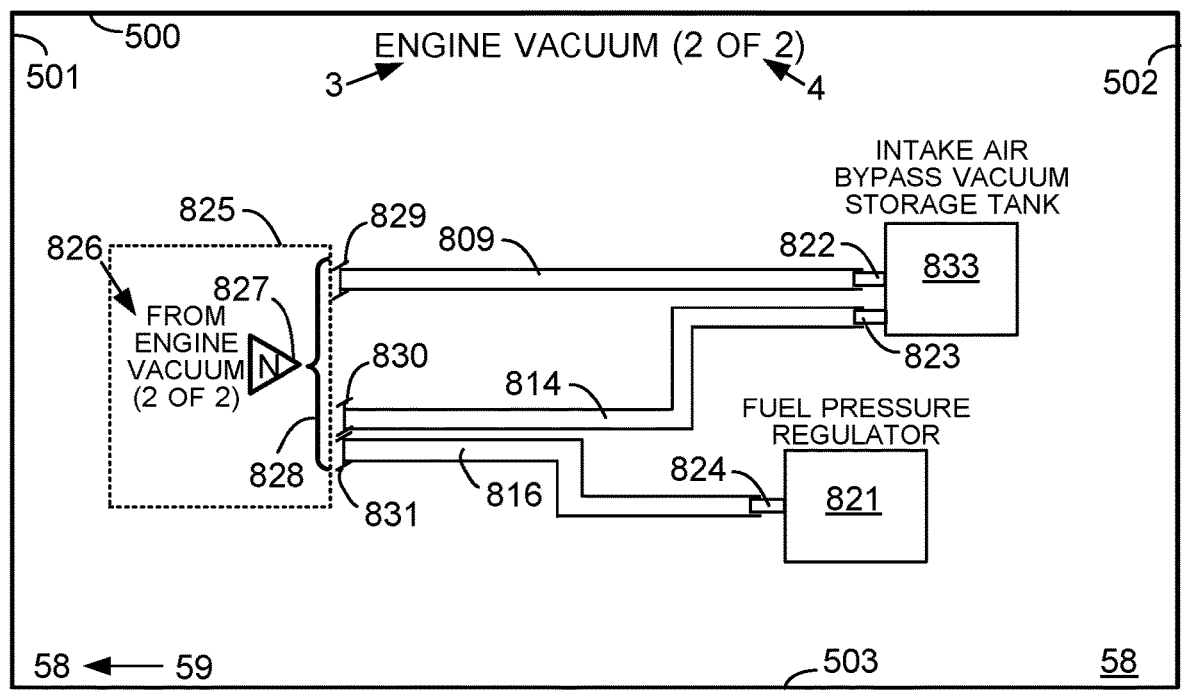

Next, FIG. 34 shows the routing diagram 58. The routing diagram 58 includes a routing diagram identifier 59. In some implementations, the routing diagram identifier 59 is visible on the display 84 while the routing diagram 58 is displayed on the display 84. In those or in other implementations, the routing diagram identifier 59 is stored within metadata corresponding to the routing diagram 58. The routing diagram identifier 59 is indicative of the routing diagram 58, which is a second of two routing diagrams corresponding to engine vacuum. The textual routing diagram identifier 3 and the diagram count 4 within the routing diagram 58 indicate that the routing diagram 58 is the second of two routing diagrams corresponding to engine vacuum.

The routing diagram 58 includes the routable component 809, 814, 816. In at least some implementations, those reference numbers correspond to routable component numbers (e.g., vacuum line numbers) visually present on the routing diagram 58. The routing diagram 58 can include a textual description of a routable component. The routing diagram 58 also includes a connectable component 821, 833, representative of a fuel pressure regulator, and an intake air bypass vacuum storage tank, respectively.

Additionally, the routing diagram 58 includes a hotspot 825, 829, 830, 831. Although the hotspot 825 is represented using a dashed rectangular line, the hotspot 825 or can cover a rectangular or non-rectangular area (e.g., a circular area) within the routing diagram 58 and a screen of the display 84.

The hotspot 829, 830, 831 includes an icon corresponding to a point where the routable component 809, 814, 816, respectively is broken within the routing diagram 58. The hotspot 829, 830, 831 is selectable to separately select the routable component 809, 814, 816, respectively and to cause the display 84 to display a routing diagram (i.e., the routing diagram 56 shown on FIG. 33) on which the routable component 809, 814, 816 continues from the broken point of the routable component 809, 814, 816. Additionally, the routable component 809, 814, 816 is highlighted in the routing diagram displayed in response to selecting the hotspot 829, 830, 831, respectively.

The hotspot 825 includes an icon 827, a bracket icon 828, and a textual description 826. Since the icon 827, the bracket icon 828, and the textual description 826 are within the hotspot 825, the icon 827, the bracket icon 828, and the textual description 826 are hotspots that correspond to the routable component 809, 814, 816. The bracket icon 828 is selectable to select the routable component 809, the routable component 814, and the routable component 816. The textual description 826 indicates the textual routing diagram identifier for the routing diagram 56 shown in FIG. 33. The icon 827 includes an alphanumeric character. That alphanumeric character is identical to an alphanumeric character within an icon 817 shown in FIG. 33.

The hotspot 825, the icon 827, the bracket icon 828, and the textual description 826 are each selectable to select the routable component 809, the routable component 814, and the routable component 816 via a single selection. In at least some implementations, in response to the processor 81 detecting that hotspot 825, the icon 827, the bracket icon 828, or the textual description 826 was selected, the processor 81 outputs the routing diagram 56 on the display 84 with a portion of each of the routable component 809, the routable component 814, and the routable component 816 highlighted and without highlighting any other routable component(s) on the routing diagram 56.

The connectable component 833 includes a terminal 822, 823. The connectable component 821 includes a terminal 824. The routable component 809 is connected and/or connectable to the terminal 822. The routable component 814 is connected and/or connectable to the terminal 823. The routable component 816 is connected and/or connectable to the terminal 824.

Figure 35:
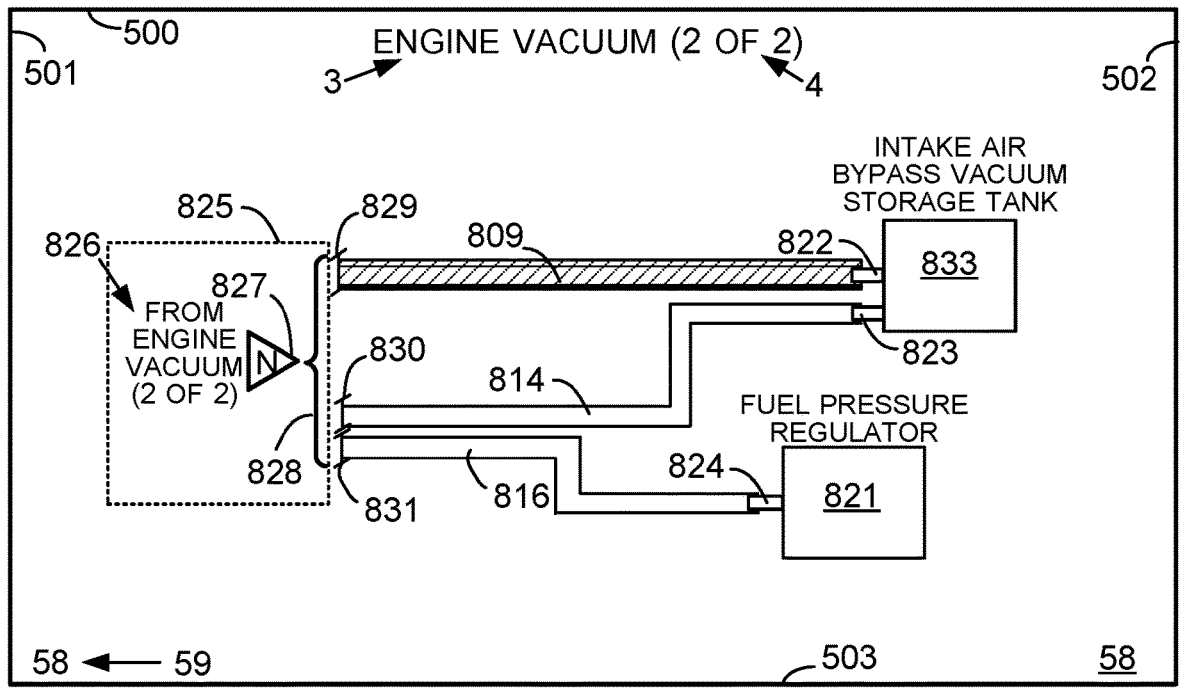

Next, FIG. 35 shows the routing diagram 58 with the routable component 809 highlighted and the routable component 814, 816 un-highlighted. The routing diagram 58 can be displayed on the display 84 as shown in FIG. 35 in response to the routable component 809 being selected within the routing diagram 58 when the routable component 809 is not highlighted. As another example, the routing diagram 58 can be displayed on the display 84 as shown in FIG. 35 in response to the hotspot 796 being selected when the routing diagram 56 is displayed.

Figure 36:
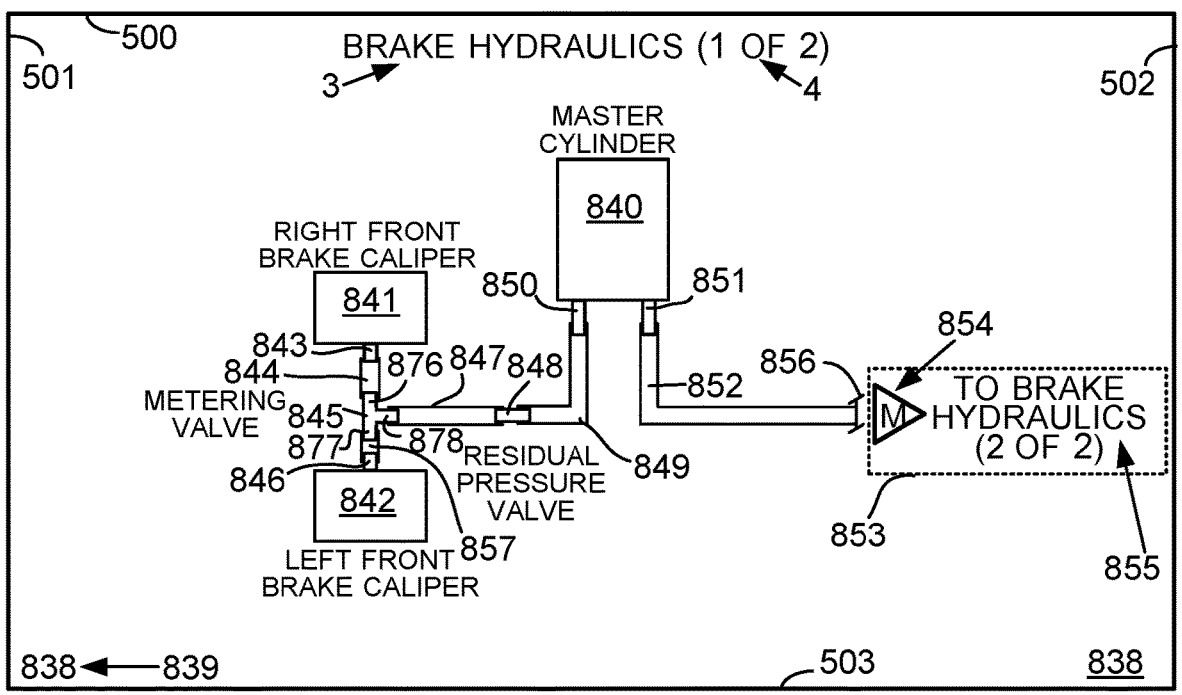

Next, FIG. 36 shows the routing diagram 838. The routing diagram 838 includes a routing diagram identifier 839. In some implementations, the routing diagram identifier 839 is visible on the display 84 while the routing diagram 838 is displayed on the display 84. In those or in other implementations, the routing diagram identifier 839 is stored within metadata corresponding to the routing diagram 838. The routing diagram identifier 839 is indicative of the routing diagram 838, which is a first of two routing diagrams corresponding to brake hydraulics. The textual routing diagram identifier 3 and the diagram count 4 within the routing diagram 838 indicate that the routing diagram 838 is the first of two routing diagrams corresponding to brake hydraulics.

The routing diagram 838 includes a routable component 844, 847, 849, 852, 857. In at least some implementations, those reference numbers correspond to routable component numbers (e.g., hydraulic brake line numbers) visually present on the routing diagram 838. The routing diagram 838 can include a textual description of a routable component. The routing diagram 838 also includes a connectable component 840, 841, 842, 845, representative of a master cylinder, a right front brake caliper, a left front brake caliper, and a metering valve, respectively.

Additionally, the routing diagram 838 includes a hotspot 853, 856. Although the hotspot 853 is represented using a dashed rectangular line, the hotspot 853 or can cover rectangular or non-rectangular area (e.g., a circular area) within the routing diagram 838 and a screen of the display 84.

The hotspot 856 includes an icon corresponding to a point where the routable component 852 is broken within the routing diagram 838. The hotspot 856 is selectable to separately select the routable component 852 and to cause the display 84 to display a routing diagram (i.e., the routing diagram 860 shown on FIG. 37) on which the routable component 852 continues from the broken point of the routable component 852. Additionally, the routable component 852 is highlighted in the routing diagram 860 in response to selecting the hotspot 856.

The hotspot 853 includes an icon 854 and a textual description 855. Since the icon 854 and the textual description 855 are within the hotspot 853, the icon 854 and the textual description 855 are hotspots that correspond to the routable component 852. The textual description 855 indicates the textual routing diagram identifier for the routing diagram 860 shown in FIG. 37. The icon 854 includes an alphanumeric character. That alphanumeric character is identical to an alphanumeric character within an icon 874 shown in FIG. 37.

The hotspot 853, the icon 854, and the textual description 855 are each selectable to select the routable component 852. In at least some implementations, in response to determining the hotspot 853, the icon 854, or the textual description 855 is selected, the processor 81 outputs the routing diagram 860 on the display 84 with a portion of the routable component 852 highlighted and without highlighting any other routable component(s) on the routing diagram 860.

The connectable component 840 includes a terminal 850, 851. The connectable component 841 includes a terminal 843. The connectable component 842 includes a terminal 846. The connectable component 845 includes a terminal 876, 877, 878. The routable component 844 is connected and/or connectable to a terminal 843, 877. The routable component 857 is connected and/or connectable to a terminal 846, 877. The routable component 847 is connected and/or connectable to a terminal 848, 878. The routable component 849 is connected and/or connectable to a terminal 848, 850. The routable component 852 is connected and/or connectable to a terminal 851.

Figure 37:
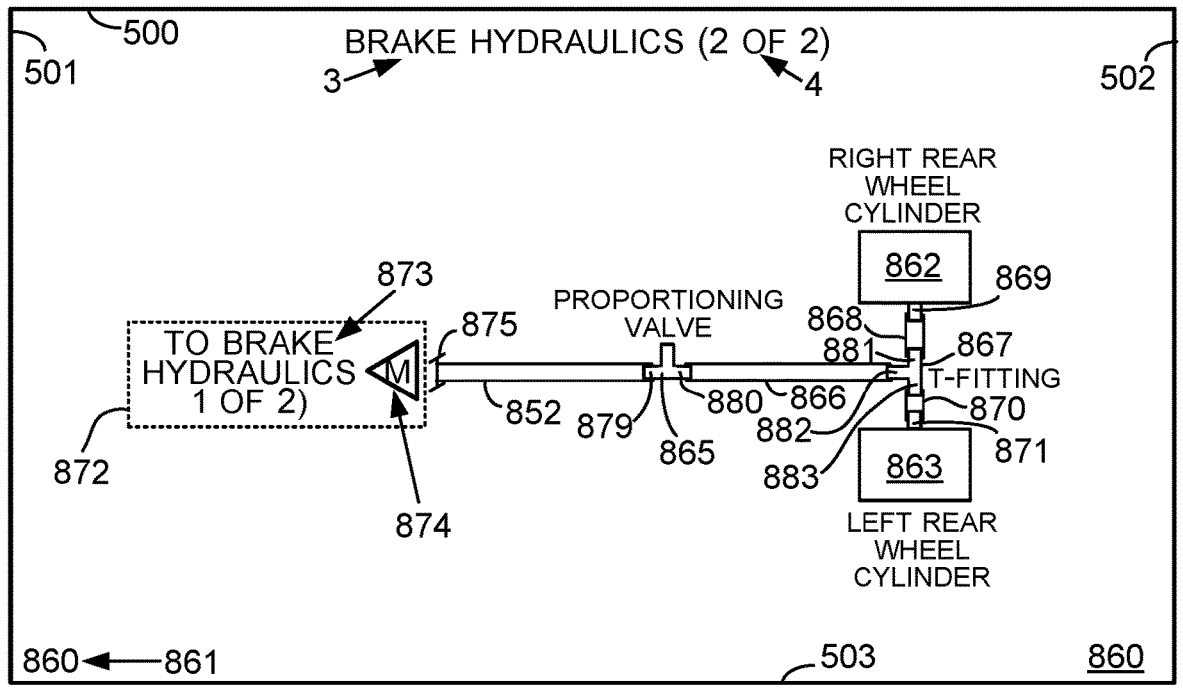

Next, FIG. 37 shows the routing diagram 860. The routing diagram 860 includes a routing diagram identifier 861. In some implementations, the routing diagram identifier 861 is visible on the display 84 while the routing diagram 860 is displayed on the display 84. In those or in other implementations, the routing diagram identifier 861 is stored within metadata corresponding to the routing diagram 860. The routing diagram identifier 861 is indicative of the routing diagram 860, which is a second of two routing diagrams corresponding to brake hydraulics. The textual routing diagram identifier 3 and the diagram count 4 within the routing diagram 860 indicate that the routing diagram 860 is the second of two routing diagrams corresponding to brake hydraulics.

The routing diagram 860 includes the routable component 852, 866, 868, 870. In at least some implementations, those reference numbers correspond to routable component numbers (e.g., hydraulic brake line numbers) visually present on the routing diagram 860. The routing diagram 860 can include a textual description of a routable component. The routing diagram 860 also includes a connectable component 862, 863, 865, 867 representative of a right rear wheel cylinder, a left rear wheel cylinder, a proportioning valve, and a T-fitting, respectively.

Additionally, the routing diagram 860 includes a hotspot 872, 875. Although the hotspot 872 is represented using a dashed rectangular line, the hotspot 872 or can cover a rectangular or non-rectangular area (e.g., a circular area) within the routing diagram 860 and a screen of the display 84.

The hotspot 875 includes an icon corresponding to a point where the routable component 852 is broken within the routing diagram 860. The hotspot 875 is selectable to separately select the routable component 852 and to cause the display 84 to display a routing diagram (i.e., the routing diagram 838 shown on FIG. 36) on which the routable component 852 continues from the broken point of the routable component 852 shown in FIG. 37. Additionally, the routable component 852 is highlighted in the routing diagram 838 in response to selecting the hotspot 875.

The hotspot 872 includes an icon 874 and a textual description 873. Since the icon 874 and the textual description 873 are within the hotspot 872, the icon 874 and the textual description 873 are hotspots that correspond to the routable component 852. The textual description 873 indicates the textual routing diagram identifier for a routing diagram 838 shown in FIG. 36. The icon 874 includes an alphanumeric character. That alphanumeric character is identical to an alphanumeric character within an icon 854 shown in FIG. 36.

The hotspot 872, the icon 874, and the textual description 873 are each selectable to select the routable component 852. In at least some implementations, in response to determining the hotspot 872, the icon 874, or the textual description 873 is selected, the processor 81 outputs the routing diagram 838 on the display 84 with a portion of the routable component 852 highlighted and without highlighting any other routable component(s) on the routing diagram 838.

The connectable component 862 includes a terminal 869. The connectable component 863 includes a terminal 871. The connectable component includes a terminal 881, 882, 883. The routable component 852 is connected and/or connectable to a connectable component 865. The routable component 866 is connected and/or connectable to a connectable component 865, 867. The routable component 868 is connected and/or connectable to a terminal 869, 881. The routable component 870 is connected and/or connectable to the terminal 871, 883.

Figure 38:
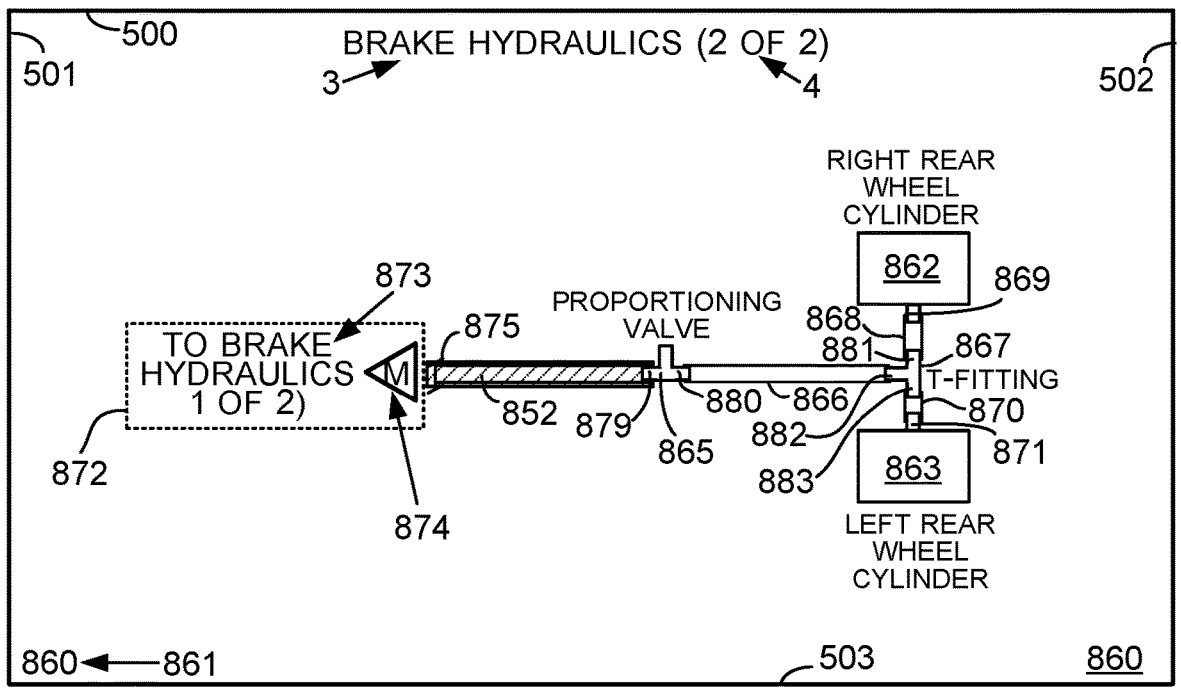

Next, FIG. 38 shows the routing diagram 860 with the routable component 852 highlighted and the routable component 866, 868, 870 un-highlighted. The routing diagram 860 can be displayed on the display 84 as shown in FIG. 38 in response to the routable component 852 being selected within the routing diagram 860 when the routable component 852 is not highlighted. As another example, the routing diagram 860 can be displayed on the display 84 as shown in FIG. 38 in response to the hotspot 856 being selected when the routing diagram 838 is displayed.

IX. Example Vehicle

In accordance with the example implementations, a routable component can be a routable component within a DUS arranged as a vehicle. Examples of a routable component within a vehicle include a wire within a wire harness, a hydraulic line for a transmission, an optical communication line for a communication system, a pneumatic line for an air brake system, and a vacuum line connecting an intake manifold and an EGR valve.

Similarly, in accordance with the example implementations, a connectable component can be a component within a DUS arranged as a vehicle. Such component can be referred to as a vehicle component. A vehicle component can include a computing system, such as an ECU manufactured by and/or for an OEM of a vehicle. A vehicle component can include a sensor manufactured by or for an original equipment manufacturer (OEM) of a vehicle. Other examples of a vehicle component are possible.

A vehicle is a mobile machine that can be used to transport a person, people, and/or cargo. Accordingly, a vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, 400 volts, 800 volts, or some other voltage level. A vehicle can, but need not necessarily, include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A vehicle can, but need not necessarily, include an ECU, an on-board diagnostic connector (OBDC), and a vehicle network that connects the OBDC to the ECU. A vehicle can be operable to operate as an autonomous vehicle.

Some vehicles and types of vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y/M/M/E is 2020/Toyota/Camry/4 Cyl, in which "2020" represents the model year the vehicle was built, "Toyota" represents the name of the vehicle manufacturer Toyota Motor Corporation, Aichi Japan, "Camry" represents a vehicle model built by that manufacturer, and "4 Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

Some vehicles, such as automobiles, are associated with a unique vehicle identification number (VIN). Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME or a YMM. In some instances, a vehicle includes a one dimensional bar code indicative of a VIN associated with that vehicle.

A vehicle network can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include a SAE® J1850 (PWM or VPW) VDM protocol, an SAE® J1939 VDM protocol based on the SAE® J1939_201808 serial control and communications heavy duty vehicle network—top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle—CAN—Part I: data link layer and physical signaling protocol, a CAN FD VDM protocol (i.e., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within a vehicle (e.g., the DUS 67). Each and every VDM discussed in this description is arranged according to a VDM protocol.

Instead of being bidirectional, a VDM protocol can be a unidirectional. For example, a SENT VDM protocol (i.e., a single-edge nibble transmission VDM protocol) is a unidirectional VDM protocol. The SENT VDM protocol has been standardized as the SAE J2716 VDM protocol. A sensor in a vehicle can include a transmitter operable to communicate using the SENT VDM protocol (i.e., a SENT VDM transmitter). A vehicle communication bus can operatively connect the SENT VDM transmitter and an ECU within the vehicle. The communication interface 85 can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter. These vehicle communication bus is an example of a routing component that can be shown in a routing diagram, such as a wiring diagram.

An OBDC can include an on-board diagnostic (OBD) II connector. An OBD II connector can include slots for retaining up to sixteen connector terminals, but can include a different number of slots or no slots at all. As an example, an OBDC can include an OBD II connector that meets the SAE J1962 specification such as a connector 16M, part number 12110252, available from Aptiv LLC of Dublin, Ireland. An OBDC can include conductor terminals that connect to a conductor in a vehicle. For instance, an OBDC can include connector terminals that connect to conductors that respectively connect to positive and negative terminals of a battery or battery pack. An OBDC can include one or more conductor terminals that connect to a conductor of a vehicle communication bus such that the OBDC is operatively connected to one or more ECUs. A computing system, such as the client 74 or computing system 80 can operatively connect to an OBDC in order to receive VDM from the vehicle including that OBDC. A VDM can carry VDM data. The VDM data can, but need not necessarily, include a parameter-identifier (PID) and parameter values associated with the PID. The VDM data can, but need not necessarily, include a DTC. The operative connection between the OBDC and the client 74 or computing system 60, 80 can occur via the communication link 68, 76 shown in FIG. 6 and FIG. 7 respectively or via some other arrangement. The communication link 68, 76 are shown using dashed lines to represent that the computing system 60 and portions of the network architecture other than the DUS 67, respectively, can operate without the DUS being connected thereto.

An ECU can control various aspects of vehicle operation and/or components within a vehicle system. For example, an ECU can include a powertrain (PT) system ECU, an engine control module (ECM) ECU, a supplemental inflatable restraint (SIR) system (i.e., an air bag system) ECU, an entertainment system ECU, or some other ECU. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a diagnostic trouble code (DTC) to a state (such as active or history). An ECU can perform a functional test in response to receiving a VDM requesting performance of the functional test. The functional test can be used to test an ECU-connected output device. In at least some implementations, the ECU is operable to perform the functional test and/or provide the diagnostic trouble code in accordance with an industry standard, such as the SAE J1979_201202 and/or ISO 15031-5 standards for E/E diagnostic test modes. These components are examples of connectable components that can be shown in a routing diagram, such as a wiring diagram.

X. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable memory to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

This application incorporates by reference United States Patent Application Publication No. US 2021/0004585-A1, which has a Jan. 7, 2021 publication date and the following title: Method and system for displaying routing diagram with highlighted routable components. This application also incorporates by reference U.S. patent application Ser. No. 16/460,736, which a Jul. 2, 2019 filing date and the following title: Method and system for displaying routing diagram with highlighted routable components.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

Implementations of the present disclosure may thus relate to one of the enumerated example embodiments (EEEs) listed below.

EEE 1 is a method comprising displaying, on a display, a first routing diagram, wherein: the first routing diagram is a member of a first set of routing diagrams that includes multiple different routing diagrams, displaying the first routing diagram includes displaying, within the first routing diagram, a first user-selectable control and a first portion of a particular routable component, and the first user-selectable control indicates that the particular routable component continues on a second routing diagram; determining, by processor, a selection of the first user-selectable control occurs while the first routing diagram is displayed on the display; and displaying, on the display in response to determining the selection of the first user-selectable control occurs while the first routing diagram is displayed on the display, the second routing diagram, wherein displaying the second routing diagram includes displaying a second portion of the particular routable component.

EEE 2 is a method according to EEE 1, wherein the second routing diagram is a member of the first set of routing diagrams.

EEE 3 is a method according to EEE 2, wherein: the multiple different routing diagrams are arranged according to a sequence of multiple routing diagrams, and the sequence of multiple routing diagrams includes at least one routing diagram between the first routing diagram and the second routing diagram.

EEE 4 is a method according to EEE 3, further comprising: displaying, on the display, a second user-selectable control and a third user-selectable control, wherein: a selection of the second user-selectable control signals the processor to display an earlier diagram in the sequence of multiple diagrams, if any, compared to a currently-displayed diagram of the sequence of multiple diagrams, a selection of the third user-selectable control signals the processor to display a later diagram in the sequence of multiple diagrams, if any, compared to the currently-displayed diagram of the sequence of multiple diagrams.

EEE 5 is a method according to any one of EEE 2 to 4, wherein (i) the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit, (ii) the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line, (iii) the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line, (iv) the first routing diagram includes a first pneumatic line diagram, the second routing diagram includes a second pneumatic line diagram, the first portion of the particular routable component represents a first portion of a particular pneumatic line, and the second portion of the particular routable component represents a second portion of the particular pneumatic line, or (v) the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

EEE 6 is a method according to any one of EEE 2 to 4, wherein the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit.

EEE 7 is a method according to any one of EEE 2 to 4, wherein the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line.

EEE 8 is a method according to any one of EEE 2 to 4, wherein the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line.

EEE 9 is a method according to any one of EEE 2 to 4, wherein the first routing diagram includes a first pneumatic line diagram, the second routing diagram includes a second pneumatic line diagram, the first portion of the particular pneumatic line, and the second portion of the particular routable component represents a first portion of a particular pneumatic line, and the second portion of the particular routable component represents a second portion of the particular pneumatic line.

EEE 10 is a method according to any one of EEE 2 to 4, wherein the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

EEE 11 is a method according to any one of EEE 2 to 10, wherein: the first user-selectable control corresponds to first metadata, the first metadata includes an identifier of the particular routable component within the second routing diagram, and the method further comprises: after determining the selection of the first user-selectable control occurs while the first routing diagram is displayed on the display, but before displaying the second routing diagram, determining, by the processor based at least in part on the identifier of the particular routable component, the second portion of the particular routable component is within the second routing diagram.

EEE 12 is a method according to EEE 1, wherein: the second routing diagram is a member of a second set of routing diagrams, the second set of routing diagrams includes one or more routing diagrams not contained in the first set of routing diagrams, and the second routing diagram is not a member of the first set of routing diagrams, and optionally, the multiple different routing diagrams are arranged according to a first sequence of multiple routing diagrams and the second set of routing diagrams includes multiple different routing diagrams are arranged according to a second sequence of multiple routing diagrams.

EEE 13 is a method according to EEE 12, wherein: (i) the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit, (ii) the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line, (iii) the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line, (iv) the first routing diagram includes a first pneumatic line diagram, the second routing diagram includes a second pneumatic line diagram, the first portion of the particular routable component represents a first portion of a particular pneumatic line, and the second portion of the particular routable component represents a second portion of the particular pneumatic line, or (v) the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

EEE 14 is a method according to EEE 12, wherein the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit.

EEE 15 is a method according to EEE 12, wherein the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line.

EEE 16 is a method according to EEE 12, wherein the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line.

EEE 17 is a method according to EEE 12, wherein the first routing diagram includes a first pneumatic line diagram, the second routing diagram includes a second pneumatic line diagram, the first portion of the particular routable component represents a first portion of a particular pneumatic line, and the second portion of the particular routable component represents a second portion of the particular pneumatic line.

EEE 18 is a method according to EEE 12, wherein the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

EEE 19 is a method according to any one of EEE 12 to 18, wherein each routing diagram of the first set of routing diagrams and each routing diagram of the second set of routing diagrams is a different routing diagram.

EEE 20 is a method according to any one of EEE 12 to 19, wherein: the first user-selectable control corresponds to first metadata, the first metadata includes an identifier of the second routing diagram, an identifier of the particular routable component on the second routing diagram, and an identifier of the second set of routing diagrams, and the method further comprises in response to determining the selection of the first user-selectable control occurs while the first routing diagram is displayed on the display: retrieving, by the processor based at least in part on the identifier of the second routing diagram and the identifier of the second set of routing diagrams, the second routing diagram from a database; determining, by the processor, a path of the particular routable component on the second routing diagram; and displaying, on the display, the second routing diagram with the particular routable component on the second routing diagram highlighted along the path.

EEE 21 is a method according to EEE 20, wherein the identifier of the particular routable component on the second routing diagram and the identifier of the second set of routing diagrams are distinct identifiers.

EEE 22 is a method according to any one of EEE 20 to 21, wherein: the first metadata further includes an identifier of a connectable component corresponding to the particular routable component, the second routing diagram includes the connectable component, and displaying the second routing diagram in response to determining the selection of the first user-selectable control occurs further includes displaying the connectable component highlighted.

EEE 23 is method according to any one of EEE 20 to 22, wherein: second metadata corresponds to the connectable component, the second metadata includes an identifier of two or more routable components, the two or more components are represented in the second routing diagram as being connected to the connectable component, the two or more routable components include the particular routable component, and displaying the second routing diagram in response to determining the selection of the first user-selectable control occurs further includes displaying the two or more routable components highlighted.

EEE 24 is a method according to any one of EEE 1 to 23, wherein: the first user-selectable control corresponds to first metadata, the first metadata includes an identifier of the particular routable component within the second routing diagram, and the method further comprises after determining the selection of the first user-selectable control occurs while the first routing diagram is displayed on the display, but before displaying the second routing diagram, determining, by the processor based at least in part on the identifier of the particular routable component, the second portion of the particular routable component is within the second routing diagram.

EEE 25 is a method according to any one of EEE 1 to 23, wherein: the first user-selectable control corresponds to first metadata, the first metadata includes an identifier of the second routing diagram and an identifier of the particular routable component on the second routing diagram, and the method further comprises: after determining the selection of the first user-selectable control occurs while the first routing diagram is displayed on the display, but before displaying the second routing diagram, retrieving, by the processor based at least in part on the identifier of the second routing diagram, the second routing diagram from a database; searching, by the processor, the second routing diagram to determine a path of the particular routable component on the second routing diagram; and displaying, on the display, the second routing diagram with the particular routable component on the second routing diagram highlighted.

EEE 26 is a method according to EEE 25, wherein: the second routing diagram includes a second user-selectable control, the second user-selectable control includes an indicator that indicates the particular routable component continues on the first routing diagram, the second user-selectable control corresponds to second metadata, and the second metadata includes an identifier of the first routing diagram and an identifier of the particular routable component on the first routing diagram.

EEE 27 is a method according to EEE 26, wherein the identifier of the particular routable component on the first routing diagram is different than identifier of the particular routable component on the second routing diagram.

EEE 28 is a method according to any one of EEE 26 to 27, further comprising: determining, by a processor, a selection of the second user-selectable control occurs while the second routing diagram is displayed on the display; after determining the selection of the second user-selectable control occurs while the second routing diagram is displayed on the display, but before displaying the first routing diagram again, retrieving, by the processor based at least in part on the identifier of the first routing diagram, the first routing diagram from the database; searching, by the processor, the first routing diagram to determine a path of the particular routable component on the first routing diagram; and displaying, on the display, the first routing diagram with the particular routable component on the first routing diagram highlighted.

EEE 29 is a method according to EEE 28, wherein: the first routing diagram includes a third user-selectable control, the third user-selectable control includes an indicator that indicates the particular routable component continues on a third routing diagram, the third routing diagram is a member of the first set of routing diagrams, the third user-selectable control corresponds to third metadata, the third metadata includes an identifier of the third routing diagram and an identifier of the particular routable component on the third routing diagram, and the method further comprises: (i) determining, by processor, a selection of the third user-selectable control occurs while the first routing diagram is displayed on the display; (ii) after determining the selection of the third user-selectable control occurs while the first routing diagram is displayed on the display, but before displaying the third routing diagram, retrieving, by the processor based at least in part on the identifier of the third routing diagram, the third routing diagram from the database; (iii) searching, by the processor, the third routing diagram to determine a path of the particular routable component on the third routing diagram; and (iv) displaying, on the display, the third routing diagram with the particular routable component on the third routing diagram highlighted; and optionally, the identifier of the particular routable component on the first routing diagram is identical to the identifier of the particular routable component on the third routing diagram.

EEE 30 is a method according to EEE 26, wherein: the second routing diagram is a member of a second set of routing diagrams, the second set of routing diagrams includes one or more routing diagrams not contained in the first set of routing diagrams, the second routing diagram is not a member of the first set of routing diagrams, the second routing diagram includes a third user-selectable control, the third user-selectable control includes an indicator that indicates the particular routable component continues on a third routing diagram, the third routing diagram is contained within the second set of routing diagrams, the third user-selectable control corresponds to third metadata, the third metadata includes an identifier of the third routing diagram and an identifier of the particular routable component on the third routing diagram, and the method further comprises: (i) determining, by a processor, a selection of the third user-selectable control occurs while the second routing diagram is displayed on the display; (ii) after determining the selection of the third user-selectable control occurs, but before displaying the third routing diagram, retrieving, by the processor based at least in part on the identifier of the third routing diagram, the third routing diagram from the database; (iii) searching, by the processor, the third routing diagram to determine a path of the particular routable component on the third routing diagram; and (iv) displaying, on the display, the third routing diagram with the particular routable component on the third routing diagram highlighted; and optionally, the identifier of the particular routable component on the second routing diagram is identical to the identifier of the particular routable component on the third routing diagram.

EEE 31 is a method according to any one of EEE 15 to 30, wherein displaying the second routing diagram with the particular routable component on the second routing diagram highlighted includes displaying the particular routable component within the particular routable component defined by a first stroke width, a first color, and a path and displaying highlighting defined by a second stroke width, a second color, an opacity value, and the path.

EEE 32 is a method according to any one of EEE 20 to 23 or 25 to 31, wherein the identifier of the second routing diagram includes a routing diagram set identifier and a drawing identifier within a routing diagram set indicated by the routing diagram set identifier.

EEE 33 is a method according to any one of EEE 20 to 23 or 25 to 31, wherein the identifier of the second routing diagram includes a textual routing diagram identifier and a diagram count.

EEE 34 is a method according to any one of EEE 20 to 23 or 25 to 31, wherein the identifier of the second routing diagram includes an index value corresponding to the first user-selectable control.

EEE 35 is a method according to any one of EEE 1 to 34, wherein: the first routing diagram includes a second routable component, the method further comprises: (i) determining, by the processor, a selection of the first portion of the particular routable component and a selection of the second routable component occur while the first routing diagram is displayed on the display, (ii) displaying, in response to the selection of the first portion of the particular routable component, the first portion of the routable component as highlighted; and (iii) displaying, in response to the selection of the second routable component, the second routable component as highlighted; and optionally, a color of highlighting for the first portion of the particular routable component is different than a color of highlighting for the second routable component.

EEE 36 is a method according to any one of EEE 1 to 34, wherein: the first routing diagram includes a second routable component, a color of highlighting for the first portion of the particular routable component is different than a color of highlighting for the second routable component, and the method further comprises: (i) determining, by the processor, a selection of the first portion of the particular routable component and a selection of the second routable component occur while the first routing diagram is displayed on the display; (ii) displaying, in response to the selection of the first portion of the particular routable component, the first portion of the routable component as highlighted; (iii) displaying, in response to the selection of the second routable component, the second routable component as highlighted; and (iv) determining, by the processor, the color of highlighting for the first portion of the particular routable component and the color of highlighting for the second routable component based on an order the selection of the first portion of the particular routable component and the selection of the second routable component.

EEE 37 is a method according to any one of EEE 1 to 36, wherein displaying the second routing diagram includes displaying the second routing diagram instead of the first routing diagram.

EEE 38 is a method according to any one of EEE 1 to 37, further comprising: determining, by the processor prior to determining the selection of the first user-selectable control occurs while the first routing diagram is displayed on the display, a selection of the particular routable component occurs while the first routing diagram is displayed on the display; and displaying, on the display in response to determining the selection of the particular routable component occurs while the first routing diagram is displayed on the display, the particular routable component highlighted instead of un-highlighted, wherein: the particular routable component in the first routing diagram is highlighted when the selection of the first user-selectable control occurs; and the particular routable component in the second routing diagram is highlighted when displaying the second routing diagram in response to determining the selection of the first user-selectable control occurs.

EEE 39 is a method according to any one of EEE 1 to 38, wherein: displaying the first routing diagram includes displaying, within the first routing diagram, a second user-selectable control and a first portion of a second particular routable component, the second user-selectable control indicates that the second particular routable component continues on a third routing diagram, the second routing diagram is a member of the first set of routing diagrams or a second set of routing diagrams not including the first routing diagram, the third routing diagram is a member of the other of first set of routing diagrams or the second set of routing diagrams, and the first user-selectable control and the second user-selectable control include different symbols to distinguish the second routing diagram and the third routing diagram continue on routing diagrams contained in different sets of routing diagrams.

EEE 40 is a method according any one of EEE 1 to 39, wherein the first routing diagram includes a graphics file.

EEE 41 is a method according to EEE 40, wherein the graphics file includes a vector graphics file.

EEE 42 is a method according to EEE 41 wherein the vector graphics file is formatted as an SVG (Scalable Vector Graphics) file, an EPS (Encapsulated PostScript) file, a PDF (Portable Document Format) file, an AI (Adobe Illustrator Artwork) file, or a DXF (Drawing eXchange Format) file.

EEE 43 is a method according to EEE 40, wherein the graphics file includes a raster graphics file.

EEE 44 is a method according to EEE 43, wherein the raster graphics file is formatted as a BMP (bitmap) file, a TIF (Tagged Image File) file, a JPG (Joint Photographic Group) file, a JPEG (Joint Photographic Experts Group) file, a GIF (Graphical Interchange Format) file, or a PNG (Portable Network Graphic) file.

EEE 45 is a method according to any one of EEE 1 to 44, wherein the first routing diagram includes a first edge, a second edge, a third edge, a fourth edge, and a border area within the first routing diagram and adjacent the first edge, the second edge, the third edge, and the fourth edge.

EEE 46 is a method according to EEE 45, wherein the border area extends a first distance away from the first edge, a second distance away from the second edge, a third distance away from the third edge, and a fourth distance away from the fourth edge.

EEE 47 is a method according to EEE 46, wherein the first distance is defined as a first number of pixels, the second distance is defined as a second number of pixels, the third distance is defined as a third number of pixels, and the fourth distance is defined as a fourth number of pixels.

EEE 48 is a method according to EEE 46, wherein the first distance is defined as a percentage of a width dimension of the first routing diagram, the second distance is defined as a percentage of a height dimension of the first routing diagram, the third distance is defined as the percentage of the width dimension of the first routing diagram, and the fourth distance is defined as the percentage of the height dimension of the first routing diagram.

EEE 49 is a method according to any one of EEE 45 to 47, wherein the first user-selectable control is not located within the border area.

EEE 50 is a method according to any one of EEE 1 to 49, wherein first user-selectable control defines an area within the first routing diagram that is selectable by a user interface, and wherein the area within the first routing diagram includes a graphical icon and/or a textual description.

EEE 51 is a computing system comprising: a processor; and a non-transitory computer-readable memory configured to store at least executable instructions, wherein the executable instructions, when executed by the processor, cause the computing system to perform functions comprising: (i) displaying, on a display, a first routing diagram, wherein: the first routing diagram is a member of a first set of routing diagrams that includes multiple different routing diagrams, displaying the first routing diagram includes displaying, within the first routing diagram, a first user-selectable control and a first portion of a particular routable component, and the first user-selectable control indicates that the particular routable component continues on a second routing diagram; (ii) determining, by a processor, a selection of the first user-selectable control occurs while the first routing diagram is displayed on the display; and (iii) displaying, on the display in response to determining the selection of the first user-selectable control occurs while the first routing diagram is displayed on the display, the second routing diagram, wherein displaying the second routing diagram includes displaying a second portion of the particular routable component.

EEE 52 is a computing system comprising: a processor; and a non-transitory computer-readable memory configured to store at least executable instructions, wherein the executable instructions are executable by the processor to cause a computing system to perform functions comprising a method according to any one of EEE 1 to 50.

EEE 53 is a non-transitory computer-readable memory having stored therein instructions executable by a processor to cause a computing system to perform functions comprising: (i) displaying, on a display, a first routing diagram, wherein: the first routing diagram is a member of a first set of routing diagrams that includes multiple different routing diagrams, displaying the first routing diagram includes displaying, within the first routing diagram, a first user-selectable control and a first portion of a particular routable component, and the first user-selectable control indicates that the particular routable component continues on a second routing diagram; (ii) determining, by a processor, a selection of the first user-selectable control occurs while the first routing diagram is displayed on the display; and (iii) displaying, on the display in response to determining the selection of the first user-selectable control occurs while the first routing diagram is displayed on the display, the second routing diagram, wherein displaying the second routing diagram includes displaying a second portion of the particular routable component.

EEE 54 is a non-transitory computer-readable memory having stored therein instructions executable by a processor to cause a computing system to perform functions comprising a method according to any one of EEE 1 to 50.

EEE 55 is a method comprising: displaying, on a display, a first routing diagram, wherein: the first routing diagram is a member of a first set of routing diagrams that includes multiple different routing diagrams, displaying the first routing diagram includes displaying, within the first routing diagram, a first user-selectable control, a first portion of a particular routable component, a first terminal connected to the particular routable component, and a second terminal connected or connectable to the first terminal, and the first user-selectable control corresponds to the first terminal or the second terminal, determining, by a processor, a selection of the first user-selectable control occurs while the first routing diagram is displayed on the display; and displaying, on the display in response to determining the selection of the first user-selectable control occurs while the first routing diagram is displayed on the display, a second routing diagram with a second portion of the particular routable component highlighted.

EEE 56 is a method according to EEE 55, wherein: displaying the second routing diagram includes displaying: a second user-selectable control, a third user-selectable control, a fourth user-selectable control, a first portion of a second routable component, and a first portion of a third routable component, the second user-selectable control corresponds to a terminal portion of the second routable component shown within the second routing diagram, the third user-selectable control corresponds to a terminal portion of the third routable component shown within the second routing diagram, the fourth user-selectable control corresponds to the second routable component and the third routable component, the method further comprises one from among: determining, by the processor, a selection of the second user-selectable control occurs while the second routing diagram is displayed on the display and responsively displaying the first routing diagram on the display with a second portion of the second routable component highlighted, determining, by the processor, a selection of the third user-selectable control occurs while the second routing diagram is displayed on the display and responsively displaying the first routing diagram on the display with a second portion of the third routable component highlighted, or determining, by the processor, a selection of the fourth user-selectable control occurs while the second routing diagram is displayed on the display and responsively displaying the first routing diagram on the display with both a second portion of the second routable component and a second portion of the third routable component highlighted.

EEE 57 is a method according to EEE 56, wherein the second routable component or the third routable component is the particular routable component.

EEE 58 is a method according to any one of EEE 55 to 57, wherein the second routing diagram is a member of the first set of routing diagrams.

EEE 59 is a method according to EEE 58, wherein: the multiple different routing diagrams are arranged according to a sequence of multiple routing diagrams, and the sequence of multiple routing diagrams includes at least one routing diagram between the first routing diagram and the second routing diagram.

EEE 60 is a method according to EEE 59, further comprising: displaying, on the display, a second user-selectable control and a third user-selectable control, wherein: a selection of the second user-selectable control signals the processor to display an earlier diagram in the sequence of multiple routing diagrams, if any, compared to a currently-displayed diagram of the sequence of multiple routing diagrams, a selection of the third user-selectable control signals the processor to display a later diagram in the sequence of multiple routing diagrams, if any, compared to the currently-displayed diagram of the sequence of multiple routing diagrams.

EEE 61 is a method according to EEE 58, wherein: (i) the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit, (ii) the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line, (iii) the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line, (iv) the first routing diagram includes a first pneumatic line diagram, the second routing diagram includes a second pneumatic line diagram, the first portion of the particular routable component represents a first portion of a particular pneumatic line, and the second portion of the particular routable component represents a second portion of the particular pneumatic line, or (v) the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

EEE 62 is a method according to EEE 58, wherein: the first user-selectable control corresponds to first metadata, the first metadata includes an identifier of the particular routable component within the second routing diagram, and the method further comprises: after determining the selection of the first user-selectable control occurs while the first routing diagram is displayed on the display, but before displaying the second routing diagram, determining, by the processor based at least in part on the identifier of the particular routable component, the second portion of the particular routable component is within the second routing diagram.

EEE 63 is method according to EEE 55, wherein: the second routing diagram is a member of a second set of routing diagrams, the second set of routing diagrams includes one or more routing diagrams not contained in the first set of routing diagrams, and the second routing diagram is not a member of the first set of routing diagrams.

EEE 64 is a method according to EEE 63, wherein the multiple different routing diagrams are arranged according to a first sequence of multiple routing diagrams and the second set of routing diagrams includes multiple different routing diagrams are arranged according to a second sequence of multiple routing diagrams.

EEE 65 is method according to any one of EEE 63 or 64, wherein: (i) the first routing diagram includes a first electrical wiring diagram, the second routing diagram includes a second electrical wiring diagram, the first portion of the particular routable component represents a first portion of a particular electrical circuit, and the second portion of the particular routable component represents a second portion of the particular electrical circuit, (ii) the first routing diagram includes a first optical communication line diagram, the second routing diagram includes a second optical communication line diagram, the first portion of the particular routable component represents a first portion of a particular optical communication line, and the second portion of the particular routable component represents a second portion of the particular optical communication line, (iii) the first routing diagram includes a first hydraulic line diagram, the second routing diagram includes a second hydraulic line diagram, the first portion of the particular routable component represents a first portion of a particular hydraulic line, and the second portion of the particular routable component represents a second portion of the particular hydraulic line, (iv) the first routing diagram includes a first pneumatic line diagram, the second routing diagram includes a second pneumatic line diagram, the first portion of the particular routable component represents a first portion of a particular pneumatic line, and the second portion of the particular routable component represents a second portion of the particular pneumatic line, or (v) the first routing diagram includes a first vacuum line diagram, the second routing diagram includes a second vacuum line diagram, the first portion of the particular routable component represents a first portion of a particular vacuum line, and the second portion of the particular routable component represents a second portion of the particular vacuum line.

EEE 66 is a method according to any one of EEE 63 to 65, wherein each routing diagram of the first set of routing diagrams and each routing diagram of the second set of routing diagrams is a different routing diagram.

EEE 67 is a method according to any one of EEE 63 to 66, wherein: the first user-McDonnell selectable control corresponds to first metadata, the first metadata includes an identifier of the second routing diagram, an identifier of the particular routable component on the second routing diagram, and an identifier of the second set of routing diagrams, and the method further comprises in response to determining the selection of the first user-selectable control occurs while the first routing diagram is displayed on the display: retrieving, by the processor based at least in part on the identifier of the second routing diagram and the identifier of the second set of routing diagrams, the second routing diagram from a database; determining, by the processor, a path of the particular routable component on the second routing diagram; and displaying, on the display, the second routing diagram with the particular routable component on the second routing diagram highlighted along the path.

EEE 68 is a method according to EEE 67, wherein the identifier of the particular routable component on the second routing diagram and the identifier of the second set of routing diagrams are distinct identifiers.

EEE 69 is a method according to any one of EEE 67 or 68, wherein: the first metadata further includes an identifier of a connectable component corresponding to the particular routable component, the second routing diagram includes the connectable component, and displaying the second routing diagram in response to determining the selection of the first user-selectable control occurs further includes displaying the connectable component highlighted.

EEE 70 is a method according to EEE 69, wherein: second metadata corresponds to the connectable component, the second metadata includes an identifier of two or more routable components, the two or more routable components are represented in the second routing diagram as being connected to the connectable component, the two or more routable components include the particular routable component, and displaying the second routing diagram in response to determining the selection of the first user-selectable control occurs further includes displaying the two or more routable components highlighted.

EEE 71 is a method according to EEE 55, wherein: the first user-selectable control corresponds to first metadata, the first metadata includes an identifier corresponding to the particular routable component within the second routing diagram, and the method further comprises after determining the selection of the first user-selectable control occurs while the first routing diagram is displayed on the display, but before displaying the second routing diagram, determining, by the processor based at least in part on the identifier corresponding to the particular routable component, the second portion of the particular routable component is within the second routing diagram.

EEE 72 is method according to EEE 71, wherein: the identifier corresponding to the particular routable component within the second routing diagram includes: an identifier of the particular routable component within the second routing diagram, or an identifier of one or more from among: a third terminal contained in the second routing diagram, a fourth terminal contained in the second routing diagram, or a connectable component contained in the second routing diagram, the third terminal is connected to the particular routable component, the fourth terminal is connected or connectable to the third terminal, and the connectable component includes the fourth terminal.

EEE 73 is a method according to EEE 55, wherein: the first user-selectable control corresponds to first metadata, the first metadata includes an identifier of the second routing diagram and an identifier of the particular routable component on the second routing diagram, and the method further comprises: after determining the selection of the first user-selectable control occurs while the first routing diagram is displayed on the display, but before displaying the second routing diagram, retrieving, by the processor based at least in part on the identifier of the second routing diagram, the second routing diagram from a database; searching, by the processor, the second routing diagram to determine a path of the particular routable component on the second routing diagram; and displaying, on the display, the second routing diagram with the particular routable component on the second routing diagram highlighted.

EEE 74 is a method according to EEE 73, wherein: the second routing diagram includes a second user-selectable control, the second user-selectable control includes an indicator that indicates the particular routable component continues on the first routing diagram, the second user-selectable control corresponds to second metadata, and the second metadata includes an identifier of the first routing diagram and an identifier of the particular routable component on the first routing diagram.

EEE 75 is a method according to EEE 74, wherein the identifier of the particular routable component on the first routing diagram is different than identifier of the particular routable component on the second routing diagram.

EEE 76 is a method according to any one of EEE 74 or 75, further comprising: determining, by the processor, a selection of the second user-selectable control occurs while the second routing diagram is displayed on the display; after determining the selection of the second user-selectable control occurs while the second routing diagram is displayed on the display, but before displaying the first routing diagram again, retrieving, by the processor based at least in part on the identifier of the first routing diagram, the first routing diagram from the database; searching, by the processor, the first routing diagram to determine a path of the particular routable component on the first routing diagram; and displaying, on the display, the first routing diagram with the particular routable component on the first routing diagram highlighted.

EEE 77 is a method according to EEE 76, wherein: the first routing diagram includes a third user-selectable control, the third user-selectable control includes an indicator that indicates the particular routable component continues on a third routing diagram, the third routing diagram is a member of the first set of routing diagrams, the third user-selectable control corresponds to third metadata, the third metadata includes an identifier of the third routing diagram and an identifier of the particular routable component on the third routing diagram, and the method further comprises: determining, by the processor, a selection of the third user-selectable control occurs while the first routing diagram is displayed on the display; after determining the selection of the third user-selectable control occurs while the first routing diagram is displayed on the display, but before displaying the third routing diagram, retrieving, by the processor based at least in part on the identifier of the third routing diagram, the third routing diagram from the database; searching, by the processor, the third routing diagram to determine a path of the particular routable component on the third routing diagram; and displaying, on the display, the third routing diagram with the particular routable component on the third routing diagram highlighted EEE 78 is a method according to EEE 77, wherein the identifier of the particular routable component on the first routing diagram is identical to the identifier of the particular routable component on the third routing diagram.

EEE 79 method according to EEE 74, wherein: the second routing diagram is a member of a second set of routing diagrams, the second set of routing diagrams includes one or more routing diagrams not contained in the first set of routing diagrams, the second routing diagram is not a member of the first set of routing diagrams, the second routing diagram includes a third user-selectable control, the third user-selectable control includes an indicator that indicates the particular routable component continues on a third routing diagram, the third routing diagram is contained within the second set of routing diagrams, the third user-selectable control corresponds to third metadata, the third metadata includes an identifier of the third routing diagram and an identifier of the particular routable component on the third routing diagram, and the method further comprises: determining, by the processor, a selection of the third user-selectable control occurs while the second routing diagram is displayed on the display; after determining the selection of the third user-selectable control occurs, but before displaying the third routing diagram, retrieving, by the processor based at least in part on the identifier of the third routing diagram, the third routing diagram from the database; searching, by the processor, the third routing diagram to determine a path of the particular routable component on the third routing diagram; and displaying, on the display, the third routing diagram with the particular routable component on the third routing diagram highlighted.

EEE 80 is a method according to EEE 79, wherein the identifier of the particular routable component on the second routing diagram is identical to the identifier of the particular routable component on the third routing diagram.

EEE 81 is a method according to EEE 73, wherein displaying the second routing diagram with the particular routable component on the second routing diagram highlighted includes displaying the particular routable component within the particular routable component defined by a first stroke width, a first color, and a path and displaying highlighting defined by a second stroke width, a second color, an opacity value, and the path.

EEE 82 is a method according to any one of EEE 55 to 81, wherein: the first routing diagram includes a second routable component, the method further comprises: determining, by the processor, a selection of the first portion of the particular routable component and a selection of the second routable component occur while the first routing diagram is displayed on the display, displaying, in response to the selection of the first portion of the particular routable component, the first portion of the particular routable component as highlighted, and displaying, in response to the selection of the second routable component, the second routable component as highlighted.

EEE 83 is a method according to EEE 82, wherein a color of highlighting for the first portion of the particular routable component is different than a color of highlighting for the second routable component EEE 84 is a method according to any one of EEE 55 to 83, wherein: the first routing diagram includes a second routable component, a color of highlighting for the first portion of the particular routable component is different than a color of highlighting for the second routable component, and the method further comprises: determining, by the processor, a selection of the first portion of the particular routable component and a selection of the second routable component occur while the first routing diagram is displayed on the display; displaying, in response to the selection of the first portion of the particular routable component, the first portion of the particular routable component as highlighted; displaying, in response to the selection of the second routable component, the second routable component as highlighted; and determining, by the processor, the color of highlighting for the first portion of the particular routable component and the color of highlighting for the second routable component based on an order the selection of the first portion of the particular routable component and the selection of the second routable component.

EEE 85 is method according to any one of EEE 55 to 84, wherein displaying the second routing diagram includes displaying the second routing diagram instead of the first routing diagram.

EEE 86 is a method according to any one of EEE 55 to 85 further comprising: determining, by the processor prior to determining the selection of the first user-selectable control occurs while the first routing diagram is displayed on the display, a selection of the particular routable component occurs while the first routing diagram is displayed on the display; and displaying, on the display in response to determining the selection of the particular routable component occurs while the first routing diagram is displayed on the display, the particular routable component highlighted instead of un-highlighted, wherein: the particular routable component in the first routing diagram is highlighted when the selection of the first user-selectable control occurs; and the particular routable component in the second routing diagram is highlighted when displaying the second routing diagram in response to determining the selection of the first user-selectable control occurs.

EEE 87 is a computing system comprising: a processor; and a non-transitory computer-readable memory configured to store at least executable instructions, wherein the executable instructions, when executed by the processor, cause the computing system to perform functions comprising: displaying, on a display, a first routing diagram, wherein: the first routing diagram is a member of a first set of routing diagrams that includes multiple different routing diagrams, displaying the first routing diagram includes displaying, within the first routing diagram, a first user-selectable control, a first portion of a particular routable component, a first terminal connected to the particular routable component, and a second terminal connected or connectable to the first terminal, and the first user-selectable control corresponds to the first terminal or the second terminal; determining, by the processor, a selection of the first user-selectable control occurs while the first routing diagram is displayed on the display; and displaying, on the display in response to determining the selection of the first user-selectable control occurs while the first routing diagram is displayed on the display, the second routing diagram with a second portion of the particular routable component highlighted.

EEE 88 is a computing system comprising: a processor; and a non-transitory computer-readable memory configured to store at least executable instructions, wherein the executable instructions are executable by the processor to cause a computing system to perform functions comprising a method according to any one of EEE 55 to 86.

EEE 89 is a non-transitory computer-readable memory having stored therein instructions executable by a processor to cause a computing system to perform functions comprising: displaying, on a display, a first routing diagram, wherein: the first routing diagram is a member of a first set of routing diagrams that includes multiple different routing diagrams, displaying the first routing diagram includes displaying, within the first routing diagram, a first user-selectable control, a first portion of a particular routable component, a first terminal connected to the particular routable component, and a second terminal connected or connectable to the first terminal, and the first user-selectable control corresponds to the first terminal or the second terminal; determining, by the processor, a selection of the first user-selectable control occurs while the first routing diagram is displayed on the display; and displaying, on the display in response to determining the selection of the first user-selectable control occurs while the first routing diagram is displayed on the display, the second routing diagram with a second portion of the particular routable component highlighted.

EEE 90 is a non-transitory computer-readable memory having stored therein instructions executable by a processor to cause a computing system to perform functions comprising a method according to any one of EEE 55 to 86.

What is claimed is:

1. A method comprising:
    displaying, on a display, a first routing diagram, wherein:
        the first routing diagram is a member of a first set of routing diagrams,
        second, third, and fourth routing diagrams are members of a second set of routing diagrams,
        the second, third, and fourth routing diagrams are arranged according to a sequence of multiple routing diagrams in which the third routing diagram is between the second routing diagram and the fourth routing diagram, and
        displaying the first routing diagram includes displaying a first portion of a particular circuit or line, a termination of the first portion of the particular circuit or line, and a first user-selectable control represented by a first terminal connected to the termination of the first portion of the particular circuit or line, wherein the first user-selectable control includes displaying an identifier of one of the second, third, or fourth routing diagrams in the sequence of multiple routing diagrams and an indicator of a total number diagrams in the sequence of multiple routing diagrams;
    determining, by a processor, a selection of the first user-selectable control represented by the first terminal occurs while the first routing diagram is displayed on the display; and
    displaying, on the display in response to determining the selection of the first user-selectable control represented by the first terminal occurs while the first routing diagram is displayed on the display and in place of the first routing diagram, the one of the second, third, or fourth routing diagrams with a second portion of the particular circuit or line highlighted,
    wherein the first and second portions of the particular circuit or line are different portions of the particular circuit or line.

2. A method according to claim 1, wherein:
    displaying the one of the second, third, or fourth routing diagrams includes displaying:
        a first portion of a second circuit or line,
        a termination of the first portion of the second circuit or line,
        a second user-selectable control represented by a second terminal connected to the termination of the first portion of the second circuit or line,
        a first portion of a third circuit or line,
        a termination of the first portion of the third circuit or line,
        a third user-selectable control represented by a third terminal connected to the termination of the first portion of the third circuit or line,
        a fourth user-selectable control corresponding to the second circuit or line and the third circuit or line,
    the method further comprises one from among:
        determining, by the processor, a selection of the second user-selectable control occurs while the one of the second, third, or fourth routing diagrams is displayed on the display and responsively displaying the first routing diagram on the display with a second portion of the second circuit or line highlighted,
        determining, by the processor, a selection of the third user-selectable control occurs while the one of the second, third, or fourth routing diagrams is displayed on the display and responsively displaying the first routing diagram on the display with a second portion of the third circuit or line highlighted, or
        determining, by the processor, a selection of the fourth user-selectable control occurs while the one of the second, third, or fourth routing diagrams is displayed on the display and responsively displaying the first routing diagram on the display with both a second portion of the second circuit or line and a second portion of the third circuit or line highlighted.

3. A method according to claim 2, wherein the second circuit or line or the third circuit or line is the particular circuit or line.

4. A method according to claim 1, further comprising:
    displaying, on the display, a second user-selectable control and a third user-selectable control, wherein:
    a selection of the second user-selectable control causes the processor to display an earlier diagram in the sequence of multiple routing diagrams, if any, compared to a currently-displayed diagram of the sequence of multiple routing diagrams, and
    a selection of the third user-selectable control causes the processor to display a later diagram in the sequence of multiple routing diagrams, if any, compared to the currently-displayed diagram of the sequence of multiple routing diagrams.

5. A method according to claim 1,
    wherein the first routing diagram includes one of the following: a first electrical wiring diagram, a first optical communication line diagram, a first hydraulic line diagram, a first pneumatic line diagram, or a first vacuum line diagram, wherein if the first routing diagram includes the first electrical wiring diagram, then the one of the second, third, or fourth routing diagrams includes a second electrical wiring diagram, the first portion of the particular circuit or line represents a first portion of a particular electrical circuit, and the second portion of the particular circuit or line represents a second portion of the particular electrical circuit, wherein if the first routing diagram includes the first optical communication line diagram, then the one of the second, third, or fourth routing diagrams includes a second optical communication line diagram, the first portion of the particular circuit or line represents a first portion of a particular optical communication line, and the second portion of the particular circuit or line represents a second portion of the particular optical communication line, wherein if the first routing diagram includes the first hydraulic line diagram, then the one of the second, third, or fourth routing diagrams includes a second hydraulic line diagram, the first portion of the particular circuit or line represents a first portion of a particular hydraulic line, and the second portion of the particular circuit or line represents a second portion of the particular hydraulic line, wherein if the first routing diagram includes the first pneumatic line diagram, then the one of the second, third, or fourth routing diagrams includes a second pneumatic line diagram, the first portion of the particular circuit or line represents a first portion of a particular pneumatic line, and the second portion of the particular circuit or line represents a second portion of the particular pneumatic line, or wherein if the first routing diagram includes the first vacuum line diagram, then the one of the second, third, or fourth routing diagrams includes a second vacuum line diagram, the first portion of the particular circuit or line represents a first portion of a particular vacuum line, and the second portion of the particular circuit or line represents a second portion of the particular vacuum line.

6. A method according to claim 1, wherein:
the first user-selectable control corresponds to first metadata,
the first metadata includes an identifier of the particular circuit or line within the one of the second, third, or fourth routing diagrams, and
the method further comprises:
 after determining the selection of the first user-selectable control occurs while the first routing diagram is displayed on the display, but before displaying the one of the second, third, or fourth routing diagrams diagram, determining, by the processor based at least in part on the identifier of the particular circuit or line, the second portion of the particular circuit or line is within the one of the second, third, or fourth routing diagrams.

7. A method according to claim 1, wherein:
the first user-selectable control corresponds to first metadata,
the first metadata includes an identifier corresponding to the particular circuit or line within the one of the second, third, or fourth routing diagrams, and
the method further comprises:
 after determining the selection of the first user-selectable control occurs while the first routing diagram is displayed on the display, but before displaying the one of the second, third, or fourth routing diagrams, determining, by the processor based at least in part on the identifier corresponding to the particular circuit or line, the second portion of the particular circuit or line is within the one of the second, third, or fourth routing diagrams.

8. A method according to claim 7, wherein:
the identifier corresponding to the particular circuit or line within the one of the second, third, or fourth routing diagrams includes:
 an identifier of the particular circuit or line within the one of the second, third, or fourth routing diagrams, or
 an identifier of one or more from among: a third terminal contained in the one of the second, third, or fourth routing diagrams, a fourth terminal contained in the one of the second, third, or fourth routing diagrams, or a connectable component contained in the one of the second, third, or fourth routing diagrams,
the third terminal is connected to the particular circuit or line,
the fourth terminal is connected or connectable to the third terminal, and
the connectable component includes the fourth terminal.

9. A method according to claim 1, wherein:
the first routing diagram includes a second circuit or line,
the method further comprises:
 determining, by the processor, a selection of the first portion of the particular circuit or line and a selection of the second circuit or line occur while the first routing diagram is displayed on the display,
 displaying, in response to the selection of the first portion of the particular circuit or line, the first portion of the particular circuit or line as highlighted, and
 displaying, in response to the selection of the second circuit or line, the second circuit or line as highlighted.

10. A method according to claim 1, wherein:
the first routing diagram includes a second circuit or line,
a color of highlighting for the first portion of the particular circuit or line is different than a color of highlighting for the second circuit or line, and
the method further comprises:
 determining, by the processor, a selection of the first portion of the particular circuit or line and a selection of the second circuit or line occur while the first routing diagram is displayed on the display;
 displaying, in response to the selection of the first portion of the particular circuit or line, the first portion of the particular circuit or line as highlighted;
 displaying, in response to the selection of the second circuit or line, the second circuit or line as highlighted; and
 determining, by the processor, the color of highlighting for the first portion of the particular circuit or line and the color of highlighting for the second circuit or line based on an order the selection of the first portion of the particular circuit or line and the selection of the second circuit or line.

11. A method according to claim 1, wherein displaying the one of the second, third, or fourth routing diagrams includes displaying the one of the second, third, or fourth routing diagrams instead of the first routing diagram.

12. A method according to claim 1, further comprising:
determining, by the processor prior to determining the selection of the first user-selectable control occurs while the first routing diagram is displayed on the display, a selection of the particular circuit or line occurs while the first routing diagram is displayed on the display; and
displaying, on the display in response to determining the selection of the particular circuit or line occurs while the first routing diagram is displayed on the display, the particular circuit or line highlighted instead of unhighlighted, wherein:
the particular circuit or line in the first routing diagram is highlighted when the selection of the first user-selectable control occurs; and
the particular circuit or line in the one of the second, third, or fourth routing diagrams is highlighted when displaying the one of the second, third, or fourth routing diagrams in response to determining the selection of the first user-selectable control occurs.

13. The method of claim 1,
wherein displaying the first routing diagram further includes displaying a second user-selectable control,
wherein the second user-selectable control is represented by the first portion of the particular circuit or line, and
wherein the method further comprises prior to determining the selection of the first user-selectable control:
determining, by the processor, a selection of the second user-selectable control represented by the first portion of the particular circuit or line occurs while the first routing diagram is displayed on the display and the first portion of the particular circuit or line is not highlighted; and
displaying, on the display, the first routing diagram with the first portion of the particular circuit or line highlighted.

14. The method of claim 1, wherein the sequence of multiple routing diagrams includes multiple routing diagrams between the second routing diagram and the fourth routing diagram.

15. A computing system comprising:
a processor; and
a non-transitory computer-readable memory configured to store at least executable instructions, wherein the executable instructions, when executed by the processor, cause the computing system to perform functions comprising:
displaying, on a display, a first routing diagram, wherein:
the first routing diagram of a first set of routing diagrams,
second, third, and fourth routing diagrams are members of a second set of routing diagrams,
the second, third, and fourth routing diagrams are arranged according to a sequence of multiple routing diagrams in which the third routing diagram is between the second routing diagram and the fourth routing diagram, and
displaying the first routing diagram includes displaying a first portion of a particular circuit or line, a termination of the first portion of the particular circuit or line, and a first user-selectable control represented by a first terminal connected to the termination of the first portion of the particular circuit or line, wherein the first user-selectable control includes displaying an identifier of one of the second, third, or fourth routing diagrams in the sequence of multiple routing diagrams and an indicator of a total number diagrams in the sequence of multiple routing diagrams;
determining, by the processor, a selection of the first user-selectable control occurs represented by the first terminal while the first routing diagram is displayed on the display; and
displaying, on the display in response to determining the selection of the first user-selectable control represented by the first terminal occurs while the first routing diagram is displayed on the display and in place of the first routing diagram, the one of the second, third, or fourth routing diagrams with a second portion of the particular circuit or line highlighted,
wherein the first and second portions of the particular circuit or line are different portions of the particular circuit or line.

16. The computing system of claim 15, wherein the sequence of multiple routing diagrams includes multiple routing diagrams between the second routing diagram and the fourth routing diagram.

17. The computing system of claim 15, wherein:
displaying the one of the second, third, or fourth routing diagrams includes displaying:
a first portion of a second circuit or line,
a termination of the first portion of the second circuit or line,
a second user-selectable control represented by a second terminal connected to the termination of the first portion of the second circuit or line,
a first portion of a third circuit or line,
a termination of the first portion of the third circuit or line,
a third user-selectable control represented by a third terminal connected to the termination of the first portion of the third circuit or line,
a fourth user-selectable control corresponding to the second circuit or line and the third circuit or line,
the functions further comprise one from among:
determining, by the processor, a selection of the second user-selectable control occurs while the one of the second, third, or fourth routing diagrams is displayed on the display and responsively displaying the first routing diagram on the display with a second portion of the second circuit or line highlighted,
determining, by the processor, a selection of the third user-selectable control occurs while the one of the second, third, or fourth routing diagram s is displayed on the display and responsively displaying the first routing diagram on the display with a second portion of the third circuit or line highlighted, or
determining, by the processor, a selection of the fourth user-selectable control occurs while the one of the second, third, or fourth routing diagrams is displayed on the display and responsively displaying the first routing diagram on the display with both a second portion of the second circuit or line and a second portion of the third circuit or line highlighted.

18. The computing system of claim 15,
wherein the first routing diagram includes one of the following: a first electrical wiring diagram, a first optical communication line diagram, a first hydraulic line diagram, a first pneumatic line diagram, or a first vacuum line diagram,
wherein if the first routing diagram includes the first electrical wiring diagram, then the one of the second, third, or fourth routing diagrams includes a second electrical wiring diagram, the first portion of the particular circuit or line represents a first portion of a particular electrical circuit, and the second portion of the particular circuit or line represents a second portion of the particular electrical circuit, wherein if the first routing diagram includes the first optical communication line diagram, then the one of the second, third, or fourth routing diagrams includes a second optical communication line diagram, the first portion of the particular circuit or line represents a first portion of a particular optical communication line, and the second portion of the particular circuit or line represents a second portion of the particular optical communication line, wherein if the first routing diagram includes the first hydraulic line diagram, then the one of the second, third, or fourth routing diagrams includes a second hydraulic line diagram, the first portion of the particular circuit or line represents a first portion of a particular hydraulic line, and the second portion of the particular circuit or line represents a second portion of the particular hydraulic line, wherein if the first routing diagram includes the first pneumatic line diagram, then the one of the second, third, or fourth routing diagrams includes a second pneumatic line diagram, the first portion of the particular circuit or line represents a first portion of a particular pneumatic line, and the second portion of the particular circuit or line represents a second portion of the particular pneumatic line, or wherein if the first routing diagram includes the first vacuum line diagram, then the one of the second, third, or fourth routing diagrams includes a second vacuum line diagram, the first portion of the particular circuit or line represents a first portion of a particular vacuum line, and the second portion of the particular circuit or line represents a second portion of the particular vacuum line.

19. A non-transitory computer-readable memory having stored therein instructions executable by a processor to cause a computing system to perform functions comprising:
displaying, on a display, a first routing diagram, wherein:
the first routing diagram of a first set of routing diagrams,
second, third, and fourth routing diagrams are members of a second set of routing diagrams,
the second, third, and fourth routing diagrams are arranged according to a sequence of multiple routing diagrams in which the third routing diagram is between the second routing diagram and the fourth routing diagram, and
displaying the first routing diagram includes displaying a first portion of a particular circuit or line, a termination of the first portion of the particular circuit or line, and a first user-selectable control represented by a first terminal connected to the termination of the first portion of the particular circuit or line, wherein the first user-selectable control includes displaying an identifier of one of the second, third, or fourth routing diagrams in the sequence of multiple routing diagrams and an indicator of a total number diagrams in the sequence of multiple routing diagrams;
determining, by the processor, a selection of the first user-selectable control represented by the first terminal occurs while the first routing diagram is displayed on the display; and
displaying, on the display in response to determining the selection of the first user-selectable control represented by the first terminal occurs while the first routing diagram is displayed on the display and in place of the first routing diagram, the one of the second, third, or fourth routing diagrams with a second portion of the particular circuit or line highlighted,
wherein the first and second portions of the particular circuit or line are different portions of the particular circuit or line.

20. The non-transitory computer-readable memory of claim 19, wherein:
displaying the one of the second, third, or fourth routing diagrams includes displaying:
a first portion of a second circuit or line,
a termination of the first portion of the second circuit or line,
a second user-selectable control represented by a second terminal connected to the termination of the first portion of the second circuit or line,
a first portion of a third circuit or line,
a termination of the first portion of the third circuit or line,
a third user-selectable control represented by a third terminal connected to the termination of the first portion of the third circuit or line,
a fourth user-selectable control corresponding to the second circuit or line and the third circuit or line,
the functions further comprise one from among:
determining, by the processor, a selection of the second user-selectable control occurs while the one of the second, third, or fourth routing diagrams is displayed on the display and responsively displaying the first routing diagram on the display with a second portion of the second circuit or line highlighted,
determining, by the processor, a selection of the third user-selectable control occurs while the one of the second, third, or fourth routing diagram s is displayed on the display and responsively displaying the first routing diagram on the display with a second portion of the third circuit or line highlighted, or
determining, by the processor, a selection of the fourth user-selectable control occurs while the one of the second, third, or fourth routing diagrams is displayed on the display and responsively displaying the first routing diagram on the display with both a second portion of the second circuit or line and a second portion of the third circuit or line highlighted.

21. The non-transitory computer-readable memory of claim 19,
wherein the first routing diagram includes one of the following: a first electrical wiring diagram, a first optical communication line diagram, a first hydraulic line diagram, a first pneumatic line diagram, or a first vacuum line diagram,
wherein if the first routing diagram includes the first electrical wiring diagram, then the one of the second, third, or fourth routing diagrams includes a second electrical wiring diagram, the first portion of the particular circuit or line represents a first portion of a particular electrical circuit, and the second portion of the particular circuit or line represents a second portion of the particular electrical circuit,
wherein if the first routing diagram includes the first optical communication line diagram, then the one of the second, third, or fourth routing diagrams includes a second optical communication line diagram, the first portion of the particular circuit or line represents a first portion of a particular optical communication line, and the second portion of the particular circuit or line represents a second portion of the particular optical communication line, wherein if the first routing diagram includes the first hydraulic line diagram, then the one of the second, third, or fourth routing diagrams includes a second hydraulic line diagram, the first portion of the particular circuit or line represents a first portion of a particular hydraulic line, and the second portion of the particular circuit or line represents a second portion of the particular hydraulic line, wherein if the first routing diagram includes the first pneumatic line diagram, then the one of the second, third, or fourth routing diagrams includes a second pneumatic line diagram, the first portion of the particular circuit or line represents a first portion of a particular pneumatic line, and the second portion of the particular circuit or line represents a second portion of the particular pneumatic line, or wherein if the first routing diagram includes the first vacuum line diagram, then the one of the second, third, or fourth routing diagrams includes a second vacuum line diagram, the first portion of the particular circuit or line represents a first portion of a particular vacuum line, and the second portion of the particular circuit or line represents a second portion of the particular vacuum line.

* * * * *